April 6, 1943. J. W. BRYCE 2,315,686
COMBINED MULTIPLYING AND DIVIDING MACHINE
WITH RESULT CHECKING DEVICE THEREFOR
Filed March 19, 1941  25 Sheets-Sheet 1

INVENTOR.
James W. Bryce
BY
ATTORNEY

April 6, 1943. J. W. BRYCE 2,315,686
COMBINED MULTIPLYING AND DIVIDING MACHINE
WITH RESULT CHECKING DEVICE THEREFOR
Filed March 19, 1941 25 Sheets-Sheet 2

| FIG.22a. | FIG.22e. |
|---|---|
| FIG.22b. | FIG.22f. |
| FIG.22c. | FIG.22g. |
| FIG.22d. | FIG.22h. |

INVENTOR.
James W. Bryce
BY
W. M. Wilson
ATTORNEY

INVENTOR.
James W. Bryce
BY
ATTORNEYS.

April 6, 1943.   J. W. BRYCE   2,315,686
COMBINED MULTIPLYING AND DIVIDING MACHINE
WITH RESULT CHECKING DEVICE THEREFOR
Filed March 19, 1941   25 Sheets-Sheet 4

INVENTOR.
James W. Bryce
BY
ATTORNEYS.

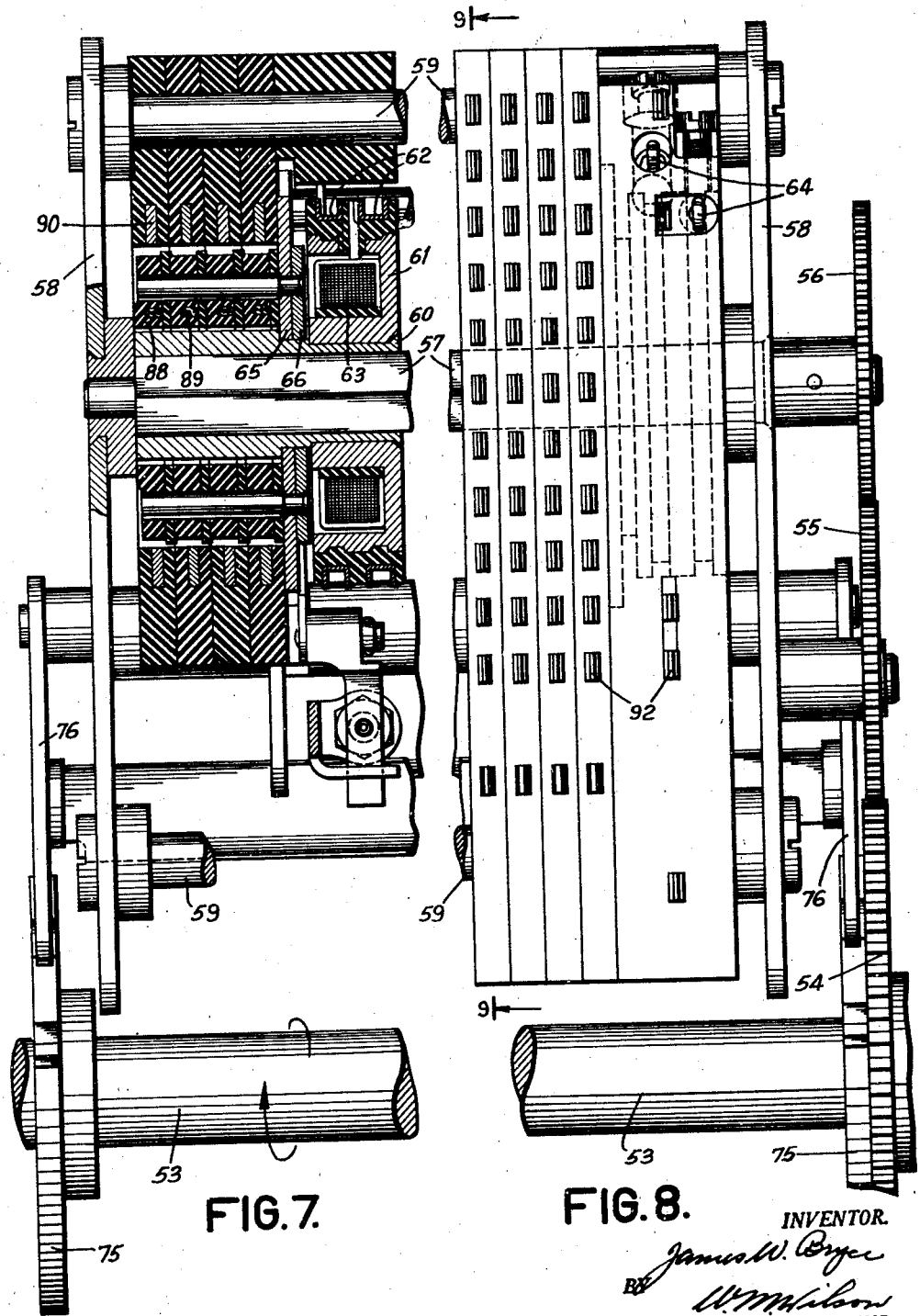

April 6, 1943.  J. W. BRYCE  2,315,686
COMBINED MULTIPLYING AND DIVIDING MACHINE
WITH RESULT CHECKING DEVICE THEREFOR
Filed March 19, 1941   25 Sheets-Sheet 6

INVENTOR.
James W. Bryce
BY
ATTORNEYS.

April 6, 1943.  J. W. BRYCE  2,315,686
COMBINED MULTIPLYING AND DIVIDING MACHINE
WITH RESULT CHECKING DEVICE THEREFOR
Filed March 19, 1941   25 Sheets-Sheet 10

INVENTOR.
James W. Bryce
BY
ATTORNEYS.

April 6, 1943. J. W. BRYCE 2,315,686
COMBINED MULTIPLYING AND DIVIDING MACHINE
WITH RESULT CHECKING DEVICE THEREFOR
Filed March 19, 1941 25 Sheets-Sheet 11
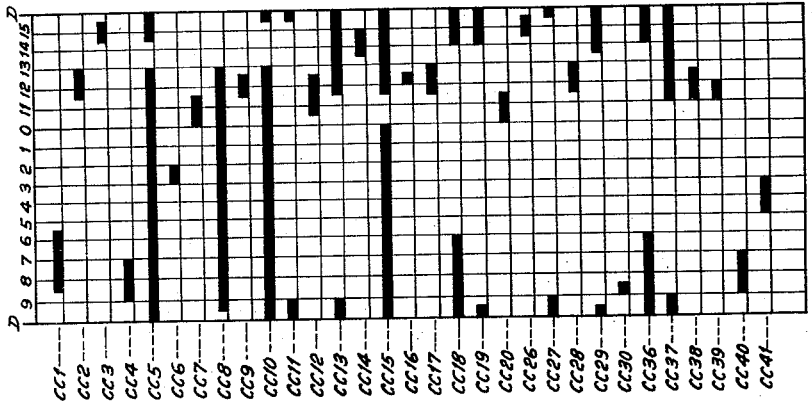
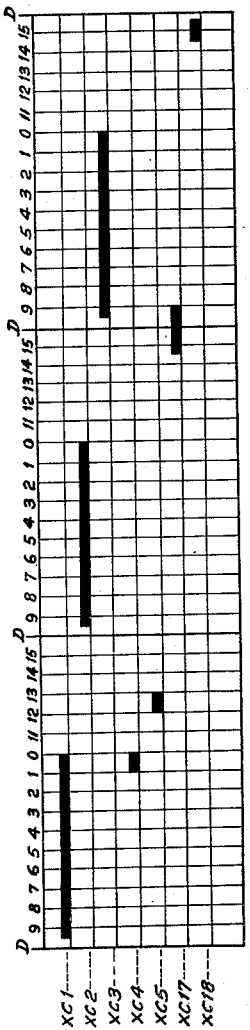
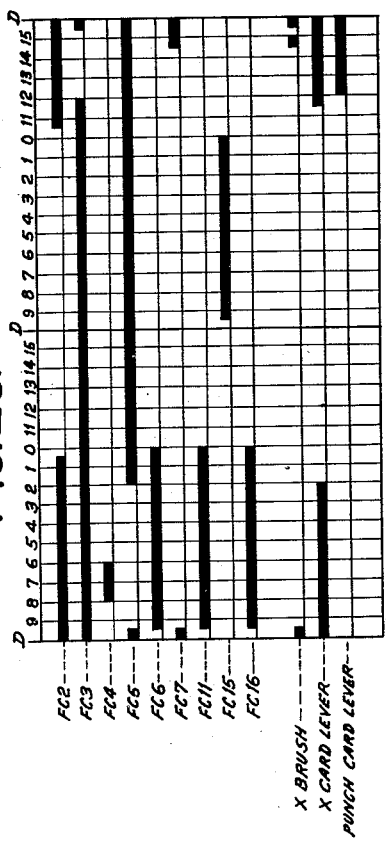
INVENTOR
James W. Bryce
BY
ATTORNEY

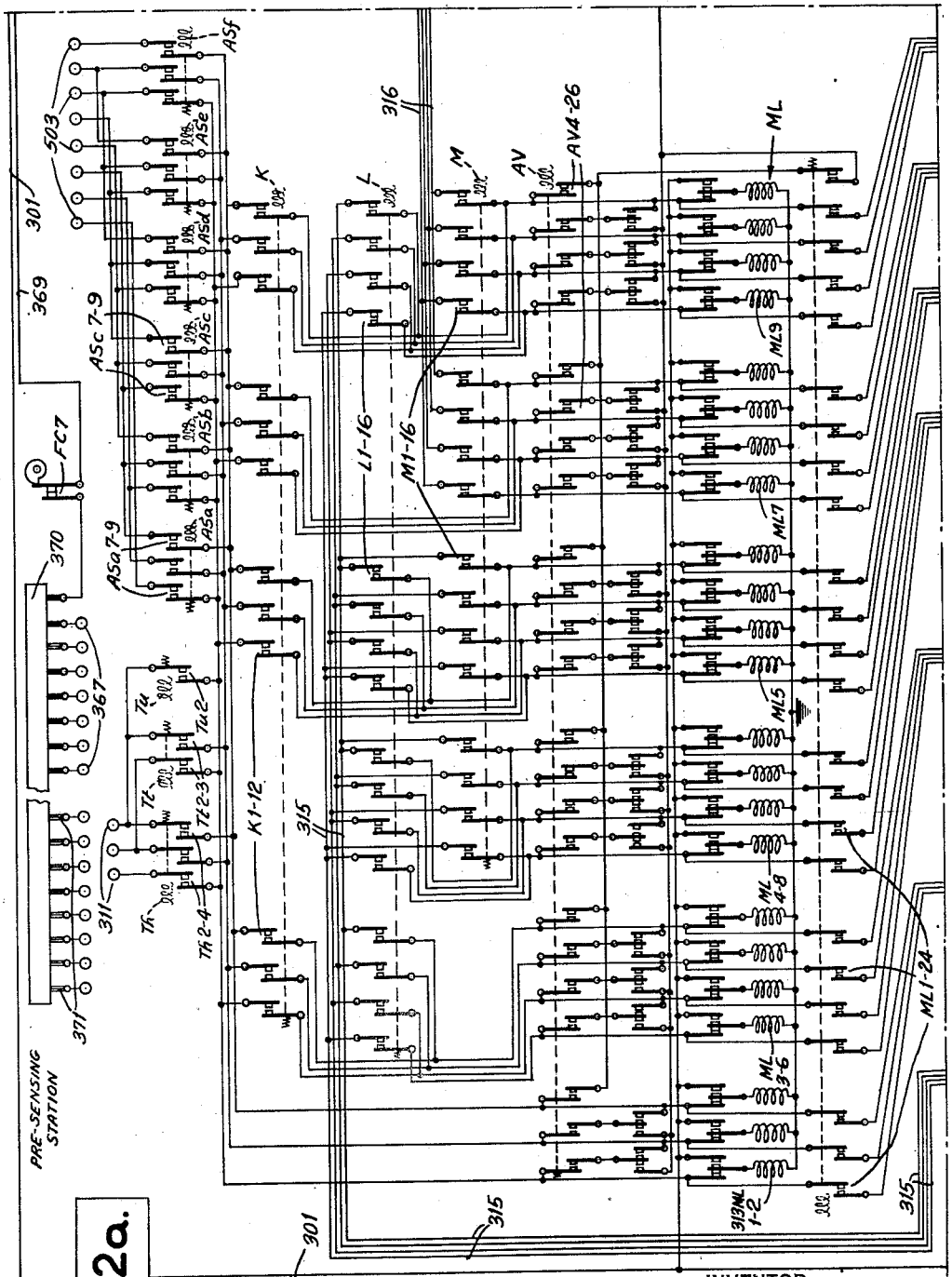

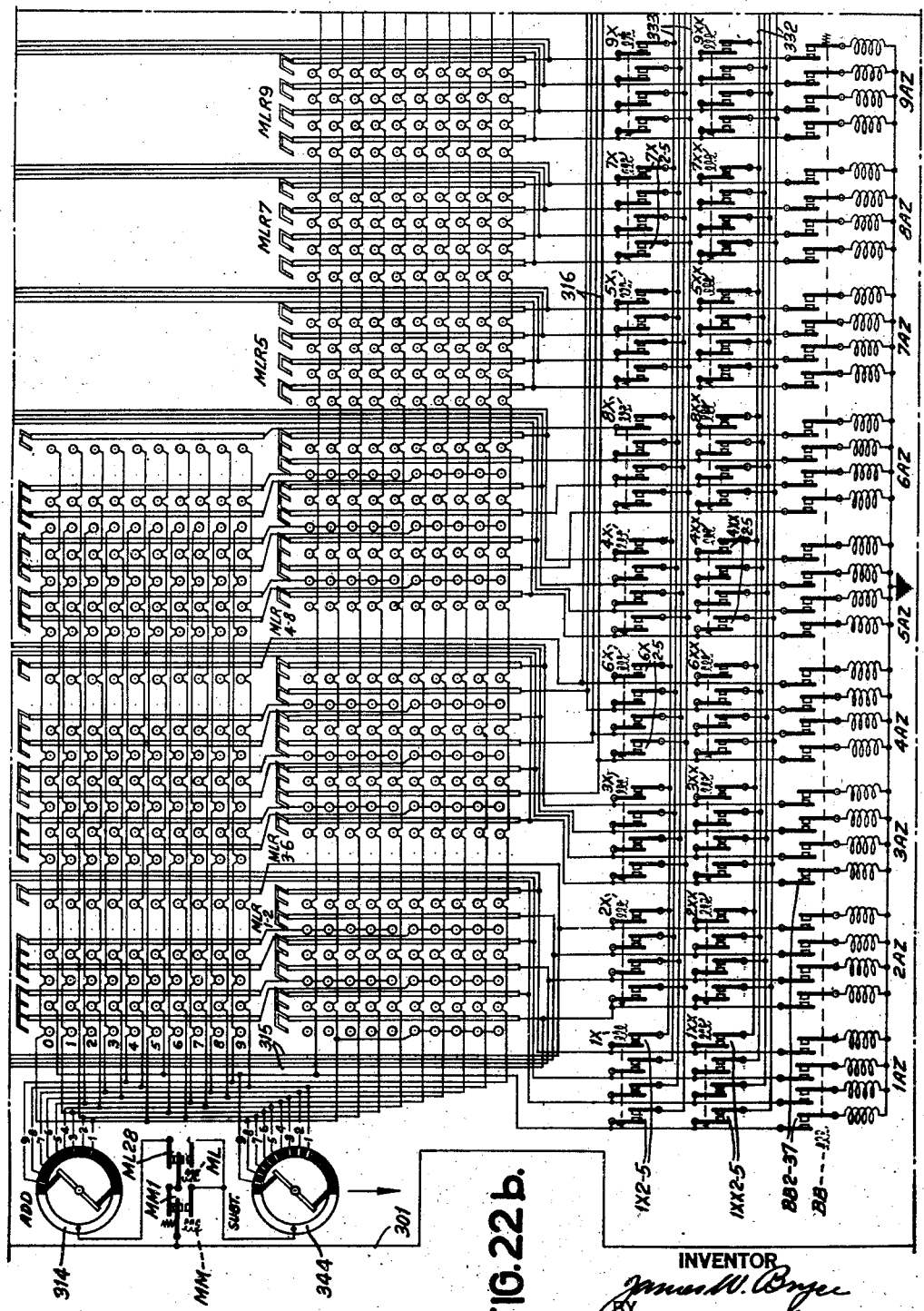

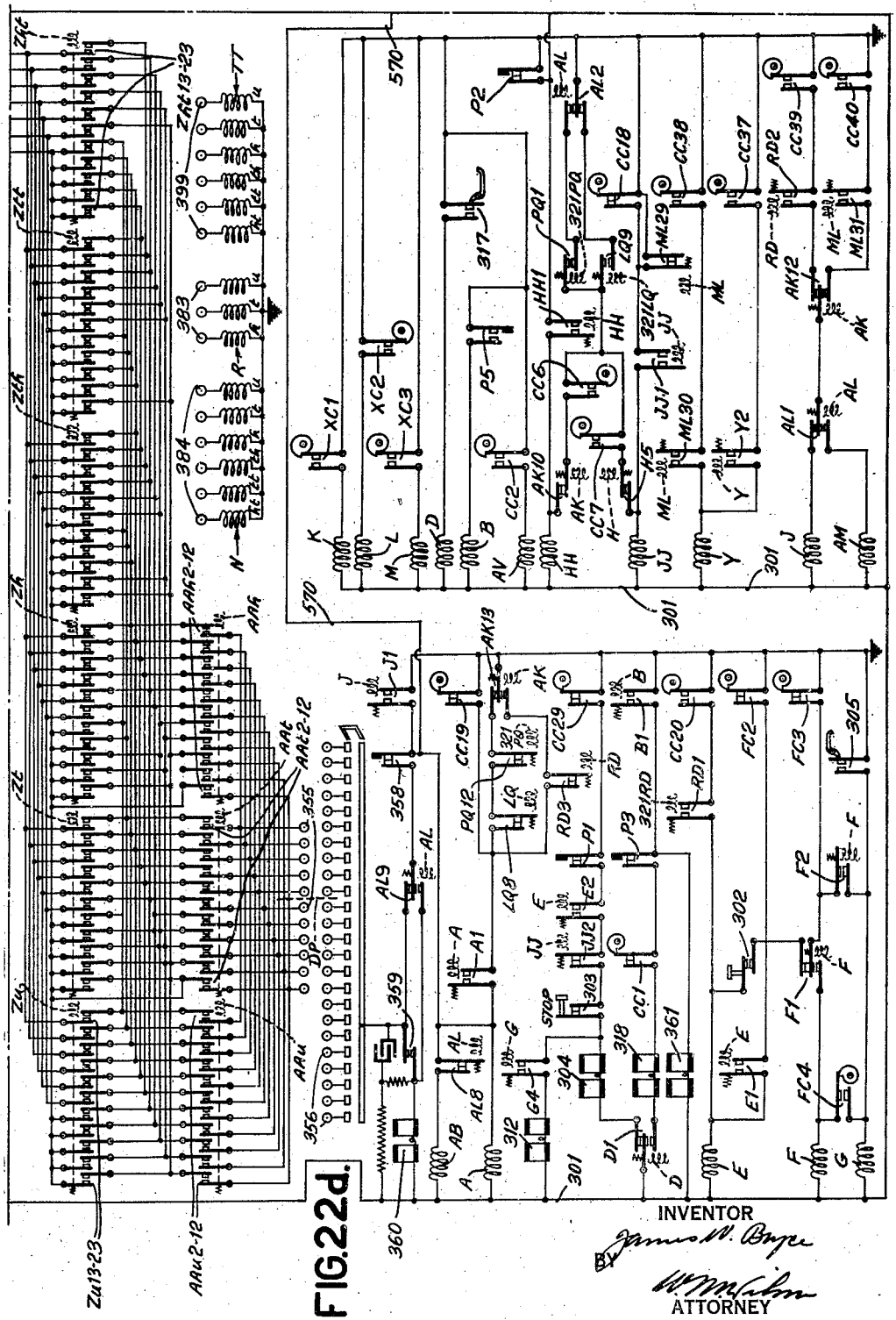

April 6, 1943.   J. W. BRYCE   2,315,686
COMBINED MULTIPLYING AND DIVIDING MACHINE
WITH RESULT CHECKING DEVICE THEREFOR
Filed March 19, 1941   25 Sheets-Sheet 16

FIG.22e.

April 6, 1943.  J. W. BRYCE  2,315,686
COMBINED MULTIPLYING AND DIVIDING MACHINE
WITH RESULT CHECKING DEVICE THEREFOR
Filed March 19, 1941  25 Sheets-Sheet 18

INVENTOR
James W. Bryce
BY
ATTORNEY

FIG.22h.

April 6, 1943.  J. W. BRYCE  2,315,686
COMBINED MULTIPLYING AND DIVIDING MACHINE
WITH RESULT CHECKING DEVICE THEREFOR
Filed March 19, 1941   25 Sheets-Sheet 21

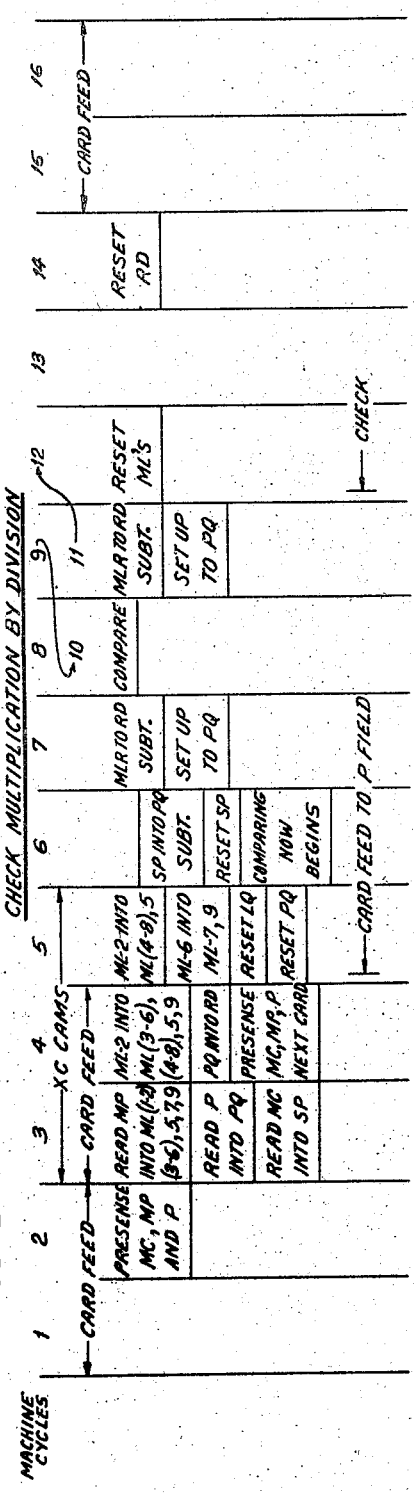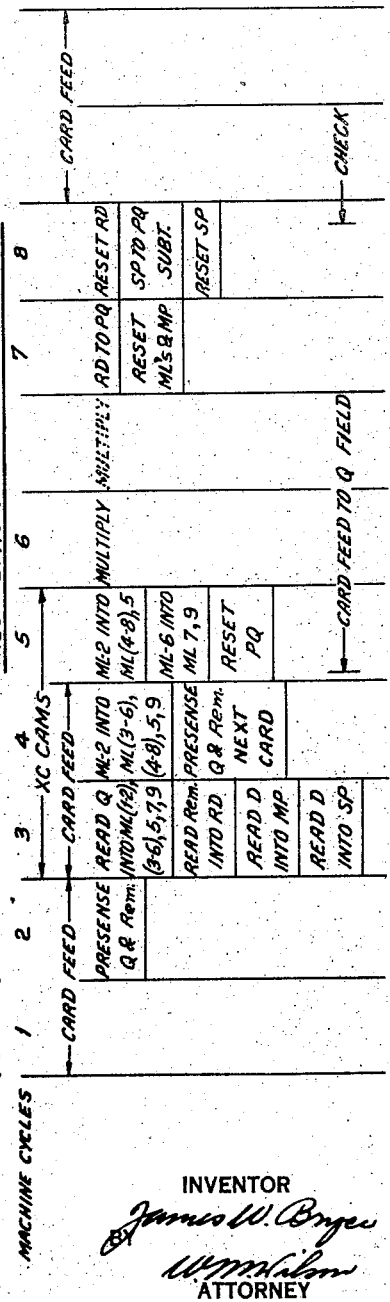

April 6, 1943.                J. W. BRYCE                2,315,686
          COMBINED MULTIPLYING AND DIVIDING MACHINE
             WITH RESULT CHECKING DEVICE THEREFOR
                  Filed March 19, 1941        25 Sheets-Sheet 24

INVENTOR
James W. Bryce
BY
ATTORNEY

April 6, 1943.   J. W. BRYCE   2,315,686
COMBINED MULTIPLYING AND DIVIDING MACHINE
WITH RESULT CHECKING DEVICE THEREFOR
Filed March 19, 1941   25 Sheets-Sheet 25

INVENTOR
James W. Bryce
BY
ATTORNEY

Patented Apr. 6, 1943

2,315,686

UNITED STATES PATENT OFFICE 2,315,686

COMBINED MULTIPLYING AND DIVIDING MACHINE WITH RESULT CHECKING DEVICE THEREFOR

James W. Bryce, Glen Ridge, N. J., assignor to International Business Machines Corporation, New York, N. Y., a corporation of New York Application March 19, 1941, Serial No. 384,157

9 Claims. (Cl. 235—61.8)

This invention relates to improvements in record controlled machines, particularly of the type which are adapted to perform either multiplying or dividing computations. The present improvements relate particularly to improvements in devices for checking the results of either computation.

In accounting departments of some mercantile establishments multiplying computations are ordinarily desired but occasionally there is the necessity of carrying out an accounting procedure which involves dividing operations. There has been designed heretofore, and used commercially, multiplying machines which are controlled by records to carry out multiplying computations. Dividing machines have also been devised for carrying out record controlled dividing computations by the use of a separate dividing machine. The provision of a single machine whereby either dividing or multiplying operations may be carried out has heretofore been contemplated and by the utilization of certain apparatus which may be commonly used for both computations a desired simplification in the construction and operation of the machine may be secured. One embodiment of a machine of this type is fully shown and described in the application of J. W. Bryce et al., Serial No. 213,044, filed June 10, 1938.

Many users of record controlled machines insist that for certain classes of work the results of computations be checked and verified for accuracy. It has already been contemplated, as disclosed in prior patents, the provision of checking mechanisms wherein the accuracy of the results of multiplying operations may be effected by a recomputation of the same data. However, this recomputation was necessarily performed by the same multiplying mechanism and in the event that an error in the result was obtained by a faulty mechanism, the same error would be likely to occur in the recomputation. The checking operation was therefore not quickly recognized as also being an error and the present invention is primarily directed to improvements in checking mechanisms whereby the faulty or misoperation of one device would not be likely to occur in checking operations. It is known mathematically that the product result of multiplying operations may be checked by utilizing the factors of multiplication as factors of a division computation and by a recomputation by division, the product result may be checked back. It is also known mathematically that the factors and results of a dividing operation may be checked by going through a multiplying operation. The present improvements in checking mechanisms is based upon such known mathematics and since in checking operations some of the mechanisms not heretofore utilized for the primary computation are utilized, errors in checking are less likely to occur.

Accordingly, the present invention has for its main object the provision of a checking mechanism whereby the mathematical relationship of the factors and result of a multiplying computation may be checked by utilizing such factors and the result in a dividing computation. Conversely, it is a further object of the present invention to provide a checking mechanism whereby the factors and quotient result and possible remainder of a dividing computation may be checked as to its mathematical relationship by the utilization of such values to control a multiplying operation.

A still further object of the present invention is to provide a very simple means whereby, by a single adjustment in the machine, the machine may be conditioned for checking one type of computation by carrying out a computation of another type.

A still further object of the present invention is to provide for each of the checking mechanisms utilized an arrangement which will not increase the cycles of operation of the machine so that upon the completion of a computation carried out for checking previous results, the accuracy of such results will be obtained with no loss in time and with no extra machine cycles required for checking purposes.

When the machine is conditioned for the primary computation, that is, multiplying or dividing, the machine performs such computations automatically in the same manner as the machine in the above mentioned application. After performing each computation, testing operations in the present machine then automatically ensue and upon locating an incorrectly computed record, a signal is given to the operator so that such records may be localized thus enabling the errors to be ascertained by the operator.

In the utilization of the dividing mechanism for checking the multiplying computations, the machine utilizes the product amount as a dividend and preferably the multiplier amount as a divisor and the previously recorded multiplicand amount is utilized for checking against the subsequently derived quotient value. In carrying out checking operations, the multiplicand value is entered in the checking accumulator as a tens complement and such entries are preferably made before the actual dividing computation takes place so as to utilize one of the operating cycles of the machine and not unduly increase the number of cycles for checking purposes.

In the recomputation by dividing, the quotient digits as they are derived are directly entered in the checking accumulator in the proper denominational orders so that immediately upon the dividing computation being terminated and the last quotient secured, the checking accumulator should have a zero status provided that the mathematical relationship between the different factors of multiplication and product result is true.

It is, therefore, an object of the invention with regard to checking multiplication by dividing to perform this checking operation with a minimum of time and the above is preferably carried out by operating the machine in the manner just described.

It is a still further object of the invention to check the operation of the dividing mechanism when it is utilized to check multiplication and this is attained by checking the zero status of the accumulator which receives the dividend in which dividing computations are carried out.

More specifically it is an object with the invention to concurrently check the zero condition of the accumulator in which dividing operations are carried out and also the accumulator utilized for checking purposes.

As premised hereinbefore, dividing computations are preferably checked by multiplying certain of the factors and checking the quotient and remainder result. This object the invention is carried out by the adoption of a simple checking mechanism by means of which the checking of the computation can be directly obtained immediately upon the completion of the multiplying computation. Preferably in carrying out checking of the factors and result of dividing computations by multiplication, the multiplying operations are carried out in the normal manner and the product result is entered in a checking accumulator which previously received the dividend value. Certain entry receiving devices are utilized to receive the remainder and by the addition of the remainder to the product amount in the checking accumulator and the subtraction of the dividend value, such accumulator should be restored to a zero status if the mathematical relationship between the values of the dividing computation is true and if the multiplying operation was correctly carried out.

The dividing machine shown herein and also in the application above referred to is capable of taking into consideration the decimal point of the factors of division and accordingly the quotient and remainder result will be indicated on the record card with regard to the decimal point. In carrying out the checking of division by multiplying computations, the various values involved are denominationally entered in the accumulators with regard to their decimal point. This is necessary because the remainder might either be a whole number or a decimal and its entry in the checking accumulator must accordingly be shifted and entered in the proper denominational positions. This is also true of the dividend result which is entered in the checking accumulator as well as the quotient result which is preferably utilized as the multiplicand and in which multiples thereof are built up as a prerequisite to multiplying computations.

While both of the aforementioned checking mechanisms have been shown in connection with the composite multiplying and dividing machine shown in the aforementioned Bryce application, it is to be understood that such incorporation is merely illustrative and not restrictive. It is to be further understood that the present showings are merely the preferred embodiments of the invention and by obvious modifications the same objects may be carried out without, however, departing from the spirit of the invention.

While the disclosure herein shows the utilization of both a dividing mechanism and a multiplying mechanism for determining the accuracy of the results of the reverse form of calculation, the claims herein are restricted to the feature of the utilization of a dividing mechanism for checking the product result derived from a previous multiplying operation. The feature of utilizing the multiplying mechanism for checking the quotient result obtained by a dividing operation is claimed in the divisional application, Serial No. 458,206, filed September 14, 1942.

Other objects of the invention will be pointed out in the following description and claims and illustrated in the accompanying drawings, which disclose, by way of example, the principle of the invention and the best mode, which has been contemplated, of applying that principle.

In the drawings:

Figs 1 and 1a taken together with Fig. 1a to the right of Fig. 1 show a somewhat diagrammatic view of the various units of the machine and the drive therefor.

Figure 2:
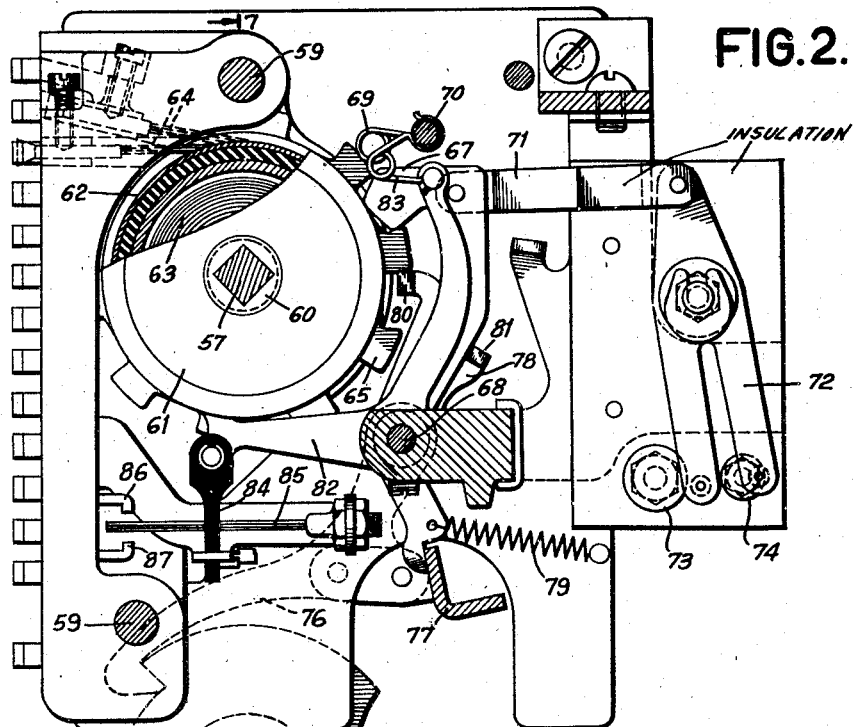
Fig. 2 is a detail sectional view of the accumulator taken along the dividing line between two adjacent denominational orders of such accumulator for entry receiving devices.
Figure 3:
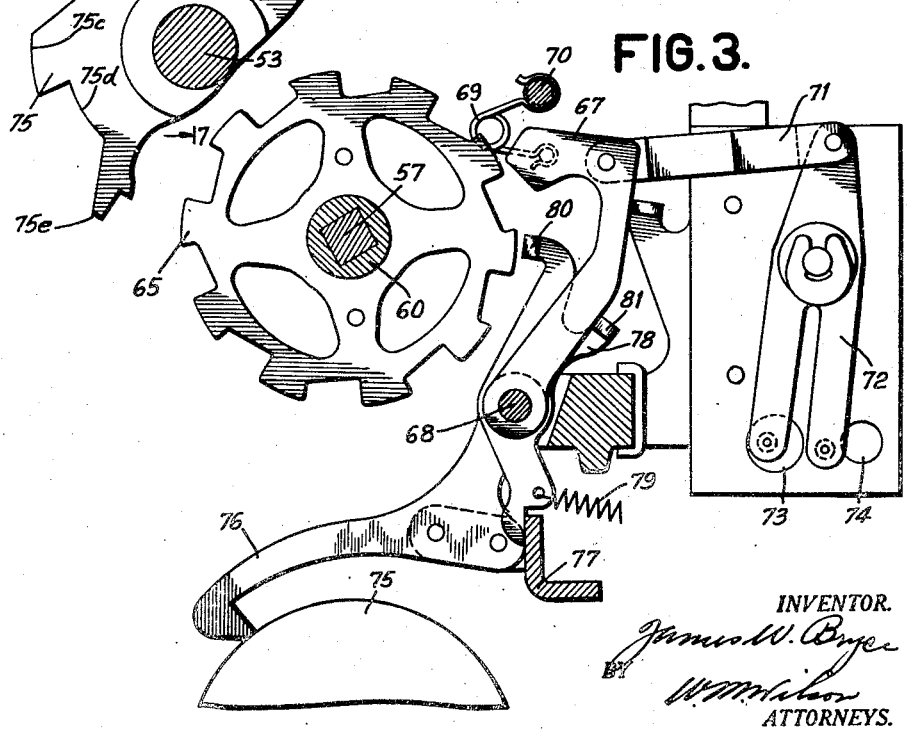
Fig. 3 shows certain parts of Fig. 2 in a different position.
Figure 4:
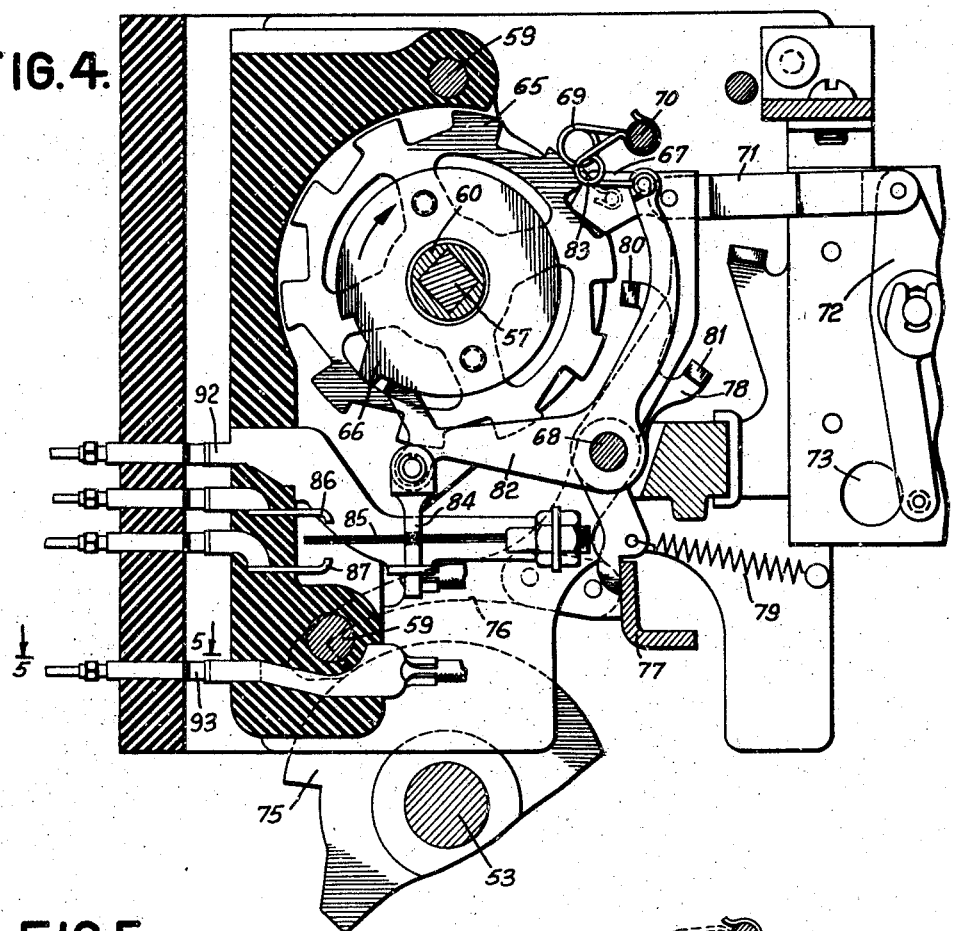
Fig. 4 is another sectional view of one of the accumulator units. The view being generally similar to Fig. 2 but taken on a somewhat different vertical plane.
Figure 5:
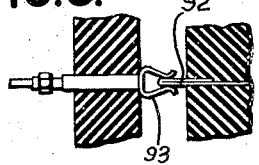
Fig. 5 is a detail view taken substantially along lines 5—5 of Fig. 4.
Figure 6:
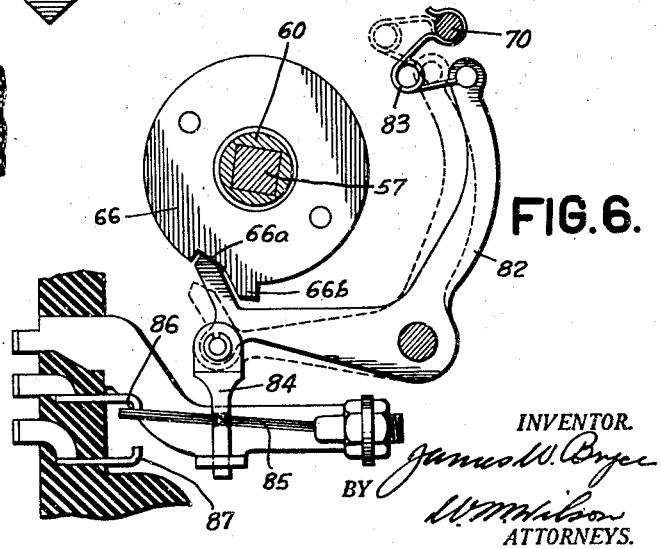
Fig. 6 is a detail view of the tens transfer or carry cam and related parts.

Fig. 7 is another fragmentary sectional view of the accumulator unit of Fig. 2. The view being taken substantially along lines 7—7 of Fig. 2 looking in the direction of arrows. This view in particular shows the readout structure in cross section.

Fig. 8 is an elevational outside rear view of the accumulator unit of Fig. 2. The view being taken from the left of Fig. 2 looking to the right.

Figure 9:
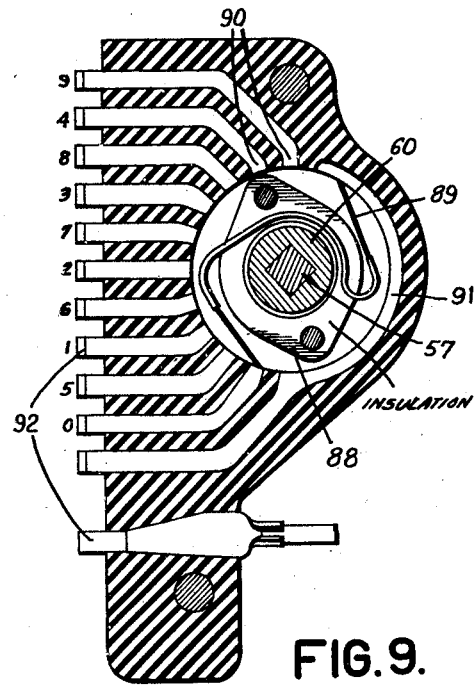

Fig. 9 is a detail view of the readout commutators and wiring to the plug prongs. This section is taken substantially on line 9—9 of Fig. 8.

Figure 10:
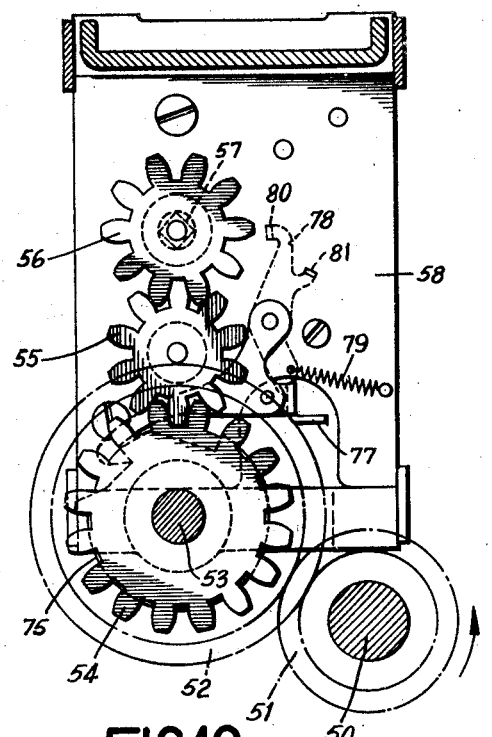

Fig. 10 is an outside view of the accumulator taken from the right of Fig. 8 and looking to the left and which view shows the gear drive for the accumulator unit.

Figure 11:
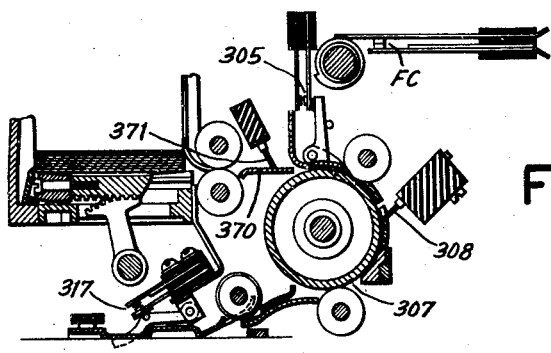

Fig. 11 is a somewhat diagrammatic view showing the card handling and sensing section of the machine. The card handling section is shown diagrammatically in Fig. 1a.

Figure 12:
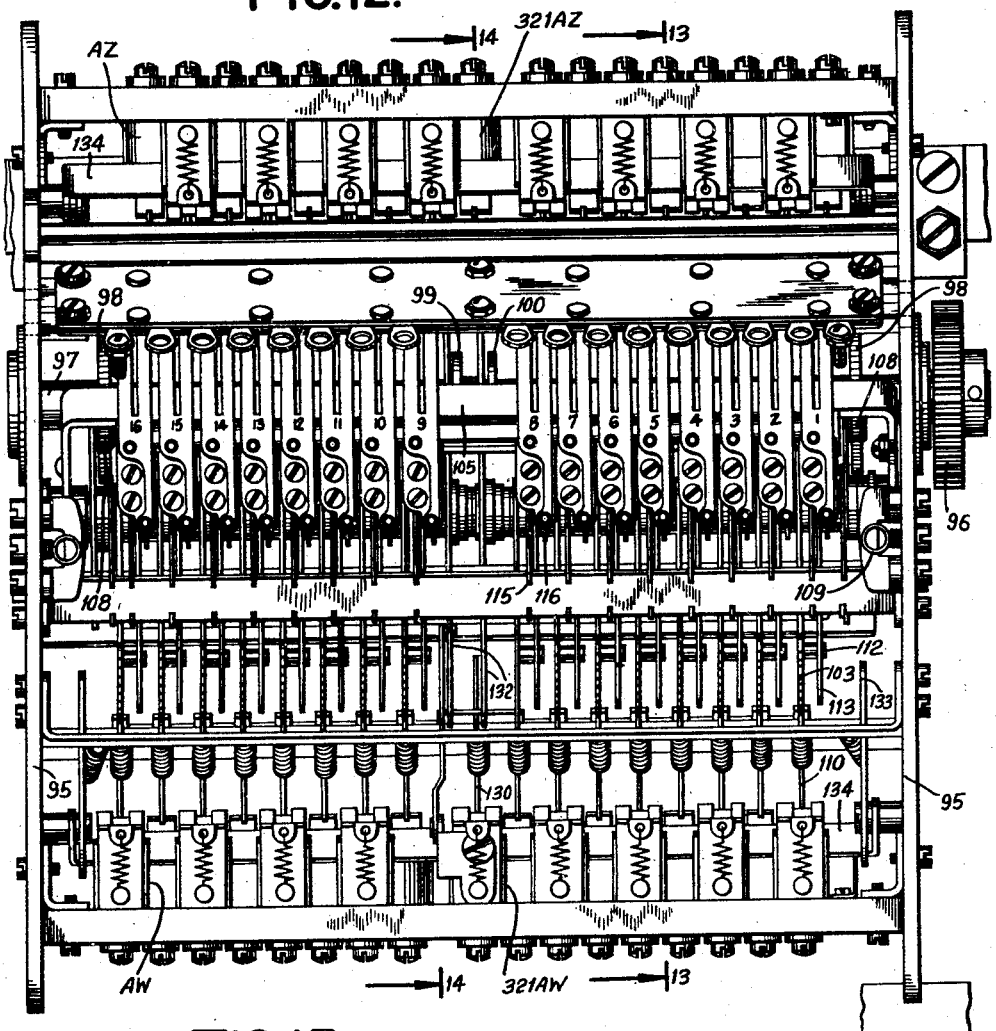

Fig. 12 is a rear elevational view of one of the so-called comparing units of the machine.

Figure 13:
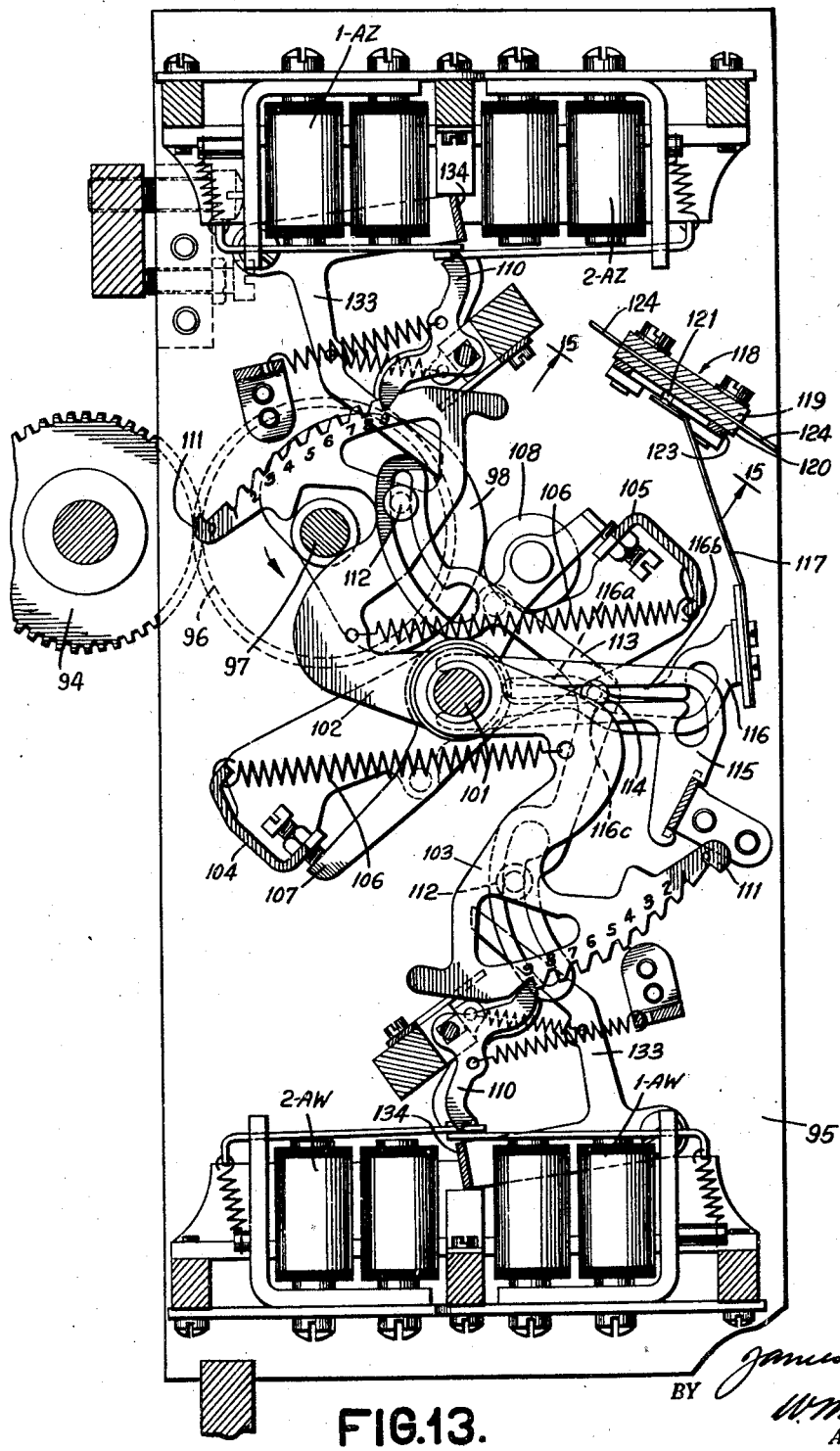

Fig. 13 is a detail sectional view of the parts for one order of a comparing unit. This section being taken along line 13—13 of Fig. 12.

Figure 14:
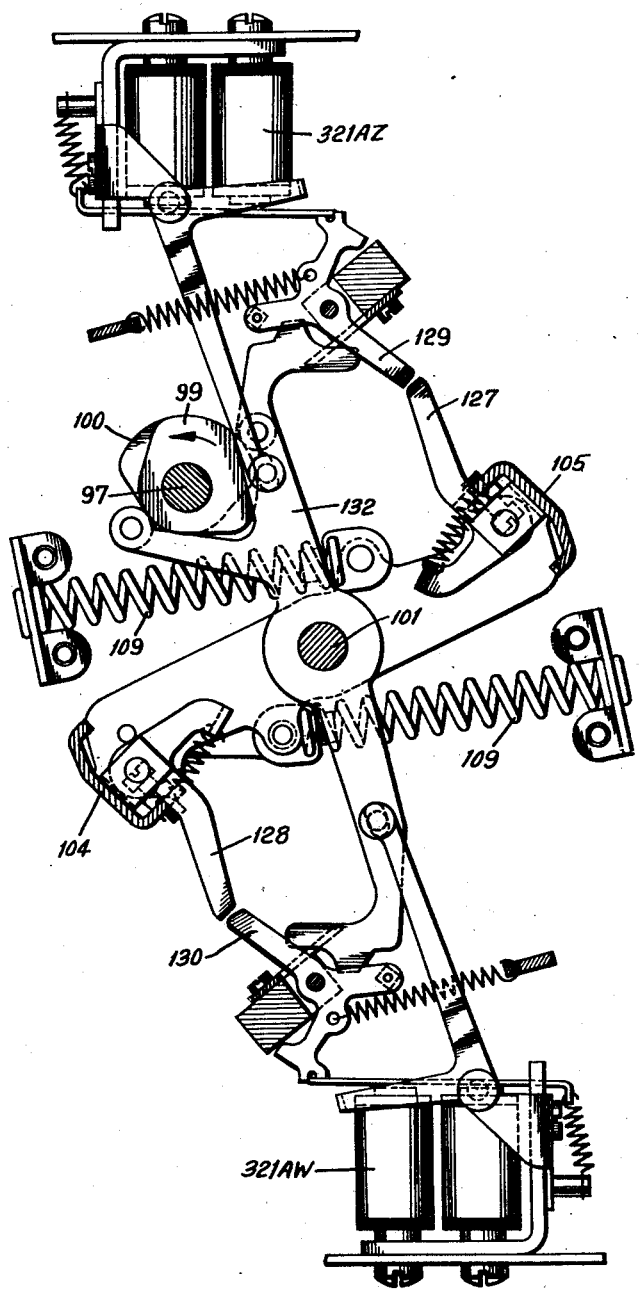

Fig. 14 is another detail sectional view of certain parts of the comparing unit. This section being taken substantially on line 14—14 of Fig. 12, looking in the direction of the arrows.

Fig. 15 is a fragmentary detail view of the comparing commutator and brush devices of the comparing unit. The view being taken substantially on lines 15—15 of Fig. 13, looking in the direction of the arrows.

Figure 16:
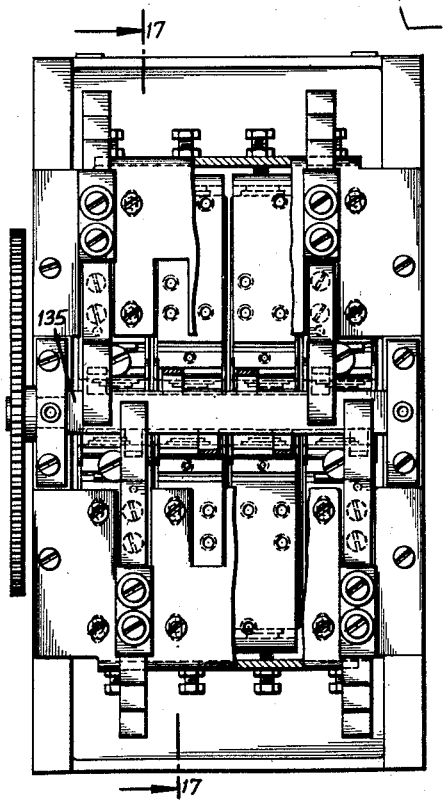

Fig. 16 is a top plan view of an electromechanical multicontact relay unit which is used in the machine for cycle control and pre-sensing control purposes.

Figure 17:
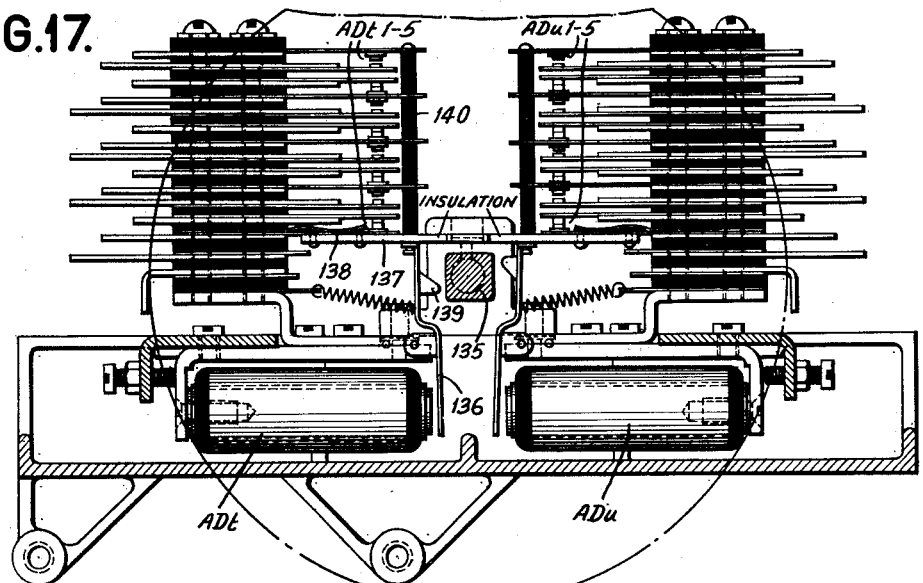

Fig. 17 is a detail sectional view of such unit. This section being taken substantially on line 17—17 of Fig. 16.

Figure 18:
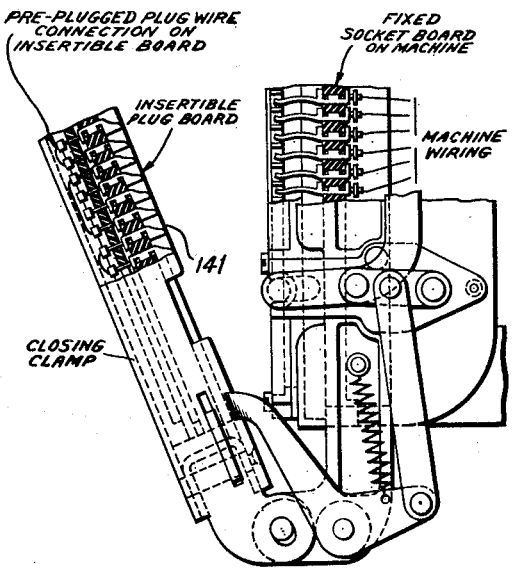

Fig. 18 is a detail view of one of the automatic plugboard units used in the machine. This view showing the plugboard unit in open position.

Fig. 19 is a cam timing diagram showing the timing of the various CC cams.

Fig. 20 is a cam timing diagram of the FC cams.

Fig. 21 is a cam timing diagram of the XC cams.

Figure 23:
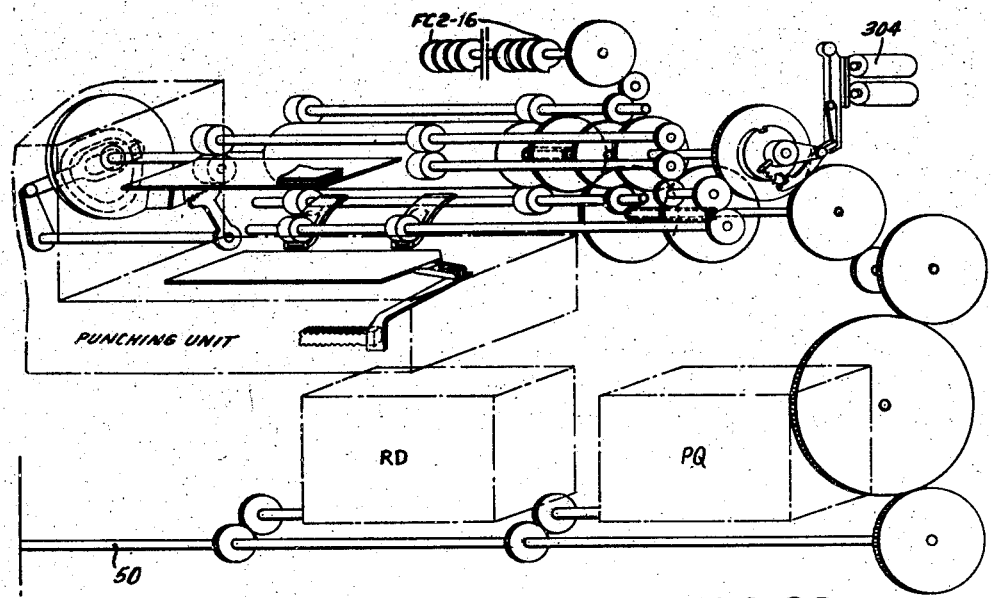

Figs. 22a to 22h, inclusive, taken together show the complete circuit diagram of the machine when arranged as shown in Fig. 23.

Fig. 23 shows the manner in which Figs. 22a–h should be coordinated.

Figs. 24 through 27 show the plugging on the insertible plugboard for different calculations which the machine is adapted to perform.

Accompanying each figure is a suitable descriptive legend designating the computation for which the plugboard is plugged.

Figs. 28 through 31, inclusive, are sequence of operation diagrams for different typical calculations which the machine is adapted to perform. These diagrams show the successive cycles of operation for these different computations. The respective diagrams also bear suitable designating legends indicating the type of computation to which the diagram relates.

Figs. 32 through 35, inclusive, show the flow diagrams of typical computations as performed by the machine. These show illustrative problems and the manner of effecting entry into the various receiving devices and how the machine performs different typical computations. Each diagram is accompanied by a designating legend giving the particular calculation which is illustrated in the diagram.

Machine drive

Figure 1:
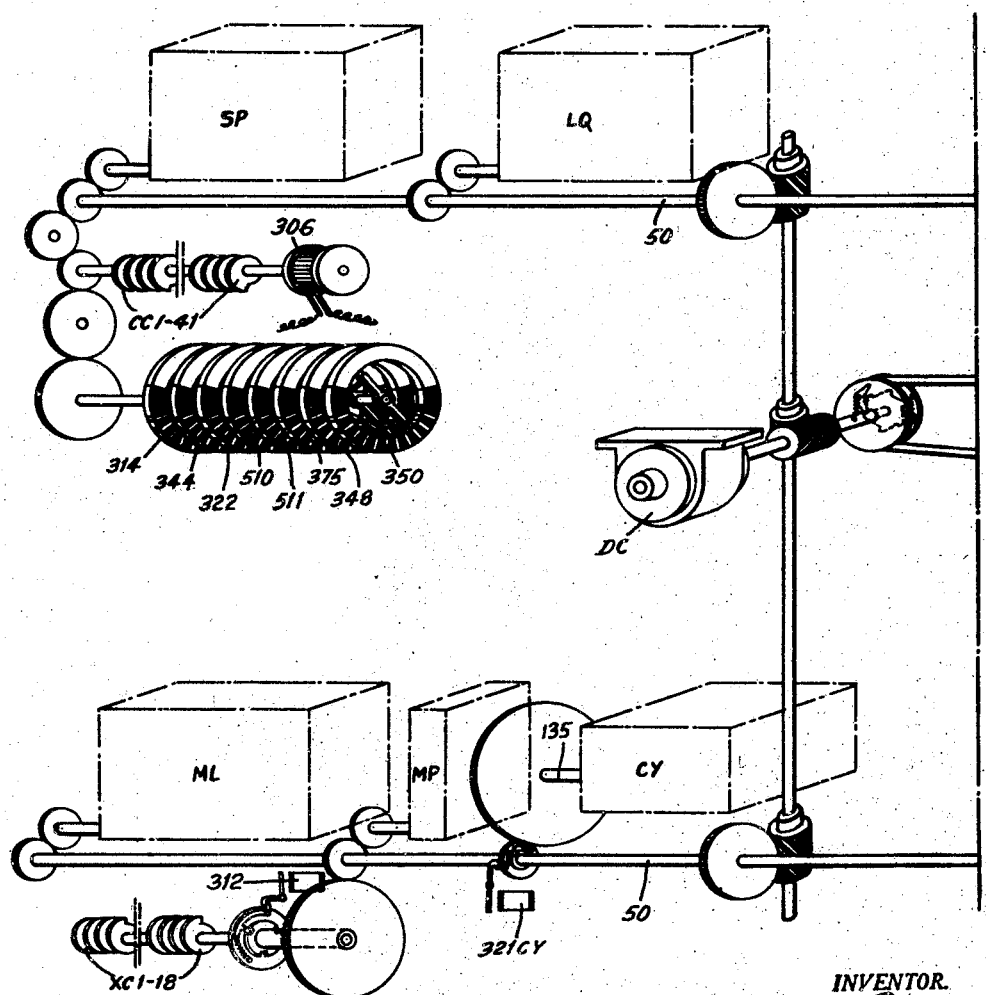
Figure 1A:
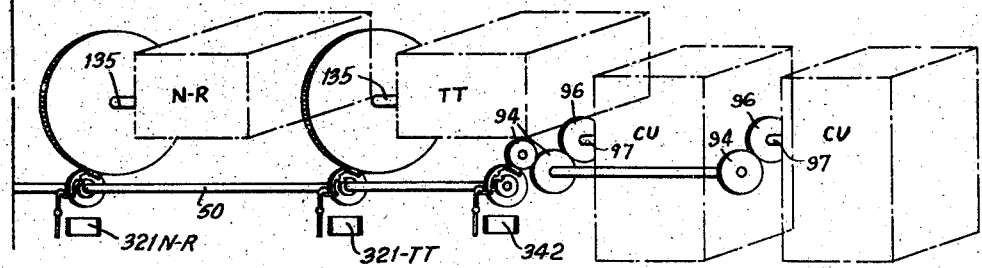

Referring first to Figs. 1 and 1a, in general the machine comprises six accumulating units which are respectively designated SP, LQ, RD, ML, MP, and PQ. It may be explained that the unit ML contains accumulators and readouts from which all of the nine digital multiples of the divisor or multiplicand can be derived depending upon whether the machine is used for division or multiplication. The MP receiving device receives the multiplier upon entry in the multiplying calculations. Such unit is not utilized in dividing. The accumulating units LQ and RD receive components of the products upon multiplication with the final product formed in LQ and upon division LQ receives the quotient amount and RD the dividend amount. When checking these calculations the PQ accumulator replaces the LQ in the above mentioned operations. The SP unit is utilized on checking computations. The various accumulating units are driven by the gearing delineated from the driving motor M. The machine is also provided with a direct current generator DC. The card handling and feeding section of the machine is of customary form like that shown in Daly Patent No. 2,045,437 and is driven in the usual manner. The FC cam contacts (FC2—16, Fig. 1a) are also driven in the customary manner in synchronism with the drive of the card handling section of the machine. The units designated CY, NR, and TT are electromechanical relay set-up units of the general construction shown in Figs. 16 and 17. Each of these units is adapted for reset from the constantly running drive shaft by the customary one revolution clutch arrangement. The reset magnets for the units are respectively designated 321CY, 321NR and 321TT. The comparing units are as shown diagrammatically at CUCU. These comparing units are of the forms shown in Figs. 12 to 15 inclusive and such units are adapted to be driven from the drive shaft by the use of the well known one-revolution clutch, the clutch magnet being designated 342. Also driven from the main drive shaft are the usual CC cams designated CC1—41 and the impulse distributor 306. In addition there are also provided eight impulse emitters which are designated 314, 344, 322, 510, 511, 375, 348, and 350. Referring now to the XC1—18 cam contacts, such cam contacts are driven from the drive shaft through a one-revolution clutch which is controlled by magnet 312. The drive side of the one-revolution clutch receives its drive from the main drive shaft through the gearing shown which drives the XC cams one revolution for each three revolutions of the main drive shaft.

For clarity and subsequent description, the upper and lower drive shafts will be given a like reference numeral 50.

Accumulators and entry receiving devices

As stated, the SP, LQ, RD, ML and MP units are accumlators of electromechanical type. These accumulators are identical in construction except for the number of readout sections, some accumulators having four readout sections and others having two. The accumulator which is here employed may be of various types known in the art, more particularly the type of accumulator having electrical transfer and electrical reset. Suitable accumulators of this type are shown and described in United States Patent No. 1,834,767 and suitable readout structure may be that shown in United States Patent No. 2,062,117 employing the electric reset of Patent No. 1,834,767, modified as per British Patent No. 422,135.

The present invention involves transfer total arrangements according to British Patent No. 422,135.

While the aforesaid accumulators are of suitable type for use with the present invention, preferably a preferred accumulator is of the form illustrated and described in Lake and Pfaff application Serial No. 182,402, filed December 30, 1937; now Patent No. 2,232,006, dated February 18, 1941. This accumulator will now be briefly described.

In lieu of driving the accumulator by the customary jaw clutch, the present accumulator which is shown in Figs. 2 to 10 inclusive, is of the form in which a magnetic clutch is used for driving the accumulator elements. Suitable circuit making and breaking devices are provided to enable the differential clutch action to take place at a differential time of the cycle depending upon the time of sensing. These devices cause the magnetic clutch to remain in action until a definite point in the cycle whereby definite amounts of rotation of the accumulating wheel are obtained in accordance with the inithat a make before break action occurs as the lever shifted. It will be understood that the clutch magnet is energized at a differential time shifted to engage contact 87 and will remain in such position until after the carry portion of the cycle when the high portion 75e of cam 75 will cause lever 76 to rock lever 82 back to the position of Fig. 4.

Readout structure

Attached to each accumulator wheel is the readout mechanism. It will be understood that any desired number of brush sections can be provided driven by a single accumulating wheel 65 (see Fig. 7). According to the present invention in some instances four brush structures are driven by a single accumulator wheel and in other instances two brush structures are driven by a single wheel. Fig. 7 shows the four brush structure arrangement. Such structure comprises a holder 88 of insulating material having a wire brush 89 fitted within a groove in the holder. The groove it will be understood conforms with the general shape of the center part of the brush. In the plane of each brush 88 there are commutator segments 90 and a common arcuate segment 91. Each brush 89 serves to make electrical connection between the related common segment 91 and each of the segments 90 according to the position of the brush upon advance of the accumulating wheel 65. Since the wheel 65 has ten teeth, it moves a tenth of a revolution for each unit entered. Segments 90 are spaced one-twentieth of 360 degrees apart so that the brush 89 stops at the segments in the order in which they are numbered in Fig. 9. In the position shown zero segment 90 is connected with the common segment 91.

The segments 90 and 91 as well as the circuit to the carry brush 85 terminate in beveled contacts 92 (see also Fig. 5) so that ready connection can be made to the unit by means of the bifurcated blades 93.

Comparing units

The comparing units of the present machine are of the form more fully described in the co-pending United States application of Ralph E. Page, Serial No. 117,493, filed December 24, 1936. As shown in Fig. 1a, two comparing units are illustrated, each designated CU. These comparing units receive their drive through the one revolution clutch 342 from the drive shaft 50. Upon energization of the clutch magnet 342 the shafting and gearing generally designated 94 is caused to rotate through one complete revolution. It may be explained that for dividing calculations the comparing unit drive is maintained in constant motion. Such comparing unit is wholly disconnected upon multiplying calculations.

Comparing units will now be more specifically described. Each comparing unit comprises supporting side plates 95 which are secured together by suitable cross members which also afford support for various parts such as magnets, bails and springs. Each comparing unit is provided with a drive gear 96 (see Figs. 12 and 1a). Such gear 96 is fast to the comparing unit drive shaft 97 (see also Figs. 12, 13 and 14). Each shaft 97 has secured to it a pair of bail operating cams 98 and a pair of restoring cams 99 and 100. Suitably secured in the side plates is a cross shaft 101 on which are pivotally mounted in interspersed relation two series of sectors, one of which is designated 102 and the other of which is designated 103 in Fig. 13. It will be understood that there is a pair of such sectors 102 and 103 for each denominational order in which comparison is to be effected. The sectors are adapted for pivotal rocking movement on the supporting shaft 101 and timed rocking movement is imparted to the sectors by bails 104 and 105 which bails are each connected to their respective sectors by springs 106, which normally draw the sectors against the respective bails 104, 105 when the latter are in normal position.

Rocking movement is imparted to the bails by bail actuating levers 107 (one of which only is shown in Fig. 13). Each of such levers carries a cam follower roller 108 which cooperates with a cam 98. The cam follower rollers 108 are maintained in cooperation with cams 98 by means of springs 109 which are attached to the bail arms and to a fixed support as shown in Fig. 14. Differential movement of the sectors is determined by magnetically tripped stop pawls 110 (see Fig. 13). Such stop pawls are normally latched by their related magnet armatures out of the path of the ratchet teeth on the sectors. The comparing magnets are generally designated AW and AZ. It will be understood that the AZ magnets control the related upper sets of sectors 102 and the lower comparing magnets AW control the movement of the lower sectors 103. For compactness of construction the magnets are disposed in a somewhat staggered relation, which will be apparent by inspection of Fig. 12. In Fig. 13, the two lower comparing magnets 2AW and 1AW are adapted to control two adjacent sectors one of which is behind the other.

Upon energization of a comparing magnet such as 1AW at a differential time its armature will release the stop pawl 110 which will swing under the influence of its spring to engage the sector ratchet and differentially stop it in a position corresponding to the differential time at which an impulse is received to energize the comparing magnet. In Fig. 13 the sector 103 is shown as stopped at the "9" index point position and likewise the sector 102 is also shown stopped at the "9" index point position. In the event that there is no energization of a comparing magnet the stop pawl 110 will stop its related sector at the "0" index point position due to the high shoulder 111 beyond the zero position.

Each sector 102 and 103 carries a pin 112 and each of these pins extends through slots in a differentially floating link 113. Each differential link has a pin 114 carried thereby and extending therethrough. Each such pin 114 is slidably guided for in and out movement with respect to the shaft 101 by means of a slotted member 115. Also cooperating with each pin 114 is a member 116. Member 116 has a cam slot portion 116a comprising a straight portion, another straight portion 116b and a connecting sloping portion 116c. The relation of parts is such that if sector 103 has the same setting as sector 102, for example at the "9" index point position as shown in Fig. 13, the pin 114 will remain at the center in the sloping cam portion 116c. Under this condition there will be no movement of the arm 116. On the other hand when pin 114 is caused to move to the right as is the case when sector 102 moves to a greater extent than sector 103, then member 116 will be rocked upwardly or counterclockwise about 101 as a pivot. This counterclockwise movement of 116 occurs when the amount set in sector 102 is less than the amount set in sector 103. On the other hand when the amount set in sector 102 is greater than the amount set in sector 103, the pin 114 will move to the left or into the 116a cam slot portion of 116. This will cause clockwise swinging of 116 about 101 as a center.

By the above mechanism for any order of the comparing unit it is possible to compare two numbers in a given order and to get three selective settings of 116. One setting is made when the members are equal in which case there is no movement imparted to 116, and it remains in the center position. The other conditions are in upward or downward displacement of 116.

It will be understood that in order to provide for comparison of multidenominational members that there are a pair of sectors 102 and 103 for each order and further that there is a member 116 for each order. Each member 116 has secured to it a brush contact bifurcated wiping member 117 (see Fig. 15). In Fig. 15 there are shown four wiping members 117. The two to the extreme left are in non-shifted or middle position. The second from the right is in upper position indicating that its sector 103 has moved to a less extent than its related sector 102 and the extreme right hand wiping member is in down position, indicating the reverse sector condition.

Suitably mounted upon the side plates in cooperation with the brush members 117 is a comparing commutator generally designated 118. This comparing commutator comprises a base plate 119 and a face strip 120 of insulating material supported by other strips of insulating material 121. Suitable fastening rivets secure the parts together and secured to the face of 120 are common contact strips 122 and 123. Located between the strips 119 and 120 are a series of terminal plates 124 having portions which extend beyond the edges of the commutator for circuit connections. Parts of terminal plates 124, to a certain extent, resemble triangles with their points extending to the right, note the dotted line extension in Fig. 15. Carried on the face of the strip 120 are a number of contact plates 125, each of which is connected to a related terminal plate 124. The contact strips 122 and 123 are serrated and arranged so that the serrations pass each other and extend into the spaces between the contact plates 125. The ends of the serrations of 122 and 123 and between 125 are blocks of insulating material 121 having contact rivets 126 which connect with the respective terminal blocks 124.

It may be explained that the comparing commutator is sectionalized for making comparison of three orders with three orders. With the setting shown for the three brushes to the extreme left in Fig. 15, the circuit will come in at the wire marked "In" to block 124. It will extend through 125, through the brush 117, thence to plate 122 and out on the circuit labeled "DR Less Than DD." However, assume that the right hand brush is in the middle position. In this event, the circuit would extend from the "In" wire to contact block 125, through brush 117, through the segment 126 of the next order to the left, thence through contact block 125, through the brush 117 of this order, again through 126 and 125 pertaining to the next order, through the brush 117 of this order, through the block 126 and 125 and out on the "Out equal" wire. On the other hand assume the right hand 117 brush of the three order unit in down position. The circuit comes in on the "In" wire, through the contact block 125, through the brush 117, is then completed through the lower serrated member 123 to an outline labeled "DR Greater Than DD."

With reference to the comparing commutator, it may be explained that the first brush from the right in any group which has moved off from the central or equal position effects the control. For example, assume that the third brush 117 from the left in Fig. 15 is in middle position and the second brush from the left is in upper position, then in that event the circuit would be completed from the "In" line, through the terminal block 124, through block 125, through the brush 117 in say the hundreds order, through spot 126, through block 125, through brush 117 to contact plate 122 and out. In short, it may be stated that it is the highest order shifted brush which is controlling for purposes of comparison.

In the use of the comparing units it is desirable to set up one side of the comparing unit once and then hold the setting and it is also desirable that the other side of the comparing unit be set up, then restored and set up again for a following comparing cycle. In order to provide for this operation certain ball movement controlling mechanisms are provided, this will now be described.

Referring to Fig. 14, it will be noted that the ball 105 is provided with a spring pawl 127 and that ball 104 is provided with a spring pawl 128. Arranged to cooperate with 127 and 128 are pawls 129 and 130 which pawls may be considered as normally having the latched position as shown. Upon clockwise swinging of bails 104 and 105 the pawls 127 and 128 first yield and ride upon the face of pawls 129 and 130. When the end of the ball movement is reached, the pawls 127 and 128 snap into the position shown, thereafter both bails 104 and 105 will be latched against return movement. If it is desired therefore to retain the setting of an upper sector 102 (Fig. 13) magnet 321AZ (Fig. 14) is left deenergized. So long as this magnet is left deenergized, the previous setting of sector 102 or a plurality of such sectors will be retained.

Referring now to the lower sector 103, it is desired that this sector be reset on each comparing cycle. Accordingly, magnet 321AW (Fig. 14) is energized. Upon the attraction of its armature, pawl 130 will swing under the influence of its spring in an anti-clockwise direction out of intercepting relation with pawl 128. Accordingly, ball 104 can have an anti-clockwise restoring movement to restore the sector or sectors 103 cooperating therewith.

Arms 132 (Fig. 14) are oscillated by cams 99 and 100 once each machine cycle and such arms are provided for the purpose of knocking off the armatures of magnets 321AZ and 321AW whenever any armature has been tripped and such frame is also adapted to restore the pawls 130 and 129 to their latched position. When the bails 104 and 105 are swung counterclockwise to restore the sectors, the pawls 110 (Fig. 13) ride up on the smooth high parts of the sectors beyond the nine ratchet tooth position and thus displace the pawls out of the line of the ratchet teeth. At about this time the leading edge of a ball such as 104 engages a pivoted armature restoring member 133 and rocks it clockwise to displace the ball 134 and therefore knock off the armatures and relatch the stop pawls 110.

Electromechanical relay unit

Referring to Figs. 1 and 1a there are three electromechanical relay units which are generally designated CY, NR and TT. These units are identical in construction, except for the number of contacts and only one of them will be described. Each unit has a drive shaft 135, the drive shaft is adapted to make one-quarter of a revolution for each revolution of the main drive shaft 50 when the related one revolution clutch (for example that controlled by magnet 321CY, Fig. 1) is operated.

Referring now to Figs. 16 and 17 the shaft 135 is suitably journalled as shown and intermediate the journals the shaft is provided with a square cross-section as clearly shown in Fig. 17. In general the contact operation of this unit is as follows: Each relay unit comprises the required contacts which may include normally closed contacts, transfer or shift contacts and normally opened contacts. Each set of contacts has a tripping magnet associated therewith. Such tripping magnets are AD$t$ and AD$u$. Upon energization of either of these magnets their contacts will be tripped so that they shift to reverse position from that shown. Such contacts thereafter remain in such shifted position until the shaft 135 makes one-quarter of a revolution, whereupon the cam contacts are mechanically restored to their initial position. Such contacts are then latched in such position. The rotation of the shaft 135 also mechanically knocks off the armatures and also mechanically restores the contacts to their initial position.

The details of these electromechanical relay units form the subject matter of a copending application of James M. Cunningham, Serial No. 135,503, filed April 7, 1937.

Referring to Fig. 17, AD$t$ is one of the tripping magnets. Cooperating therewith is a spring retracted armature 136 which has its upper portion in contact with a latched piece riveted to an insulating strip 137 to which the lowermost contact blades are riveted. Suitable springs such as 138 bias lowermost contacts and the spring 137 downwardly. The insulating strip 137 extends along and overlies the square shaft 135. It will be self-evident that upon energization of a magnet AD$t$ related contacts will shift to reverse position and remain in such position. Thereafter, upon one-quarter of a revolution of shaft 135 one square corner of the shaft will first abut the insulating strip 135 and lift it to upper position restoring the contacts and slightly later another corner of the square shaft intercepts a camming element 139 integral with the armature 136 and positively shifts the armature from the magnet into latching position.

The construction is substantially duplicated for the right hand section of the unit. It will be understood that the upper contacts of a set are shifted by insulating members 140.

Insertible plugboards

In order to quickly shift the machine controls from one status in which it is capable of effecting one type of computation to another status for effecting another type of computation use is made of insertible plugboard elements. This insertible plugboard construction is of a type known in the art and the insertible plug unit is generally indicated at 141 in Fig. 18. Devices of this type are generally known as "automatic plugboards" and a suitable form of such board is shown and fully described in the copending application of C. D. Lake, Serial No. 10,299, filed March 9, 1935. Such automatic plugboard arrangement comprises a series of relative fixed machine sockets to which the fixed machine wiring is connected. Adapted for cooperation with such sockets are plug prongs carried by a replaceable plugboard assembly or unit. Such plug prongs on the replaceable board are in turn connected to plug sockets upon the replaceable board. These plugboard sockets may be in turn plugged up by the operator selectively at will or the entire board may be pre-plugged with a desired set of connections.

The manner in which the replaceable plugboard units 141 are wired and plugged for different computations is shown in Figs. 24 to 27, inclusive.

It may be explained that the plug socket reference numerals used on the circuit diagram will have similar reference numerals to those used on the diagrammatic plugboard views on Figs. 24 to 27, inclusive.

Cam timing diagrams

The cam timing diagrams, Figs. 19 to 21, inclusive are self-explanatory. It should be noted that the CC cam contacts make one revolution per machine cycle. The FC cam contacts of Fig. 20 make one revolution per card feed cycle which comprises two machine cycles. The XC contacts of Fig. 21 make one revolution for three machine cycles. The numbering of the cam contacts shown herein carrying the same designations as the cam contacts in the application of Bryce et al., Serial No. 213,044 have the same timing. Cams which have designating numbers higher than any of the numbers used in the application referred to are extra cam contacts utilized for the operation of certain mechanisms not disclosed in the application referred to.

Multiplying

It will be assumed that a set of record cards are in pace in the supply magazine of the machine. The operator then closes line switch 300 (Fig. 22h). Closure of line switch 300 starts the main drive motor M into operation. Coupled to the main drive motor M is a direct current generator DC which supplies current to the line 301. The operator now depresses start key 302 (Fig. 22d) and a circuit is completed from ground through FC3 contacts, through the F1 contact through the start key 302, through relay coil E to line 301. The relay coil E being energized is maintained energized by a stick circuit through relay contacts E1 and cam contacts FC2. The energization of relay coil E closes relay contacts E2 and a circuit is completed from ground through CC29, through P1, through E2, through JJ2, through stop key contact 303, through the card feed clutch magnet 304, through D1 to line 301. The card is now fed by the card feeding and handling section of the machine and is advanced towards the reading brushes in the usual way. In starting up the machine on the run of cards the start key must be maintained depressed for two card feed cycles or it may be depressed and released and redepressed.

Figure 22C:
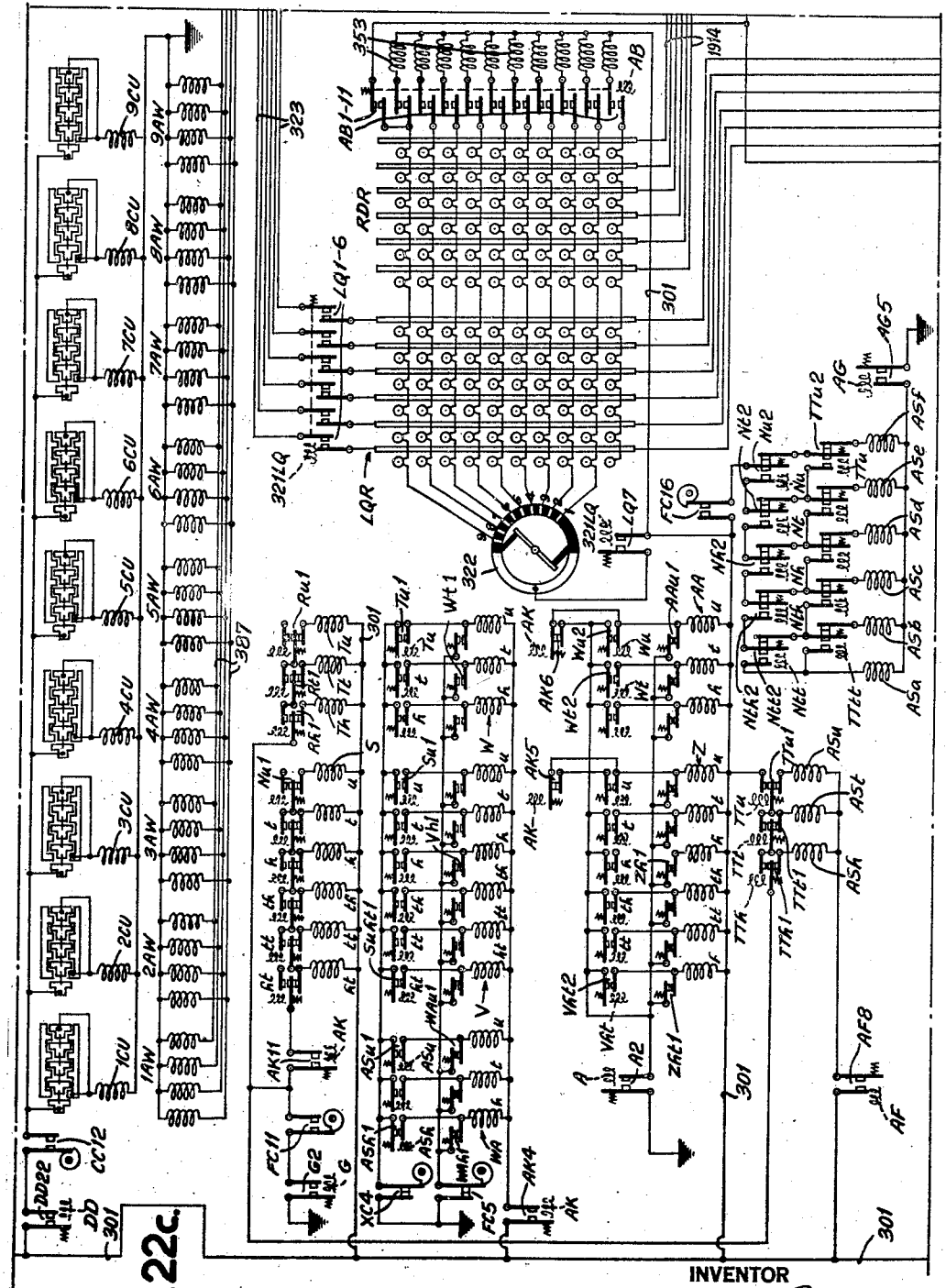

Late in the second machine cycle of the card feed cycle, the card lever contacts 305 (bottom of Fig. 22d) close bringing about an energization of relay coil G. Energizing of relay coil G brings about closure of relay contacts G1 (Fig. 22e), which affords current supply to the FC6 contacts. These contacts upon closure permit current to be supplied to the impulse distributor 306 from which current impulses flow to the card transfer and contact roll 307. The usual regular reading brushes 308 are provided which are connected to plug hubs generally designated 309. The energization of relay coil G also causes the relay contacts G4 to become closed and a circuit will be established not only to the card feed clutch magnet 304 (Fig. 22d) in a manner previously traced but a branch circuit will be established through the G4 contacts, through the clutch magnet 312 to line 301. This clutch magnet releases for rotation the group of XC cams (see also Fig. 1) which upon release function for three machine cycles. During this second card feed cycle relay coil G causes closure of relay contacts G2 (Fig. 22c). The current flows from ground through the now closed G2 contacts through cam contacts FC11 over through contacts Rh1, through relay coil Th, to line 301. The energization of coil Th causes the closure of the group of contacts Th2—4 (Fig. 22a). These contacts remain closed during the entry portion of the feed cycle. Also during the entry portion of this cycle, cam contacts XC1 close to energize relay coil K (Fig. 22d). With relay coil K energized, the K1—12 contacts (Fig. 22a) are closed. The MC amount is then entered into the ML accumulator through the Th2—4 contacts now in closed position down to the now closed K1—12 contacts. By the plug connection between plug hubs 309 to 311 the amount of this multiplicand is entered through contacts Th2—4 into the following multiple receiving devices ML1—2, ML3—6, ML5, ML7 and ML9. On the circuit diagram in Fig. 22a the prefix reference numeral 313 refers to the accumulator magnets of the multiple receiving devices. At this point it may be explained that the multiple receiving devices are commonly used for both multiplying operations and for dividing operations. In multiplication these multiple receiving devices are used to build up and store nine different multiples of the multiplicand and on division the same multiple receiving devices are used to store nine different multiples of the divisor. The multiple receiving devices have been previously described. These are in the form of electrically controlled accumulators with electrical readouts. The ML1—2, the ML3—6 and the ML4—8 receiving devices are provided with doubling readouts in addition to the usual straight readouts. The other multiple receiving devices are provided with straight readouts only. On the entry portion of the feed cycle as explained, the amount of the multiplicand is entered into five of the multiple receiving devices concurrently.

The multiplier is entered into the MP accumulator in the following manner: through the plug sockets 310, (Fig. 22e) through the MP1—3 contacts, now in the position shown, to the 313MP accumulator magnets to ground. The amount of the multiplier is thus entered into the multiplier receiving devices. Coincidentally with this setup of the multiplier in the multiplier receiving device, there is a setup of the cycle controller and this setup is made according to the significant digits in the multiplier amount. Assuming 147 to be the amount of the multiplier, at the "7" index point in the cycle, the ADu (Fig. 22e) relay coil is energized, at the "4" index point the ADt relay coil is energized, and at the "1" index point the ADh relay coil is energized. During the entry cycle controls are set up to cut off the start key control circuit and to also maintain operation of the machine under record card control. Referring now to Fig. 22d, early in the entry cycle cam contacts FC4 close energizing relay coil F. F being energized, it is maintained energized by a stick circuit which is completed through contacts F1 and cam contacts FC3. The shift of the F1 contacts cuts off the circuit to the start key contacts 302. Energization of F closes contacts F2 to maintain a stick circuit for relay coils F and G either through FC3 or the card lever contacts 305.

Building up of multiples

It has been previously explained that on the entry cycle, the multiplicand amount was entered into ML1—2, ML3—6, ML5, ML7 and ML9. In the machine cycle following the entry cycle there occurs the first step in the build up of further multiples. As stated, the ML1—2 device is provided with a doubling readout. This is designated MLR1—2 on Fig. 22b. In this machine cycle cam contacts XC2 (Fig. 22d) close energizing relay coil L. With relay coil L energized, relay contacts L1—16 (Fig. 22a) close and current supply is afforded through the adding emitter 314 (Fig. 22b) as follows: from line 301 through the contacts MM1 now closed, through the contacts ML28, also closed, through emitter 314, then the impulses flow over to the transverse busses of the doubling section of MLR1—2 down through the piloting section of this readout and out via a group of lines generally designated 315 (Figs. 22a, 22b). From these lines at Fig. 22b the impulses flow through the L1—16 contacts (Fig. 22a) which are now closed and ultimately reach the ML3—6, ML4—8, ML5 and ML9 accumulators or multiple receiving devices. This operation will have completed the build up of the three multiple in ML3—6.

On the following machine cycle cam contacts XC3 (Fig. 22d) close energizing relay coil M and causing closure of contacts M1—16 (Fig. 22a). With the emitter 314 in operation the two multiple of the multiplicand is read out from the MLR1—2 and flows via lines 315 and through the M1—8 contacts to the ML4—8 and the ML5 accumulators. This will have completed the building up of the four and the five multiples in these receiving devices. During the same cycle in which these entries are being made, the six multiple of the multiplicand is read out from the doubling readout section of MLR3—6 and such six multiple flows via lines 315, through the M9—16 contacts and finally reaches the ML7 and the ML9 receiving devices. This operation will have completed building up of the nine multiple in ML9 and the seven multiple in ML7. The multiple building up operations are now completed.

During the second card feed cycle the record card from which the factors were read is advanced to the punch tray in the usual manner. Upon reaching this tray, the contacts 317 close (Fig. 22d, right) to energize relay coil D. Energizing of relay coil D shifts relay contacts D1 (Fig. 22d, left) to a reversed position from that shown cutting off current supply from the card feed clutch magnet 304 and providing current supply for the punch rack trip magnet 318, upon closure of cam contacts CC1, with contacts P3 and the relay contacts B1 closed. The relay contacts B1 become closed by the energization of relay coil B (Fig. 22d, right), upon closure of the customary last column punch contacts P5. With the punch rack trip magnet 318 energized, contacts 319 (Fig. 22h) becomes closed and remains latched closed in the customary manner by latch 320 (Fig. 22h). Current supply is then provided for the punch driving motor PM, and endwise card feed occurs in the usual way to feed the card to the first product punching position.

Reset

Figure 22F:
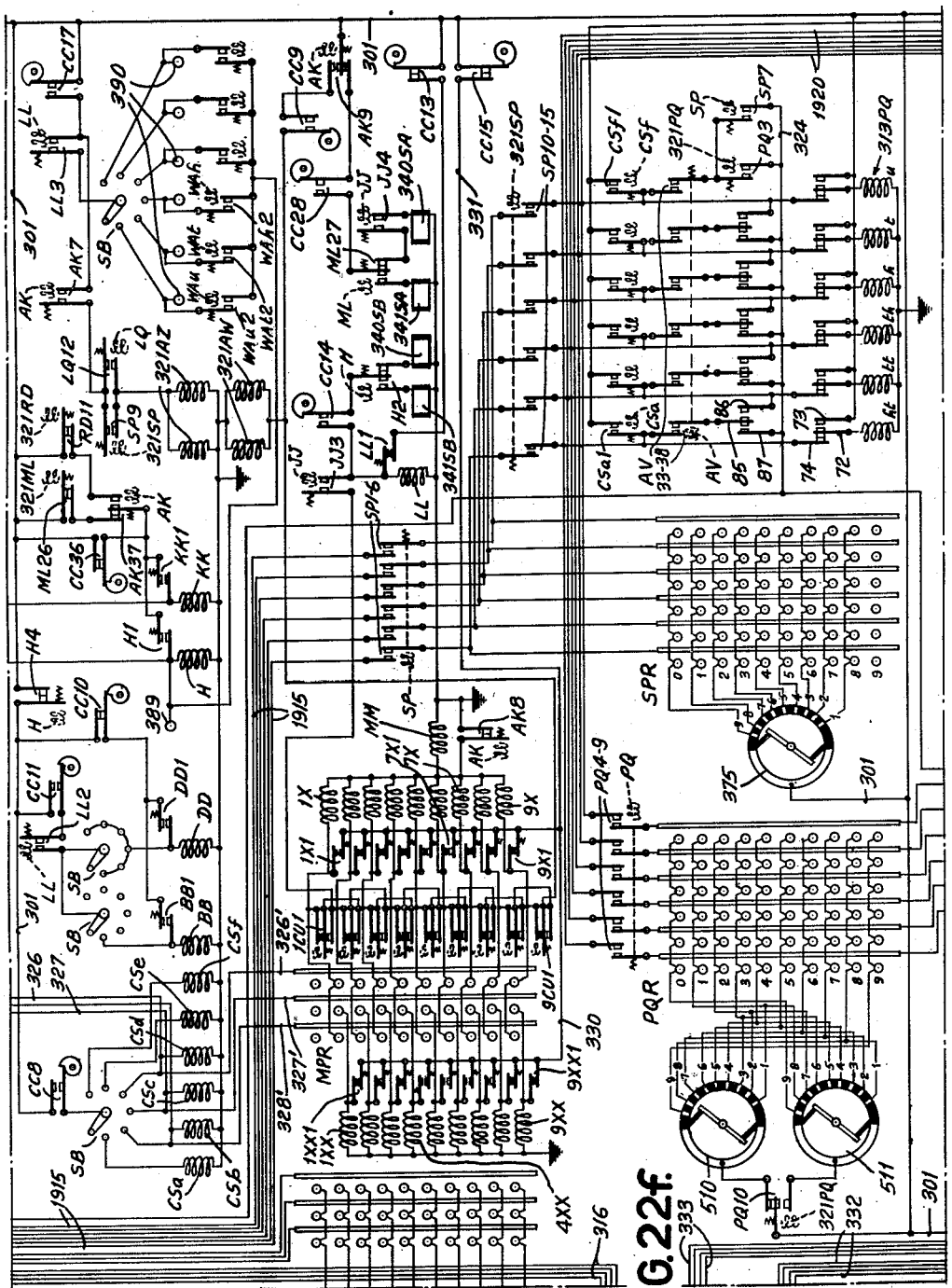
Figure 22G:
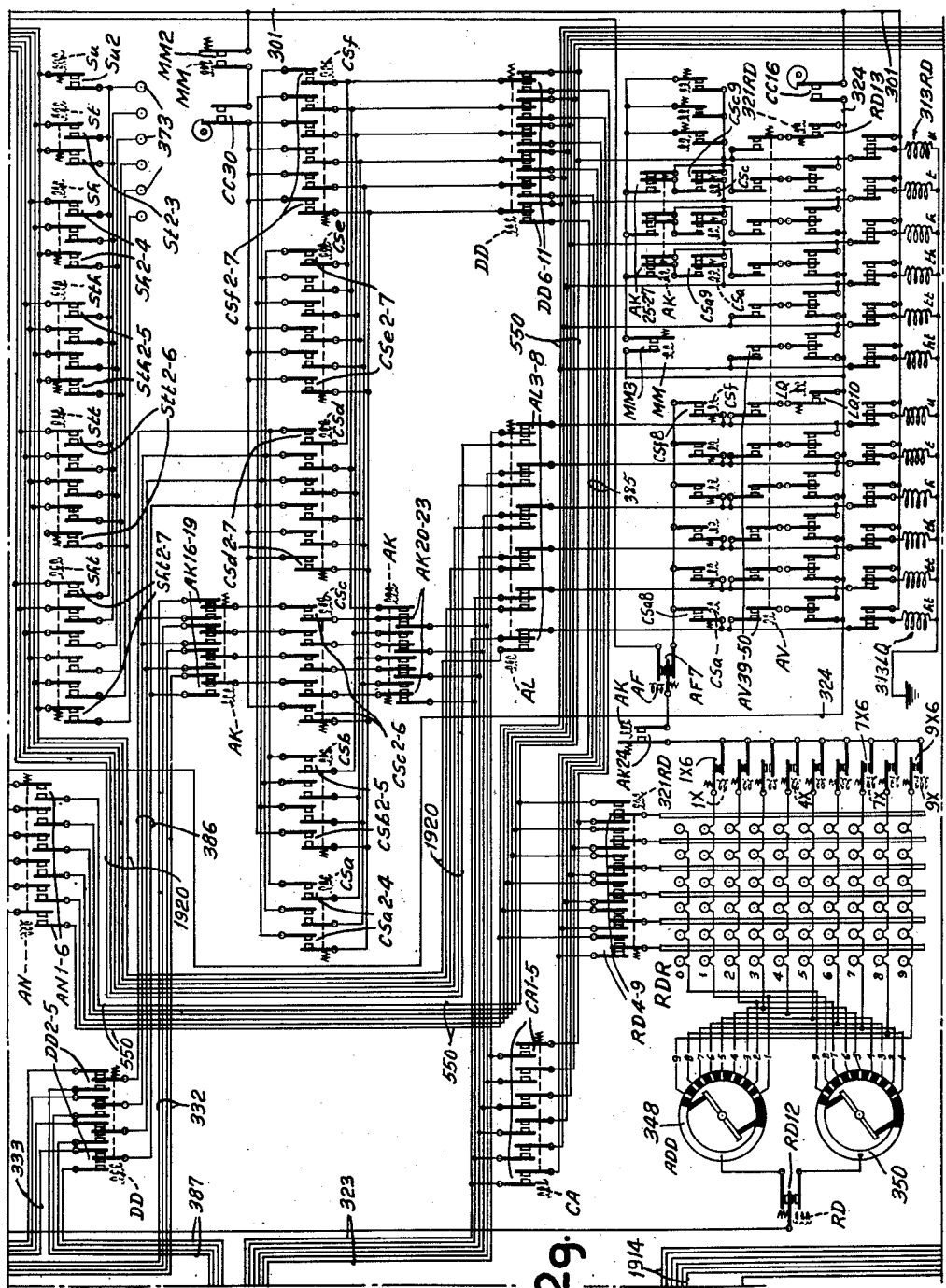
Figure 22H:
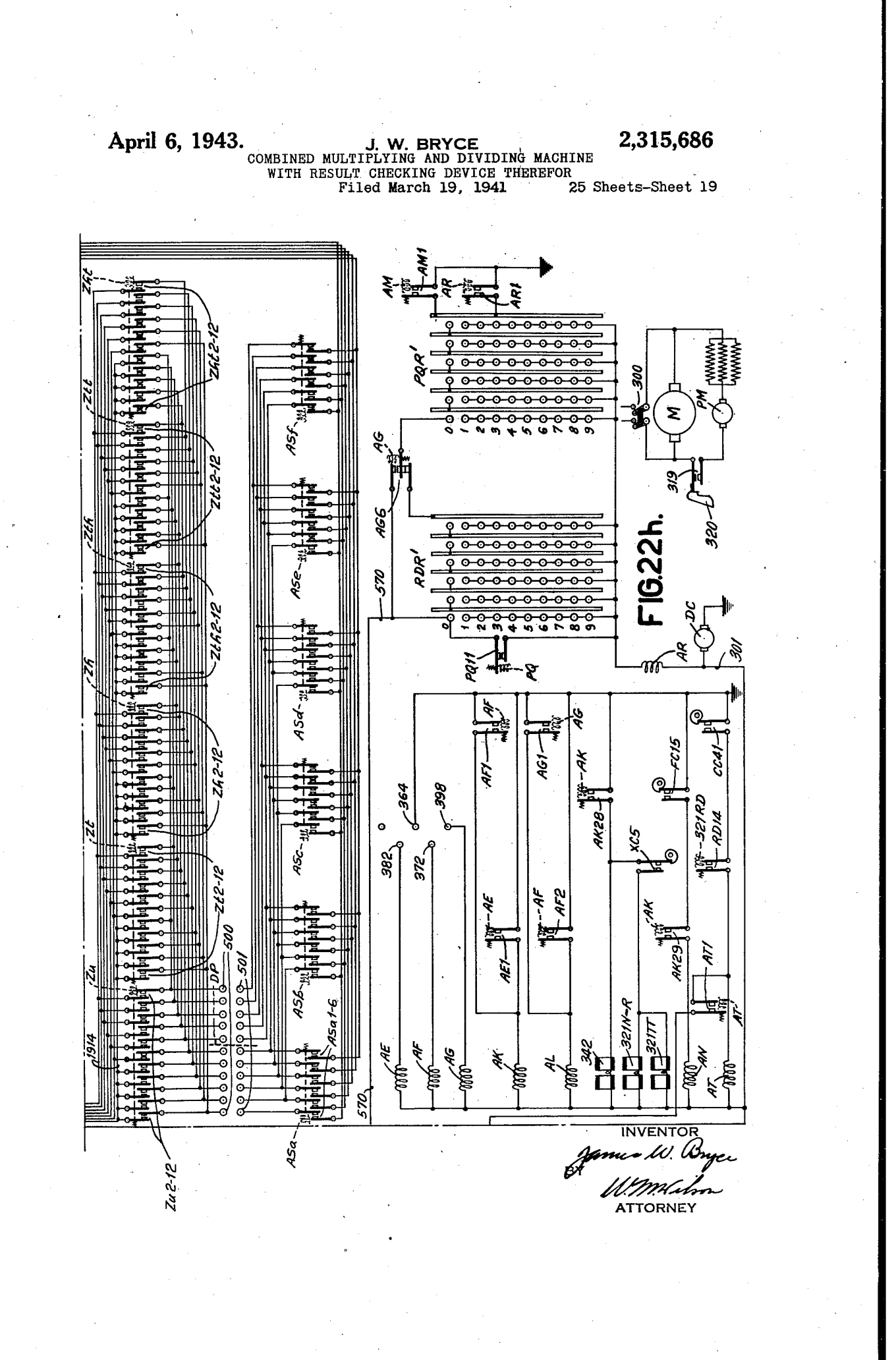
Figure 24:
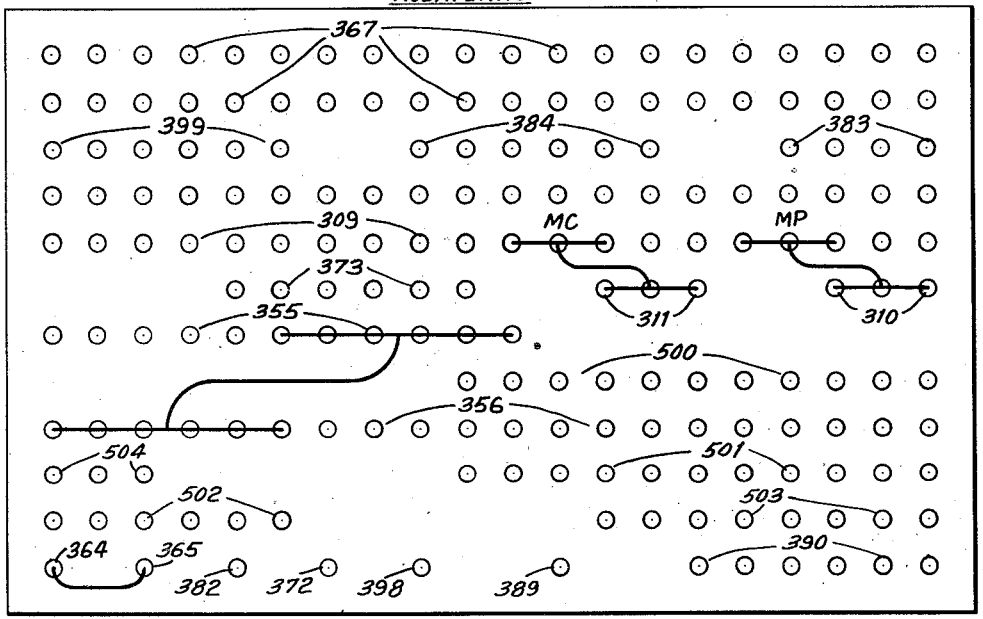

With the relay coils B and D energized in the manner previously explained, relay contacts B2 and D2 (Fig. 22e) become closed. Upon closure of cam contacts CC27 current will flow from the line 301 through these contacts through the relay contacts HH2, through the relay contacts AG3, through the relay contacts AK14, through 321LQ to ground. Reset of the LQ accumulator will then be effected. The present machine employs electric reset and provision is accordingly made to maintain the 321LQ relay coil energized during the reset cycle. This is provided for by means of stick contacts LQ11, such contacts being in a stick circuit including cam contacts CC5. Upon energization of the 321LQ relay, contacts LQ1—6 (Fig. 22c) and contacts LQ7 are now closed; thus supplying current from line 301 through LQ7 to the emitter 322. The emitter 322 is wired complementary to the LQ readouts. Complemental impulses representative of the nines complement of the amount standing in LQ flow through the now closed LQ1—6 contacts through the set of lines generally designated 323 (see also Fig. 22g), through the AI 3—8 contacts down to the 313LQ accumulator magnets to ground (Fig. 22g). By thus introducing the nines complement of the amount standing in LQ the accumulator elements are restored to a "9" position. To bring the accumulator to zero from the all "9" position, an elusive one is entered in units order at the carry time in the cycle. This entry is provided through the contacts LQ10 (Fig. 22g) which are closed in the manner previously explained. This impulse is supplied in the following manner: from line 301, through cam contacts CC16, via line 324 through the LQ10 contact, through the normal carry relay contacts AV—44 controlled by the relay coil AV down to the units order of the 313LQ magnets. The units order is thus advanced one step and the electric transfer devices of the accumulator cause advance of all the other higher orders one step.

It may be explained that as long as the machine is operating cam contacts CC2 (Fig. 22d, right) close once each machine cycle at the carry time in the operation of the accumulators. Such closure of cam contacts CC2 energize relay coil AV. The energization of the coil AV closes all of the associated AV contacts. Since coil AV becomes energized once each machine cycle, the aforementioned relay contacts thus close at the carry time. The closure of these contacts permits the electric carry devices to be effective for performing carry operations whenever they are required in their related accumulators.

During LQ reset provision is made to prevent repetition of such reset. This reset preventing means is provided for as follows: during LQ reset the LQ3 (Fig. 22d, right) contacts are closed. Accordingly, when cam contacts CC6 close, a circuit is provided from ground through the AL2 contacts through LQ9, through CC6, through AK10, through HH relay coil to line 301. Relay coil HH becoming energized establishes its stick circuit through contacts HH1 and the punch control contacts P2 now closed. The relay contacts HH2 open and thus interrupt the reset initiating circuit to 321LQ (Fig. 22e).

Computing operations of the machine, that is to say the adding of selected multiples of the multiplicand into the product receiving device, are initiated by LQ reset. From the LQ9 contacts a branch circuit extends to contacts CC7, H5, through the JJ relay coil to line 301 to energize the JJ relay upon closure of cam contacts CC7. JJ relay once being energized is maintained energized by a stick circuit through JJ1 contacts, ML29 contacts back to ground. The ML contacts open earlier than is desirable so CC18 contacts in shunt with ML29 maintain the stick circuit for the required length of time. Coil JJ is the computing initiating control relay.

In general, the machine has two cycle controllers. One cycle controller derives its control from odd number columns of the multiplier. The other cycle controller derives its control from even number columns of the multiplier. Each cycle controller tries to cause its operation in the minimum number of successive machine cycles and both cycle controllers can operate concurrently. One cycle controller will direct entries into one accumulator and the other cycle controller will direct entry into the other accumulator. In the complete wiring diagram only a three order multiplier is utilized but in practice this multiplier might contain many more orders. The cycle controller, however, is shown with provision for more than three orders, in order that its principles of operation may be disclosed and understood. The general function of this cycle controller is described in greater detail in the Bryce et al. application Serial No. 213,044.

Upon energization of relay coil JJ in the manner previously explained, relay contacts JJ4 (Fig. 22f) are closed and upon closure of cam contacts CC28 a circuit is completed as follows: from line 301 to AK9 through CC28 cam contacts, through ML27, through JJ4, through 340SA to ground, thus energizing the stepping relay magnet 340SA. Upon energization of 340SA the stepping switch arms of the cycle controller are advanced from normal contact position to the first contact position (Fig. 22e). In Fig. 22e, the first contact position of switch SA is that which is in circuit with contacts ADt1—5, ADu1—5. The energization of relay coil JJ will have closed contacts JJ5 (Fig. 22e) and upon closure of cam contacts CC3 and CC26 current will flow from line 301, through CC3, through JJ5, through the ADu5 contact now in closed position as brought about by the energization of the ADu magnet in the manner previously explained, down through wire 326, through the coil CSd of the column shift relay and back to ground. A circuit is also completed through contacts ADt5 through lines 327 to the column shift relay magnet CSc back to ground.

The energization of CSd will close its related column shift contacts shown in Fig. 22g and direct the entry of the multiple related to the units order of the multiplier into the proper columns of the RD result accumulator. The energization of CSc will close its related column shift contacts on Fig. 22g and direct the entry of the multiple pertaining to the tens order of the multiplier and the LQ. Concurrently with the energizing of the above mentioned shift magnets CSd and CSc, current supply is afforded through lines 326' and 327' to the units and tens common segments of MPR (Fig. 22f). With the problem under consideration (see Fig. 32) the multiplier amount is 147 so the brush in the units order of MPR will stand at seven and the brush in the tens order will stand at four. With the brushes in these positions, the brush in the units order will allow current to flow to the 7X multiple selecting relay. The circuit back to ground is through AK8 relay contacts now closed.

The brush in the tens order will permit energization of the 4XX multiple selecting relay. The respective multiple selecting relays X and XX have stick contacts such as 7X1 and 4XX1 which, when closed, establish stick circuits which not only maintain their related multiple selecting relays energized but also maintain the selected column shift relays energized. The stick circuit for the XX relay is via line 330 which extends back to line 301 through line 331 and cam contacts CC15. The stick circuit for the X relays is via line 331 which extends to line 301, through the cam contacts CC15.

With the above mentioned multiple selecting relays energized, the related contacts such as 4XX2—5 and 7X2—5 (Fig. 22b) will become closed and a readout of the four multiple will be permitted from the readout section of MLR4—8, with the entry of such four multiple into LQ. The path of impulse flow from the contacts 4XX2—5 is via a group of lines generally designated 332 (Figs. 22b—22f) which extend to contacts AK16—19 (Fig. 22g) in the position shown and the impulses will flow through these contacts through the now closed CSc2—6 (Fig. 22g) column shift contacts through the AK20—23 contacts in the position shown, through the AL3—8 contacts in the position shown through the 313LQ accumulator magnets to ground. The seven multiple will be read out from MLR7 (Fig. 22b) and the impulses will flow through the 7X2—5 contacts over a group of lines designated 333 (Figs. 22b, 22f, 22g), through the contacts DD2—5 which are in the position shown, wires 386 through the CSd contacts, through the group of contacts DD6—11 in the position shown, wires 550 through the 313RD accumulator magnets to ground.

When CC28 (Fig. 22f) closes a circuit is again completed through 340SA in the manner previously explained through JJ4 contact thus causing the stepping relay to advance the stepping arm one position, then when CC3 and CC26 again close, a circuit will be completed through relay CSb as follows: from line 301 through CC3, through JJ5 through the second step of the SA contact down through the now transferred ADu—4 through the now closed ADh—4 taken chrough CSb to ground. Concurrently a circuit is also completed through CC26 (Fig. 22f) through the transferred ADt4, through the normal ADth3, ADht2, and ADtm1 over through the H relay coil to ground. Also when the circuit was completed through CSb a branch circuit was completed through the MPR readout segment through the 1X (Fig. 22f) multiple selector relay coil, through AK8 to ground. The 1X relay upon energizing sets up its stick circuit through the 1X1 points in a manner previously described. The energization of the H relay closes the H1 points forming a stick circuit as follows: from line 301, (top of Fig. 22f) through ML26 through AK37, as shown on diagram through H1 contact, through the H relay coil to ground. The operation of the 1X relay closes the 1X2—5 (Fig. 22b) relay points and causes entry of the ones multiple of the multiplicand into the RD accumulator in the same manner as the sevens multiple was entered into the RD accumulator, but in shifted relation as effected by the now closed CSb2—5 contacts.

It will be understood that with the foregoing computation, if the multiplicand amount is 358, a seven multiple of that amount would be 2506. The four multiple would be 1432 and the one multiple would be 358. Accordingly there would be current entry of 1432 and 2506 respectively into LQ and RD. 1432 would be entered into LQ in a tens relationship. On this following cycle the ones multiple or 358 would be entered into the RD accumulator in such shifted relationship that in effect the units value will be entered into the hundreds order position. The multiplying computation, so far as entry of selected multiples is concerned, is now complete but it will be understood that with a larger size machine further multiple selecting cycles would follow. Assuming, however, that the computation is complete the machine will now terminate multiple selecting and entering operations and controls will be conditioned for the next step of the computations. This next step involves transfer of the amount in RD over into LQ. During this same transfer cycle, there will be other operations effected as follows: the ML and MP receiving devices will be reset to zero. There will also be a reset of the cycle controller setup unit. During this same cycle in which the reset takes place the stepping switch SA will be restored to its normal or non-advanced position. Near the end of the last mentioned multiple entering cycle, cam contacts CC28 (Fig. 22f) close and again energize 340SA. The stepping switch arms (Fig. 22e) will be advanced to the third contact position. Contacts ADu3 and ADt3 will be in shifted position and ADh3 will also be in shifted relation and all remaining cycle controller contacts will be in non-shifted position. Upon closure of CC3 (Fig. 22e) and CC26 a circuit will be completed through KK relay as follows: line 301, through CC3, through JJ5, down through the SA stepping relay third position, through ADu3, ADh3, ADtt2, ADm1, through KK relay coil to ground. The energization of KK relay sets up a stick circuit through KK1 contacts as follows: line 301 through ML26, through AK37 as shown on diagram, through KK1 through KK relay coil to ground. In the previous cycle H relay was energized so that we now have H3 closed and KK2 closed (Fig. 22e). Upon closure of cam contacts CC27, the MP reset and the ML reset will be initiated, and the cycle controller mechanism will be restored as follows: line 301 through CC27 through AK1 as shown on diagram through H3 through KK2, through 321ML. Energization of the ML accumulator reset coil 321ML sets up a stick circuit for itself through ML25, back through CC5 to line 301. Branching from KK2, through AK3 through the cycle controller reset relay 321CY, the MP accumulator reset 321MP and through a relay coil CA which are in parallel, to ground. The energizing of 321MP sets up a stick circuit for itself and 321CY through the MP4 relay contacts back through the CC5. The CA relay sets up a stick circuit for itself through the CA6 relay points back through CC5. The resetting of the ML and the MP accumulators and the cycle controller has been previously explained. The energization of the CA relay closes the CA1—5 (Fig. 22g) relay points. During the same cycle the RD amount is read or transferred into the LQ accumulator in the following manner: from line 301, through RD12 contacts as shown on diagram (Fig. 22g), through the emitter 348, through the RDR readout 348, through RD4—9 contacts as shown on circuit diagram through CA1—5, through AL3—8, through 313LQ to ground.

After the foregoing operations have been completed provision should be made to terminate the computing initiating control that is, to deenergize relay coil JJ in Fig. 22d. Provision should also be made to restore the cycle controller stepping relay to its off contact position and reset of the RD accumulator should be effected and punching operations would be initiated. Furthermore a new card feed cycle should be initiated. Deenergization of the JJ relay is brought about in the following manner: energization of the 321ML relay will have opened ML29 contact points. With such contacts open and at a later time in the cycle upon opening of contacts CC18 the stick circuit to coil JJ will be open whereupon this relay will be deenergized. This will drop out the computing and initiating control circuits and allow the contacts controlled by relay JJ to return to the position shown in the circuit diagram.

While, as described, the initial stick circuit for KK and H coils is effected through KK1 and H1 and AK37 and ML 26, ML26 later opens at a time earlier than desirable, and preferably CC36 maintains a supplementary stick circuit through KK1 and H1. As shown in Fig. 19 the supplementary stick circuit is maintained to the next cycle.

To restore the cycle controller stepping relay the contacts ML27 (Fig. 22f) are provided. Such contact shifts to a reverse position upon energization of relay coil 321ML and upon closure of cam contacts CC28 (Fig. 22f) the relay magnet 341SA will be energized. The stepping relay then assumes its off contact position. The reset of the RD accumulator is controlled through the ML30 (Fig. 22d) contacts as follows: the energization of 321ML causes closure of ML30 contacts and upon closure of CC38 a circuit is completed through the Y relay coil. The energization of the Y relay coil causes Y1 (Fig. 22e) and Y2 (Fig. 22d) contacts to close. the contacts Y2 effecting a stick circuit for the Y relay through CC37 to ground. With Y1 closed and upon closure of CC27, a circuit is completed through 321RD in the following manner: line 301, through CC27, through AK1 as shown on diagram down through the Y1 now closed, through AK30 as shown on diagram, through 321RD to ground. The 321RD relay sets up a holding circuit for itself through RD10 contact, back through CC5 to line 301 thus causing the RD accumulator to be reset. RD12 contacts transfer to enable impulses to be sent by complemental emitter 350 (Fig. 22g) under control of RDR through contacts RD4—9 now transferred and wires 550 through 313RD accumulator magnets to ground. During the reset of the RD accumulator the punching operation is initiated in the following manner. Upon closure of CC39 (Fig. 22d) a circuit is completed from ground through CC39, through RD2, through AK12 in the position shown, through AL1 in the position shown, through J relay coil to line 301. The energization of the J relay causes J1 contact to close. Closure of J1 contacts completes a circuit as follows: from ground through J1 contact throuh AL8 contact, through AB relay coil to line 301. Also from J1 contact through A relay coil to line 301. The operation of the A relay coil sets up a holding circuit for both the A relay and the AB relay through the A1 contact as follows: from ground through AK13 contact as shown, through PQ, through PQ12, through LQ8, through A1 contact, through A relay coil to line 301, a branch circuit is also traced through the AB coil and the AL8 contact. The energization of AB relay coil closes the AB1—11 (Fig. 22c) contacts which completes the circuit from the LQ readouts to the punch operating magnets 353. The energization of the A relay causes closure of A2 (Fig. 22c) contact and completes a circuit through the AK5 and AK6 contacts to AAu and the Zu relay coils, respectively. The energization of AAu causes closure of AAu1 which sets up a holding circuit for itself through AAu1 back through A2 contact to ground. The Zu sets up a holding circuit for itself in a similar manner. The AAu relay also causes closure of contacts AAu2—12 (Fig. 22d) and the Zu relay causes closure of the Zu2—12 and Zu13—23 (Fig. 22d) contacts. Punching is then effected in the following manner: from ground through AK13 (Fig. 22d) through PQ12, through LQ8, through A1, now closed, through the contact 358, through AL9 contacts as shown to the common of the column selector, through the column selector brush to the column selector segment to corresponding plug hubs 356 then by means of plug wires, through corresponding plug hubs 355, over through AAu2—12, through Zu13—23 up through the LQ readout segment (Fig. 22c) transversely across through the AB1—11 contacts, now closed, through the duplicating magnets 353 to line 301. The energization of selected one of magnets 353 will cause closure of the punch interposer controlled contacts 359 and upon closure of 359 there will be an energization of punch magnet 360.

During the RD accumulator reset, a new card feed cycle is initiated as follows: upon closure of CC20 (Fig. 22d) a circuit is completed from ground through CC20, through RD1, now closed, through E relay coil to line 301. Energization of E relay closes E1 points setting up a stick circuit for itself through FC2. Closure of E2 completes a circuit through the card feed clutch magnet 304 as follows: from ground through CC29 through P1, through the E2, through JJ2, now closed, through the stop key 303, through the card feed clutch magnet 304, through D1 contact as shown to line 301. Also, a circuit is completed through the clutch magnets 312 as follows: from the stop key contact 303, through G4 contacts, now closed, through the clutch magnets 312 to line 301. The card feed and multiple build up cycles follow in the same manner as previously described. Upon completion of punching operations P5 closes energizing relay coil B. Energization of relay B causes closure of B1 contact and completes a circuit through the eject magnet 361. When the following card is fed down into the punch feed, the card lever 317 is again closed completing a circuit through the D relay coil causing D1 contact to be transferred and completes a circuit through the trip magnet 318 upon closure of CC1, causing the punched card to be ejected and a new card to be fed to punching position. With B2 and D2 closed the LQ reset is initiated in the manner previously described. The reset of the LQ accumulator initiates the next computing cycle.

*Regular dividing operations*

On regular dividing operations (see Fig. 34) the various ML devices are utilized to afford all nine digital multiples of the divisor. The dividend amount is introduced into the PQ accumulator and then into the RD accumulator. The successive quotient digits as they are obtained are set up in LQ. The MP receiving device is not utilized on dividing. Generally the method of division which is used involves the concurrent comparing of all of the available digital multiples of the divisor with a comparison portion of the dividend in the dividend receiving device. By such comparison there is a determination of which is the largest multiple of the divisor which is less than or equal to the comparison portion of the dividend. Having made such determination there is a selection of the corresponding quotient digit and such quotient digit is entered into the quotient receiving device LQ. Also the selected largest going multiple of the divisor is subtracted from the comparison portion of the dividend. Further operations then follow for other dividend comparison operations and continue on until the computation is completed.

It may be further explained that if none of the divisor multiples are contained in the comparison portion of the dividend which is being compared there is a new comparison effected immediately with a newly selected comparison portion of the dividend and that there are no idle cycles taken upon either with unnecessary subtraction or for the introduction of a zero or zeros in the quotient receiving devices.

Before explaining the detailed operations of the machine for dividing, it may be explained that to save calculating time on dividing, provision is made to shift the entry of the significant divisor and dividend amounts to the left in their respective entry receiving devices. Such shift to the left is effected in as many columns as possible.

It may be explained that the divisor itself is entered in ML1—2 as far to the left as possible but in the other ML devices which receive entries of the divisor from the card, there is one clear column of each receiving device at the extreme left in order to afford columnar capacity for building up operations. In the dividend receiving device, the dividend entry is made as far to the left as possible. In order to determine the extent of shift of both the divisor and the dividend provision is made for presensing the divisor and dividend fields of the card in a cycle preceding the actual entry cycle.

*Adjusting the machine for dividing operations*

Figure 26:
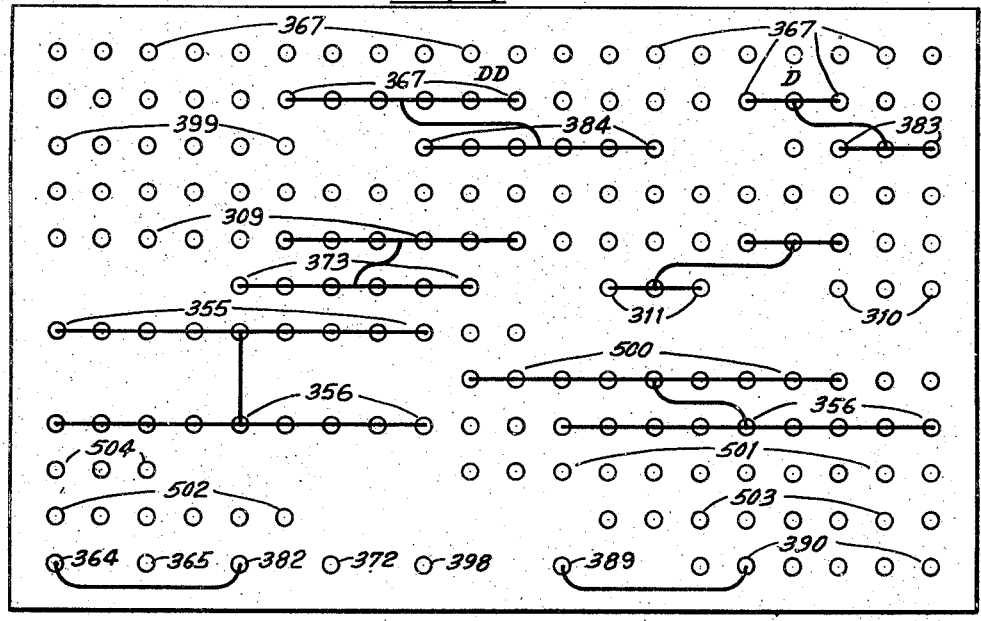

When the machine is to be utilized for dividing the insertible dividing plugboard of Fig. 26 is first properly plugged up or it may be preplugged for a typical computation and thereafter this is inserted in the plugboard unit. On such insertible board, there is a plug connection between socket 364 (see Fig. 22h) and socket 382. With such plug connection established relay coil AE becomes energized and such relay remains energized through all dividing operations. The energization of AE relay causes closure of AE1 contact and completes a circuit through the AK relay. Thus the AK relay will also remain energized throughout all dividing computations. All of the various contacts controlled by the relays AE and AK shift to reverse position from that shown on the circuit diagram.

*Presensing and entry shift controls*

Referring to Fig. 1a, the setup relay units NR and TT are provided which in general construction are similar to the CY unit previously described and shown in Fig. 17. In the NR and the TT units the tripping magnets are designated N and R with suitable suffixes indicating the columnar order and in the TT unit, the magnets are designated TT with suitable order suffixes. It will be understood that these magnets N, R, and TT are generally similar to the AD magnets of Fig. 17. Only the NR unit, however, is used in dividing computations.

The insertible plugboard affords plug connections between sockets 383 (Fig. 22d) and sockets 367 (Fig. 22a) for the divisor field and other plug connections are provided between sockets 384 and 367 for the dividend field.

With cards in the supply magazine, machine operations are initiated by depressing the start key in generally the same manner as explained for regular multiplying operations. During the card feed cycle, when the first card is brought to a position about to be transversed past brushes 308 (Fig. 22e and Fig. 11), this first card will have transversed the advance presensing brushes 371. The card will finally come to rest with such advance brushes on the "11" index point but in route to this point, the brushes will have traversed the "0" index point position of the card. During such transit the advance brushes presense the presence of zeros to the left of the highest order significant digit of the amount in dividend and divisor fields.

Figure 34:
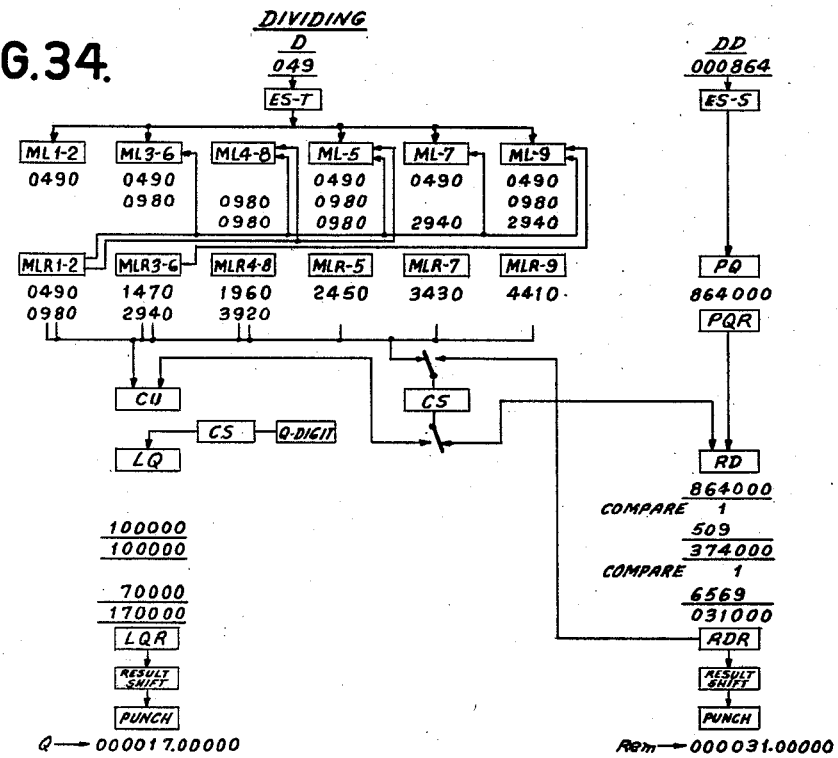

It will be assumed that the machine is performing the division calculation of Fig. 34. With this particular calculation, there are three zeros to the left of the highest order significant digit in the dividend field. Accordingly, on transit of the card past the advance brushes a circuit is established and traced as follows: line 301 (Fig. 22e) through the G1 contact (now closed), via line 369, (Fig. 22e to Fig. 22a) through the cam contacts FC7 (Fig. 22a), which are closed at the time of "0" line of the card passes the presensing brushes. Thence, to common conductor 370, through the brushes 371, through plug connection between socket 367 and socket 384 (Fig. 22d), through the N relays to ground. At the same time a similar circuit is completed through the R relays to ground in accordance with the zeros to the left in the divisor field.

As in regular multiplying operations a further card feed cycle now ensues and the card is traversed past the main sensing brushes. The amount of the divisor is entered into the divisor multiple receiving devices ML (Fig. 22a) and the dividend is entered into PQ (Fig. 22f).

For entry of the divisor amount, it will be necessary to shift the amount one space to the left due to the zero in the hundreds order position. This is accomplished by the fact that the $R_h$ (Fig. 22d) relay was energized as the card traversed the presensing brushes 367. The energization of $R_h$ causes the $R_h 1$ (Fig. 22c) contact to transfer. Thus, when FC11 (Fig. 22c) closes, a circuit will be completed as follows: from ground through G2 contact (now closed), through FC11, through the transfer points, of $R_h 1$, through the normally closed points of $R_t 1$, through $T_t$ relay coil back to line 301. The energization of $T_t$ (Fig. 22c) relay causes closure of the $T_t 2$—3 (Fig. 22a) contacts. Thus the amount 49 instead of entering in the ML receiver units in the units and tens order will accordingly be routed to the tens and hundreds order.

Considering now the entry shift of the dividend amount, of the problem of Fig. 34 which we are using, there are three zeros to the left of the highest order significant digit. Therefore, the $N_{th}$, $N_{tt}$, and $N_{ht}$ coils (Fig. 22d) will be energized. The energization of these relays will cause their corresponding contacts $N_{th} 1$, $N_{tt} 1$ and $N_{ht} 1$ to be transferred and when the cam contact FC11 (Fig. 22c) closes a circuit will be completed as follows: from ground through the G2 contact (now closed), through FC11 cam contacts, through AK11 contact (now closed), through $N_{ht} 1$ (now transferred), through $N_{tt}'$ (now transferred), through Nth1 (now transferred), through Nh' in normal position, through Sh relay coil, back to line 301. The energization of Sh coil causes the Sh2—4 (Fig. 22g) contacts to close. As is shown in the plugging diagram (Fig. 26), the dividend amount is plugged from plug hubs 309 (Fig. 22e) to plug hub 373 (Fig. 22g) and the closure of contacts Sh2—4 causes the amount 864 to be entered into the PQ accumulator in the extreme left hand position, that is the 8 is entered into the highest order position of the accumulator, the 6 in the second highest order, etc.

Summarizing, the foregoing includes a column shift arrangement between the lines coming from the reading brushes through the plugboard and lines which read to the PQ accumulator. Selective column shift will be effected according to the number of zeros preceding the highest order significant digit.

At this point it may be explained that it is necessary to retain a setup which corresponds to the entry column shift control for controlling final recording operations after the division calculation is complete. Such setup is retained on selected V and W relay coils (Fig. 22c). Relay coil Sh was energized and with such coil energized, there will be an energization of Vh which relay is retained energized for controlling shift back upon recording. Likewise, relay coil Tt was energized so there is a corresponding energization of Wt which relay is retained energized for controlling recording.

Referring to Fig. 22c, before contacts FC11 open a circuit is established from ground through XC4 cam contacts, through Sh1 contact, through Vh relay coil, through AK4 contact (now closed) back to line 301. This will energize relay coil Vh and such coil upon being energized closes its stick contacts Vh1, a return circuit being completed to ground through the FC5 cam contacts (now closed). A branch circuit also extends through the now closed Tt1 contact, through the Wt coil, through the AK4 contact (now closed) to line 301. Relay coil Wt once energized closes its stick contact Wt1 and a return circuit extends through the FC5 cam contacts to ground.

After the foregoing operations are effected and during the following machine cycles which ensue multiples of the divisor amount are built up in the various ML devices and since this build up is effected exactly in the same manner as for multiplying, it will not be described in detail.

It should be mentioned that during the second half of a card feed cycle, there is a reset of the N—R and the TT setup units. Late in the first half of the card feed cycle cam contacts XC5 close (Fig. 22h) and a circuit is completed from ground through the AK28 (now closed), through XC5, through both 321N—R and 321TT to line 301. The energization of 321N—R and 321TT releases the respective one revolution clutch (see Fig. 1a) so that any previously tripped N1 and R1 or TT1 contacts may be latched up in order that they may again be tripped near the end of the card feed cycle when presensing of a following card is effected. During the second machine cycle of the card feed cycle, the dividend amount which is entered into the PQ accumulator in shifted relation is transferred to the RD accumulator. This is accomplished in the following manner: when cam contacts FC15 (Fig. 22h) close a circuit is completed through the AN relay coil as follows: from ground through the FC15 cam contact, through AK29 (now closed), through the AN relay coil to line 301. The energization of the AN relay coil causes the AN1—6 (Fig. 22g) contacts to be closed and complete a circuit from the PQ accumulator readout PQR to the RD accumulator in the following manner: from line 301, through the normally closed points of PQ10, to the emitter 510 and impulses are then sent through the PQ readout PQR and down through the AN1—6 contacts (now closed), through the wires 550 (Fig. 22g) and down through the 313RD accumulator magnets thus setting up the dividend amount in the RD accumulator in its proper shifted relationship.

On multiplying operations the 321LQ reset relay was energized to initiate computing operations under the control of cam contacts CC21 (Fig. 22e) through a circuit fully traced. On dividing calculations relay coil AK is energized; accordingly the circuit to 321 LQ is from the CC3 (Fig. 22e) cam contacts, through the now shifted AK1 contact, through cam contact XC17, through the now shifted AK14 contacts, through the 321LQ reset relay coil to ground. A parallel circuit is also completed through AK15 contact and 321PQ. With 321LQ energized reset of LQ occurs in the same manner as explained for multiplying. Such reset brings about energization of the computing initiation relay coil JJ (Fig. 22d) in the manner previously explained. Also upon LQ reset the LQ12 contacts (Fig. 22f) are closed and since the machine is set for dividing contacts AK7 are closed. Current will be supplied through the cam contacts CC17 (Fig. 22f), through the AK7 contacts, through LQ12 contacts, to the divisor reset coils 321AZ, of the comparing units (see Fig. 14). This will release all of the divisor side sections and allow them to be restored so as to be in a position to receive a setting of the divisor multiples thereon.

The machine is now ready to compare the comparison portion of the dividend with all of the divisor multiples in general; this is effected by reading out a comparison portion of the dividend from the RD readout device setting such portion of the dividend up on one side of the comparing units and at the same time reading out from the multiple readouts of the various divisor multiples. Each of which multiples becomes set up on one section on the other side of the comparing units. This operation will now be traced on the circuit diagram.

It will be recalled that during the multiplying operations the comparing units CU were not in operation. In dividing computations, however, such units are placed in operation. This is effected by maintaining energized clutch magnet 342 (Figs. 1a and 22h). This circuit for energizing clutch magnet 342 is completed from line 301, through 342, clutch magnet coil, through AK28 (now closed) to ground. The maintained energization of 342 releases a one revolution clutch to place the drive shafts 94 and 97 of the CU units (Fig. 1a) in timed operation with shaft 50.

A comparing cycle is initiated by the energization of relay coil LL (Fig. 22f) which becomes energized in the following manner: as previously explained the computing initiation relay JJ was energized upon LQ reset. The energization of such relay closed contacts JJ3 (Fig. 22f). A circuit is completed from line 301, through the now shifted AK9 contacts, through the CC9 contacts and through all of the 9CU1, 8CU1, etc. transfer contacts now in the position shown and finally through the 1CU1 contacts, through the JJ3 contacts (now closed), through the LL relay coil and back to ground. LL once energized is provided with a stick circuit extending back to line 301, through stick contacts LL1 and cam contacts CC13. After the foregoing stick circuit is established, cam contacts CC14 close and establish a circuit through the non-shifted H2 contacts, to energize a magnet 340SB of the SB stepping switch. With magnet 340SB energized, the switch arms SB of this relay (Fig. 22f) are stepped to the first contact position.

Shortly after the switch arms of the stepping relay have advanced to this position, a circuit is completed from line 301, through the H4 contacts (as shown), through cam contacts CC8, through the switch arm of the stepping relay, through the CSa column shift relay coil and back to ground. Another circuit is established through the CC11 contacts, through the LL2 contacts (now closed) through the stepping relay switch arm, through the BB relay coil and back to ground. A branch circuit is also established to energize relay coil DD. With coils BB and DD energized they are maintained energized by their respective stick contacts BB1 and DD1. The stick circuit extends back to line 301 through cam contacts CC10, through H4 to line 301.

It may be explained that column shift relay CSa and relay coil DD cooperate to control the readout of the dividend comparison portion from the RD accumulator readout and contacts BB are utilized to control the readout of the various divisor multiples from the MLR readout devices.

The manner in which a comparison portion of the dividend is set up on comparing units will now be described. It will be understood that the comparison portion of the dividend includes a selected number of columns. The number of columns selected is determined at this time by the CSa relay. Referring to Fig. 22g, a circuit is completed from line 301, through RD12 contact as shown, to the add emitter 348. With such emitter in circuit, impulses are emitted through RDR, through the non-shifted RD4—9 contacts via a set of lines 385, through the now shifted DD6—11 contacts, through the now closed CSa2—4 contacts, via lines 386, through the shifted DD2—5 contacts, via lines 387 (see also Fig. 22c), to the dividend side comparing magnets generally designated 1AW, 2AW, etc.

It will be understood that the comparison portion of the dividend is set up in multiple in the comparing units that is to say, there are 9 identical setups of the comparison portion of the dividend in order that there can be a comparison between each setup and the 9 different divisor multiples. In the problem under consideration, the comparison portion of the dividend which was set up is the amount of 864 (see also Fig. 34). The setup of the multiples of the divisor on the other side of the comparing unit sections will now be described.

It has been previously explained how relay coil BB (Fig. 22f) becomes energized, with such relay coil energized, all of the contacts BB2—37 (Fig. 22b) become closed. The add emitter 314 is placed in the circuit in the following manner: from line 301 through the non-shifted MM1 contacts, through the non-shifted ML28 contacts, to the emitter 314. Such add emitter will transmit impulses to and through all of the MLR readout devices and the multiple amounts available on such readouts will be individually transmitted through the now closed BB2—37 contacts, to the various divisor multiple comparing magnets 1AZ, 2AZ, 3AZ, etc. It will be understood that the divisor multiple side of the comparing units will receive setting of the different divisor multiples. The comparing units operate in the manner previously explained to make suitable settings of the brushes upon these comparing conductors.

Having then entered both the dividing comparison portion in a multiple manner into the comparing units and having entered the various multiples of the divisor in the other side of such comparing units, the brush devices of the comparing units receive their settings in the manner previously explained to indicate a greater than, an equal to, or a less than condition.

Referring to Fig. 22c, it will be noted that comparing unit commutators are shown as sectionalized one for each multiple. For each section there is an associated relay coil such as 9CU for a 9 multiple and 8CU for an 8 multiple and so on. The brush section of the comparing devices is adapted to prevent energization of all magnets relating to multiples which are higher than the comparison portion of the dividend, and to permit energization of magnets related to multiples equal to or less than the comparison portion of the dividend.

With the problem of Fig. 34, the only magnet which will be energized is relay magnet 1CU. The circuit energizing this magnet is from line 301 (Fig. 22c), through DD22 (now closed), through cam contacts CC12, through the one's multiple comparing section, through the 1CU relay coil to ground. At this point, it may be explained that if the 4 multiple was the selected multiple, the 4CU coil, the 3CU coil, the 2CU coil and the 1CU coil would be energized and all higher number magnets above 4CU would not be energized.

During a comparing cycle which takes a single machine cycle the setup of the comparison portion of the dividend and of all the divisor multiples is made in the first portion of the comparing cycle. Immediately after the setup is made and in the same machine cycle, testing is effected. Testing is done concurrently for all multiples.

Referring now to Fig. 22f the energization of relay coil 1CU will have shifted relay contacts 1CU1 to the reverse position from that shown and upon closure of CC9, current flows through the contacts 1CU1 to and through the 1X multiple selecting relay and through the MM relay to ground. The multiple selecting relay 1X is maintained energized through stick contacts 1X1. The stick circuit extending back to line, through CC15. It may be mentioned that this 1X relay coil is energized in the comparing cycle, just after the commutator test is made, and that such relay is maintained energized through a portion of the next cycle, to select the one multiple which is to be read out from the MLR1 device, and such multiple is to be subtracted from the dividend comparison portion of the divisor. The 1X multiple selecting relay also selects a related quotient digit for entry into the quotient receiving device LQ. Relay coil MM is maintained energized as long as the 1X coil is maintained energized being in circuit therewith. Previously when subtractive entries were made for resetting purposes the elusive one was introduced into the accumulator to bring the all nine setting of the accumulator wheels to a zero setting, after the complementary entry. In subtracting the divisor multiple, however, the elusive one entry is made during a comparing cycle. In this connection, it is to be noted that such elusive one is only introduced into the RD accumulator in the event that a multiple is to be subtractively introduced into such accumulator in the following cycle. If no such multiple is to be introduced, the entry of such elusive one in the comparing cycle is suppressed.

At the carry time in the comparing cycle, the carry impulse flows from line 324 (Fig. 22g), through the now closed MM3 contacts, through the AK25 contact now in shifted position, through the CSa9 contact now in shifted position to and through the 313RD accumulator magnet in the thousands order. It may be explained that the order in which such entry is made is selected under control of coil CSa in this instance by the CSa9 contacts. Such carry impulses for subsequent steps of the computation thereby will be introduced in other orders.

It has been explained that if there was no going multiple for any given comparison portion of the dividend that no elusive one entry would be made. Such entry is suppressed because of the fact that in the event that no going multiple is found on test none of the X magnets will be energized because none of the ICU to 9CU relays will be energized. With no X coil energized, there will be no energization of coil MM and accordingly with MM deenergized the MM3 contacts will remain open and no elusive one entry can be effected. On a comparing cycle with a relay coil such as ICU energized, the energizing circuit to coil LL (Fig. 22f) will be interrupted since a shift of contacts ICU1 cut off the circuit.

Unless LL is energized, it is impossible to energize the stepping switch magnet SB. All of the SB switch arms remain on their first contact position and inasmuch as contacts LL2 are open even though cam contacts CC11 close, there will be no energization of either BB or DD, however, relay coil CSa will be energized again under control of CC8 on the next machine cycle following the above described comparing cycle. Accordingly, the CSa2—4 contacts (Fig. 22g) will be again closed on the following machine cycle. After the comparing cycle, in such cycle, the relay MM is maintained energized as explained before. Accordingly, relay contacts MM1 (Fig. 22b) are shifted to reverse position from that shown and a circuit will be established from line 301, through the shifted points of MM1 contact to the subtract emitter 344. Such emitter will emit 9's complemental impulses through the MLR1 readout only. Impulses flow out of this readout, through the IX2—5 contacts which are maintained closed by the energization of IX relay during this cycle. 9's complementary impulses respective of the 9's complemental 490 i. e., 509 flow over the lines 333 (Figs. 22f, 22b, and 22g) through the contacts DD2—5. In the position shown over the lines 386, through the now closed CSa2—4 contacts, through the nonshifted DD6—11 contacts and through the proper columnar order of the RD accumulator energizing the proper 313RD magnets. This operation will deduct the amount of 490 from the amount of 864. It will be recalled that the elusive one entry through the accumulator has been previously made and the regular transfer mechanism of the accumulator will provide for transfer to higher orders when required.

*Entry of quotient digit*

With the multiple selecting relay coil IX energized a supplemental contact IX6 (Fig. 22g) will be closed. The RD12 contact is as shown and thus by means of add emitter 348 a one impulse will be entered through the LQ accumulator in the proper order as follows: line 301, through RD12 as shown, to the 348 emitter. Impulses are thus sent out through the X6 contacts. In this instance the IX6 contact, through the AK24 contact (now closed) through the AF7 contact as shown, through the CSa8 contact, down through the 313LQ magnet in the highest order position to ground. Thus causing a "1" to be entered in the LQ accumulator.

On the quotient entering and subtracting cycle inasmuch as the DD relay coil was not energized contacts DD22 (Fig. 22c) are in open position accordingly, even if CC12 contacts close there will be no energization of any of the CU relays. With none of such coils energized, the ICU1, 2CU1, etc. contacts of Fig. 22f remain in the position shown and upon closure of CC9 the current supply is afforded through the JJ3 contact to energize relay coil LL. Relay coil LL when energized will close its stick contacts as before described and there will be another energization of stepping relay coil 340SB under the control of contacts CC14. Accordingly, switch arms of SB will step to the second contact position. After comparison is made with one dividend comparison portion at the time the multiple selecting relays are energized under control of contacts CC9 a supplemental circuit is established through coils 321AW to ground. These coils are the reset coils of the comparing unit corresponding to the comparison portion of the dividend (see Fig. 14). With such coils energized, the dividend comparison side of the comparing units become restored so that a new dividend comparison portion can be introduced therein. It will be understood that the divisor multiple side of the comparing unit retains the divisor multiples during all the deducting and quotient entering operations. Referring to Fig. 34, the RD accumulator now has standing in it the remainder amount of 374000. There is now to be another comparison operation and with such comparison operation there is a different comparison portion of the dividend selected for comparison. In Fig. 34, it will be noted that the first comparison which has been previously described pertains to the three extreme left-hand orders of the dividend and the second comparison pertains to the four extreme left-hand orders of the dividend. There must accordingly be a column shift to take a different comparison portion of the dividend from the RD receiving device.

It has been previously explained how the SB stepping switch was brought to the second contact position. It was also explained that the relay coil LL was energized. With relay coil LL energized, relay contacts LL2 are closed and accordingly upon closure of cam contacts CC11 a circuit is completed through a switch arm of the stepping switch to energize relay coil DD. It will be noted that there is no energization of relay coil BB because the second contact of the stepping switch and those thereafter are not wired in circuit to relay coil BB. With relay coil DD energized, it is maintained energized in the customary manner and following its energization, cam contacts CC8 close and a circuit is established to energize column shift coil CSb. It will be noted that relay coil CSa is not now energized since the switch arm of the stepping switch is in the second contact position. With the coil CSb and relay coil DD energized, their associated contacts shift to a reverse position from that shown in the circuit diagram.

Referring to Fig. 22g, with coils CSb energized, contacts CSb2—5 close and there is a new readout relation established with RDR. The readout relation is now such that the four left-hand columns of RDR are selected for readout and for controlling the entry into the dividend side of the comparing unit. The entry circuit is similar to the one just previously described when the first three left-hand digits of the dividend were entered into the comparing portion of the comparing unit. With the exception that instead of the circuit being completed through the contacts CS$_a$2—4 the circuit is now completed through the contacts CS$_b$2—5.

It will be recalled that the divisor multiples still remain set up in the divisor side of the comparison unit. There is now a further comparison effected into the comparison commutators and circuits of the comparing unit bring about an energization of all of the CU coils from 1CU to and including 7CU and coils 8CU and 9CU remain deenergized. With the seven comparison relay coil energized, the related relay coil 7X (Fig. 22f) becomes energized under the control of CC9, over the circuit previously described but which in this instance is completed through the now shifted 7CU1 contacts to the multiple selecting relay 7X. When relay coil 7X is energized relay coil MM likewise becomes energized in the manner previously explained. Both 7X and MM are held energized through the 7X1 stick contacts.

In the comparing cycle and at the carry time in such cycle provision is made for introducing an elusive one into the RD accumulator, into the fourth order from the left. Such elusive one entry is made generally in the manner previously explained execpt that at this time the CS$_b$9 contacts are in shifted position due to the energization of CS$_b$. With relay coil MM energized, the MM3 contacts are closed and a circuit is completed from line 324 at the carry time through MM3, through the now shifted AK26 contacts through the now shifted CS$_b$—9 contacts down through the hundreds order 313RD accumulator magnet. This will enter the elusive one in such order. On the following cycle the seven divisor multiple is entered subtractively into the RD accumulator and the seven quotient digit is entered in the proper columnar order of LQ.

Referring to Fig. 22b, energization of the 7X multiple selecting relay coil brought about as previously explained will close the 7x2—5 contacts. Energization of relay coil MM will shift MM1 contacts to reverse position and place the 9's complementary emitter 344 in circuit with line 301. 9's complementary impulses flow from the 344 emitter through the MLR7 readout, out through the 7x2—5 contacts to the lines 333, through the non-shifted DD2—5 contacts, through the CS$_b$2—5 contacts, through the DD6—11 contacts to the four left-hand accumulator magnets of the RD accumulator. This will enter the 9's complement of the 7 multiple of the divisor into such accumulator. Concurrently with the foregoing deduction operation, the 7 quotient digit is entered into the LQ. The energization of relay coil 7X will have closed contacts 7X6. Add emitter 348 will now complete a circuit which will extend from line 301 through RD12 in the position shown, through the 7 spot of the add emitter 348, through the closed 7X6 contact, through the AK24 contact now closed, through the AF7 contact in the position shown, down through CS$_b$8, through the 313LQ accumulator magnet in the second order position from the left. This will enter the seven quotient digit in such order of this accumulator.

Referring now to Fig. 34, it will be noted that in the typical example there illustrated, the quotient is only carried out to two significant digits. In this machine due to the method of checking later to be described it is necessary to retain the remainder and punch such remainder in the record card along with the quotient amount. The computation therefore is completed and termination of the computation is to be controlled by the place limiting device which is provided for this purpose.

*Place limiting device*

The insertible plugboard will have provided a plug connection from socket 389 (Fig. 22f) to the second socket 390 (Fig. 22f also) from the left. The second socket from the left is plugged up because the computation is to be carried to two quotient places. If the computation was to be carried to further quotient places, the third or fourth socket 390 from the left would be plugged up. During the multiple deducting cycle just described, relay coil DD (Fig. 22c) will be deenergized and accordingly the DD22 contacts remain in open position and there will accordingly be no energization of any of the CU relay coils. With none of such relay coils energized, the 1CU1 to 9CU1 contacts will remain in the position shown so that upon closure of cam contacts CC9 (Fig. 22f) relay coil LL will become energized. With such relay coil LL energized, the relay contacts LL3 (Fig. 22f) will be closed and upon closure of CC17 a circuit will be completed from line 301 through CC17, through LL3, through the second SB stepping relay switch contact to the plug hub 390 then by plug connection to plug hub 389 through relay coil H back to ground, H being energized closes its stick contacts H1 and the stick circuit is completed back to line, through the AK37 contacts which are transferred, through the RD11 contacts in the position shown to line 301.

The energization of relay coil H will have shifted relay contacts H2 (Fig. 22f) to a reverse position from that shown at a time prior to the closure of cam contacts CC14. Accordingly with such CC14 contacts closed, a circuit is completed through the stick contacts of LL1 of the LL relay coil. Through the CC14 contacts through the transfer points of H2, through the relay magnet 341SB of the stepping switch. With this operation due to the shift of contacts H2, the stepping switch magnet 340SB will be out of the circuit. Energization of the 341SB relay magnet will release the stepping switch and allow it to return to the position shown in the circuit diagram. It may be noted that no circuits are inadvertently established by the stepping switch arms on SB upon restoration because on restoration the H4 relay contacts are in open position. The foregoing restoration of the stepping switch and opening of contacts H4 terminates further energization of the CS magnets, the BB and the DD magnets.

The machine has now reached the stage in its operation in which it is ready to record the quotient upon the record card. The various ML multiple receiving accumulators can now be reset. Before recording is effected there must be a change in the readout relation between LQR and the punch and between RDR and the punch, according to the entry shift which was previously made upon entry of the divisor and dividend amounts. Reset of the ML device is brought about in the following manner: energization of relay coil H (Fig. 22f) in the manner previously explained will have caused closure of relay contacts H3 (Fig. 22e). Upon closure of cam contacts CC3 a circuit is established from line 301 through CC3, through transferred points of AK1, through H3, through AK2 (now closed), through 321ML to ground. The 321ML coil sets up a stick circuit for itself by means of its stick contact ML25 back through CC5, to line 301. The energization of 321ML effects reset of the multiple receiving device. It will be recalled that upon completion of multiplying operations, relay coils AAu and Zu (Fig. 22c) were only energized just prior to recording. On dividing operations, however, due to a shift in the entry of the divisor and dividend there must be a selected energization of the Z and AA coils. With the computation under consideration, the coils which will be energized on dividing are Zh and AAt. The selected energization of the Z and AA coils is brought about under control of the presensing control, which presensing control, it will be recalled, has selected certain energization of W and V relay coils, that is the Wt and the Vh relay coils in the example under consideration.

The energization of 321ML brought about as previously explained will have caused closure of contacts ML31 (Fig. 22d). Upon closure of cam contacts CC40, a circuit is completed as follows: from ground, through CC40, through ML31 through the shifted points of AK12, through the AL1 contact as shown, through J relay coil to line 301. The energization of the J relay causes closure of J1 contact which in turn completes a circuit through the AB and A relay coils as follows: from ground, through J1 contact (now closed), through AL8 contact, through AB relay coil to ground, also branching off from J1 contact, through the A relay coil to ground. Energization of the A relay causes closure of its stick contact A1 which sets up its stick circuit back through RD3 and the shifted points of AK13. Closure of A1 contact also acts as a stick contact for AB relay coil. Energization of the A relay coil also causes closure of A2 (Fig. 22c) contact completing a circuit as follows: from ground, through A2 contact, through Vh2 down through Zh relay coil to line 301. A branch circuit is also established through Wt2 contact through AAt back to line 301. Energization of Zh closes the Zh1 contact setting up a stick circuit for itself back through A2 contact. Likewise, the AAt contacts set up a stick circuit AAt1 contact. Energization of Zh relay also closes contacts Zh2—12 (Fig. 22h) and Zh13—23 (Fig. 22d). Energization of AAt causes closure of contacts AAt2—12. Energization of relay coil AB causes closure of contacts AB1—11 (Fig. 22c) coupling the punch duplicating magnets 353 (Fig. 22c) to the transverse connections of the LQR and RDR readouts (Fig. 22c). As shown in the plugging diagram (Fig 26) plug connections are made from plug hubs 355 (see also Fig. 22d) to plug hubs 356, also from plug hubs 500 to plug hubs 356 at the proper columnar position. Accordingly, a circuit is then completed from line 301, through punch duplicating magnet 353, through contacts AB1—11, through the LQR and RDR readouts down through the (to Fig. 22d) Zh13—23 contacts across and down through the AAt contacts to plug hubs 355 and then by means of plug connections to plug hubs 356, through the commutator segment and the commutator brush to the commutator common section, through AL9 contact in the position shown, through punch contact 358 now closed, through A1 contact (now closed), through RD3 contact as shown, through the AK13 contact in shifted relation to ground. The circuit just described coming from the LQR readout effects punching of the quotient digit. The remainder amount is read out from the RDR (Fig. 22c) readout down through the Zh2—12 contacts, by wires 1914 (Figs. 22c–22g and 22h), to plug hubs 500 (Fig. 22h) thence by plug connection to plug hubs 356 and thence over the circuit previously described.

After all the information stored in both LQR and RDR has been punched in the record card, the card is automatically spaced out to the last column position. Upon reaching said last column position, contact P5 (Fig. 22d) closes and completes a circuit through the B relay coil. Energization of the B relay coil causes the B3 (Fig. 22e) contact to close and complete a circuit as follows: line 301, through CC3, through AK1 in shifted position, through A3 now closed, through B3 now closed, through AT2 as shown, through AK30 in shifted relation, through 321RD. A stick circuit is set up for 321RD relay, through RD10 contact, back through CC5 contact, to line 301. Energization of 321RD initiates reset of the RD accumulator. The energization of 321RD also opened RD3 (Fig. 22d) contact and at a later point in the cycle when CC19 opens the stick circuit for relays AB and A will be opened thus deenergizing the relay coils A and AB, restoring their associated contacts to their normal positions as shown. The energization of relay coil 321RD also opens RD11 (Fig. 22f) to open the stick circuit of relay H but a supplementary stick circuit is maintained through H1 and cam contacts CC36. The energization of 321RD also causes closure of RD1 (Fig. 22d) and when CC20 close, a circuit is completed as follows: from ground, through CC20, through RD1 contact, through E relay coil to line 301. Energization of the E relay coil initiates a card feed for the next calculation.

To prevent successive resetting of the RD acmumulator, the following precautionary circuit is preferably utilized. The energization of 321D causes RD14 contacts (Fig. 22h) to close and upon closure of cam contacts CC41 a circuit is completed through the AT relay coil causing contacts AT1 to be closed and AT2 (Fig. 22) to be opened. The latter opens the energizing circuit for 321RD. The stick circuit for the AT relay extends through the AT1 contacts and by a line which extends from Fig. 22h to Fig. 22d to the P2 contacts to ground.

*Checking the factors and product result of multiplying computations by dividing*

Figure 25:
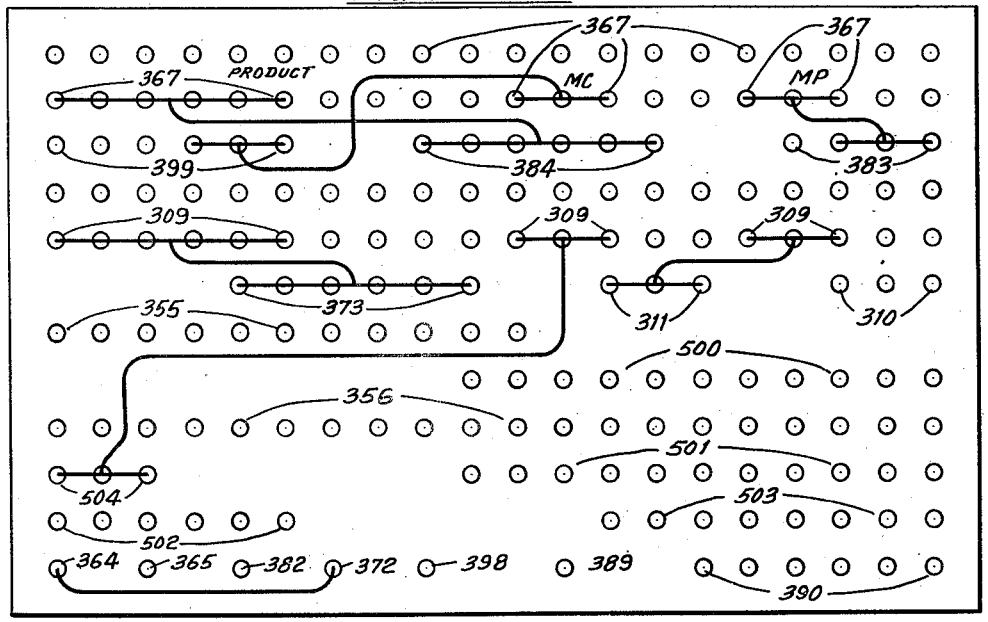
Figure 33:
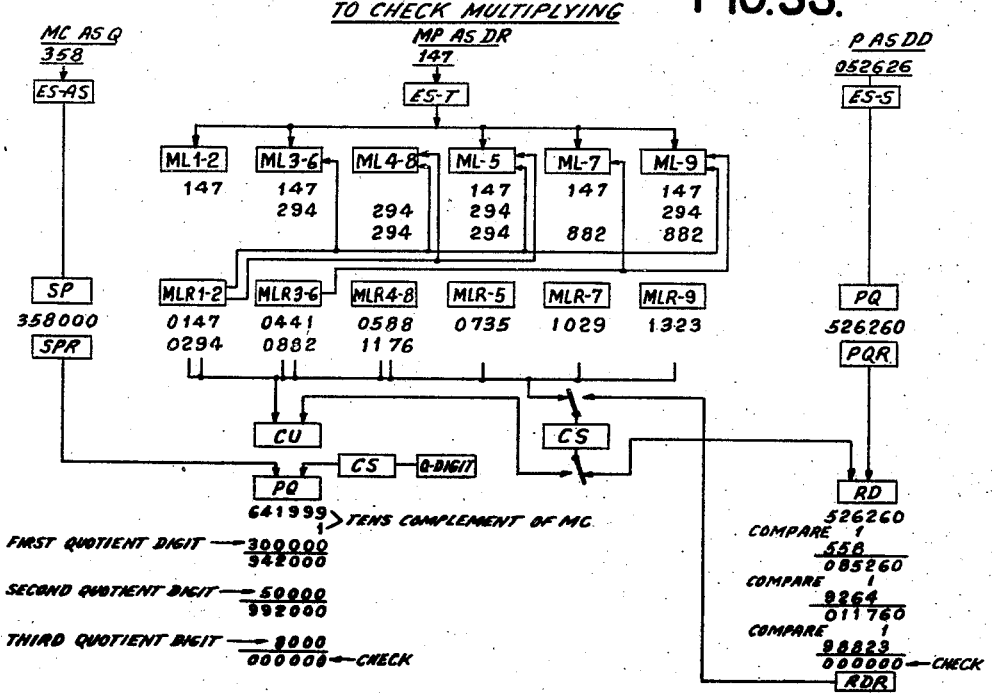

For the purpose of checking the result of a multiplying computation the present machine is provided with means for checking the results by a different type of computation, that is, utilizing the product as a dividend and the multiplier as a divisor and then effecting a dividing operation. The quotient of such computation will equal the multiplicand if both computations are correctly performed. In Figs. 25 and 30 and 33 the procedure followed in such checking operation is shown.

In setting up the machine for checking multiplying computations, the universal plugboard is provided with the plug connections shown in Fig. 25. It will be noted that there are plug connections from the plug hub 364 to the plug hub 372, also plug connections from the multiplicand representing columns of the card identified by MC plug hubs 367 to plug hubs 399, from the MP plug hubs 367 to plug hubs 383, also from the "Product" plug hubs 367 to the plug hubs 384.

After the cards have been placed in the feed hopper, the start key is depressed and the usual card feed operations take place as previously described. During the second machine cycle of the first card feed cycle there is a presensing of the product, the multiplier and the multiplicand values by brushes 371 (Fig. 22a). This sensing is for the purpose of setting up control circuits to shift these amounts to the left in the accumulators for the same reason that the similar shift takes place in dividing. As will be noted from Fig. 33, the product P is now the dividend and the multiplier MP is now the divisor. During the first machine cycle of the second card feed cycle, or the third machine cycle from the start (Fig. 30) the MP amount is entered into the ML accumulators because of plug connections between plug hubs 309 and 311 (Fig. 25). The product amount is temporarily entered into the PQ accumulator (Fig. 22f) because of plug connections between plug hubs 309 (Fig. 22e) and 373 (see also Fig. 22g) and the multiplicand amount is entered into the SP accumulator because of plug connections between plug hubs 309 and 504 (Fig. 22e), being entered in their proper shifted relationship entries in ML and PQ in the manner previously described. The MP amount which is now the divisor is then built up to the 9 multiples of the amount in the manner previously described.

During the second machine cycle (Fig. 30) of the second card feed cycle, or the fourth machine cycle from the start, the amount entered into PQ is transferred into the RD accumulator in the following manner: upon closure of FC15 (Fig. 22h) a circuit is completed through the AN relay, through AK29 (now closed). It might be stated here that the AK relay is energized to close AK29 by the connection from plug hub 364 to plug hub 372 which completes a circuit through the AF relay causing AF1 and AF2 contacts to close. Closure of AF1 contact completes a circuit through the AK relay and closure of AF2 contact completes a circuit through AL relay, thus the AF, AK and AL relays will be energized as long as there is a plug connection between 364 and 372. Thus all of the associated relay contacts will be in their operated position.

The energization of the AN relay causes contacts AN1—6 (Fig. 22g) to be closed which will effect a connection between readout PQR and the 313RD accumulator magnets. A circuit is then completed from line 301, through the normally closed points of PQ10 contacts (Fig. 22f) to the emitter 510, causing impulses to be sent under control of the PQR readout through the AN1—6 contacts (now closed) through the set of wires 550, through the 313RD accumulator magnets to ground, thus transferring the product amount from the PQ accumulator to the RD accumulator, as shown in Fig. 33. The amount in RD is used as a dividend for dividing operations and PQ is later reset to zero.

During the third machine cycle, upon closure of XC17 and closure of CC3 (Fig. 22e), a circuit will be completed through the 321LQ and 321PQ relay coils as follows: line 301, through CC3, through AK1 (now transferred), through XC17, through AK15 (now closed), through 321PQ to ground. Also a branch circuit from XC17, through AK14 contact (now transferred) through accumulator magnets 321LQ to ground. The energization of 321LQ and 321PQ causes the closure of the respective contacts. LQ11 and PQ2 setting up a stick circuit for the corresponding relay coils back through cam contacts CC5 to the line 301.

The energization of 321PQ also causes the closure of contacts PQ4—9 and a transfer of contacts PQ10. A circuit is then closed to the emitter 511 (Fig. 22f) as follows: line 301, through the transferred contacts PQ10 to the emitter 511 which has complementary wire connections to PQR so that 9's complemental impulses are then sent out under control of PQR readout through the PQ4—9 contacts and by connecting lines which run across in Fig. 22f down through the 313PQ accumulator magnets to the ground. This causes the 9's complement of the product amount represented by the readout PQR to be entered in the PQ accumulator. At the carry time, a unit digit representing impulse is transferred to the units order of the accumulator magnets 313PQ by circuit connections described as follows: line 301, cam contacts CC16 (Fig. 22g), line 324 (Fig. 22f), through contacts PQ3, now closed, through the AV38 contacts to the units order magnet 313PQ, to ground. The units carry for the higher denominational orders is automatically taken care of by the normal accumulator carry circuit, thus restoring the PQ accumulator to zero so that it can be later utilized to successively receive the quotient digits derived by successive dividing operations.

The energization of 321LQ (Fig. 22e) also causes the reset of the LQ accumulator during the fifth machine cycle as outlined in Fig. 30 and in a manner which was previously described for both regular dividing and multiplying operations. Energization of 321LQ (Fig. 22e) also initiates the dividing computations by the energization of the JJ relay as described in detail for regular dividing operations. At the completion of the reset of LQ which takes place in the fifth machine cycle, comparing operations will be initiated and effect in the sixth machine cycle, this operation being carried out as described in detail for regular dividing operations. During the sixth machine cycle as outlined in Fig. 30, the multiplicand representation previously entered into the SP accumulator during the third machine cycle is transferred during the sixth machine cycle as a 10's complement to the previously zeroized PQ accumulator and concurrently in the same machine cycle, the 10's complement of the multiplicand amount is entered into the SP accumulator to cause the latter to be reset to zero.

Upon closure of cam contacts XC18 and CC3, a circuit will be completed through the 321SP relay coil from line 301 through cam contacts CC3 (Fig. 22e) to the transferred points AK1 of the AK relay through cam contacts XC18, through the contacts AF3, now closed through the 321SP relay coil to ground. The energization of 321SP completes a stick circuit for itself through the SP8 contact back through CC5 to line 301. Energization of 321SP also causes the closure of contacts SP1—6, SP7, SP10—15, and SP16. Closure of SP1—6 (Fig. 22f) interconnects the SPR readout with the 313SP (Fig. 22e) accumulator magnets and effects reset of SP as follows: line 301, through the 9's "complemental" emitter 375 (Fig. 22f) through the SPR readout, through SP1—6 contacts, now closed, and by connecting lines 1915 (Fig. 22f to Fig. 22e)

through 313SP accumulator magnets to ground, thus setting up a series of 9's in the SP accumulator. The SP accumulator is now brought to zero by the entering of "one" in the units order magnet 313SP. The circuit connection for effecting this is from the units impulse transmitting wire 324, previously mentioned, through contacts SP—16, now closed, to the units order magnet 313SP. By the energization of 321SP contacts SP9 close, and a circuit is completed from line 301, through contacts CC17 (Fig. 22f), AK7 now closed, SP9 now closed, through 321AZ coils. This will cause resetting of one side of the comparing unit shown in Fig. 13.

At the sametime the 9's complemental amount is read from the SPR readout into PQ which is now at zero by circuit connections described as follows: line 301, through the "complemental" emitter 375 (Fig. 22f) through the SPR readout, through the SP10—15 contacts now closed, to the 313PQ accumulator magnets to the ground to thereby enter the 9's complement of the MC in the PQ accumulator. At this time, the PQ accumulator represents the 9's complement of the MC and it is changed to the 10's complement by the entering of a unit in the units order magnet of the accumulator. The circuit for effecting this is from the line 324 through contacts SP7 (Fig. 22f) and then to the units order magnet 313PQ. This accumulator has now received the 10's complement of the MC derived from the card and in the problem in Fig. 33, it will be noted that it represents —642000—.

As indicated in Fig. 30, comparing operations then take place and such operations are carried out as in regular dividing operations. The successive operations take place to determine the number of quotient digits which are to be derived and as such digits are obtained, they are additively entered during successive entering cycles into the PQ accumulator which previously received the 10's complement of the MC. It will be noted that in the problem shown in Fig. 33, the successive quotient digits derived are "3," "5," and "8," all of which are entered in the proper denominational order into the PQ accumulator to be thereby added to the 10's complement of the MC. If the quotient previously obtained and represented on the card is identical in numerical value to the newly derived quotient, the PQ accumulator will be brought to zero. Such operations will be subsequently described in detail.

In carrying out the above operations, it is desirable to automatically determine the number of quotient digits which are to be obtained, or in other words, the number of divisor-dividend comparing operations which are to take place. The number of comparing operations is determined by the denominational magnitude of the multiplicand and in the present machine, it is assumed that the card columns for representing the MC consists of three columns. However, the capacity of the machine may be increased or decreased in accordance with the denominational magnitudes of the MC values involved. Obviously, with the three column multiplicand digit representations, the MC values assumed in the problem of Fig. 33 will consist of three significant digits —358— and accordingly three comparing operations will take place. If the multiplicand represents only two significant digits, there will be two comparing operations, and obviously a 1-digit multiplicand will require only a single comparing operation. The number of significant digits is determined by the presensing station to find out the number of zeros at the left of the first significant digit.

As shown in the diagram in Fig. 25, in accordance with the capacity of the present machine, there will be three plug connections between three plug hubs 367 and the three plug hubs 399, and by reference to Figs. 22a and 22d for such plug connections it will be seen that the relay coils TT$u$, TT$t$, TT$h$ will be energized whenever a zero is represented in any of the three corresponding multiplicand representing columns. In the problem assumed, three significant digits are involved so that none of the relays TT$u$, TT$t$ and TT$h$ (Fig. 22d) will be energized. However, if there had been only two significant digits in the multiplicand amount, a zero would be represented in the hundreds column and relay coil TT$h$ would be energized, and accordingly contacts TT$h$1 (Fig. 22c) would be transferred so that when cam contacts FC11 closed, an impulse would be transmitted to the AS$t$ relay coil. Since three significant digits are involved in the present problem, none of the TT relay coils is energized, and accordingly when cam contacts FC11 close, an impulse will be transmitted to the relay coil AS$h$, thereby energizing the latter because one side of this coil is connected through closed relay contacts AF8 to the line 301. Energization of the relay coil AS$h$ will cause the closure of its related contacts AS$h$1 (left center of Fig. 22c). When cam contacts XC4 close, a circuit will be completed from the ground through such contacts, through relay contacts AS$h$1 to the relay coil WA$h$, thence through relay contacts AK4 (now closed) to the line 301. Energization of relay coil WA$h$ will cause the closure of its stick contacts WA$h$1 which sets up a stick circuit for itself through cam contacts FC5 to the ground. The energization of relay coil WA$h$ also causes the closure of relay contacts WA$h$2 (see Fig. 22f).

It will be recalled from the description previously given in connection with regular dividing operations, the switch SB is given a step of movement for each comparing operation. At the termination of the third comparing operation, the switch SB will have been given three steps of movement, thereby closing a circuit from the line 301 through cam contacts CC17 (Fig. 22f) through contacts LL3, now closed, through the switch SB, through contacts WA$h$2, now closed, through the relay coil H and thence to the ground. The energization of the relay coil H is effected in the eleventh machine cycle so as to terminate comparing operations, as has been described in detail in connection with regular dividing operations.

It is pointed out at this time that in accordance with the energization of relay coils AS$u$, AS$t$, AS$h$ (Fig. 22c), the respective contacts AS$u$2, AS$t$2—3 and AS$h$2—4 (Fig. 22e) will be closed so as to determine the shift of the entry of the MC in the SP accumulator in the proper orders. To effect the entry, plug connections are made between plug hubs 309 and 504 (Figs. 22e and 25) and from 504 entries are directed through the closed AS2 contacts to the 313SP magnets.

During the dividing operations, each quotient digit derived is entered into the PQ accumulator which previously received the tens complement of the MC. This entry is made as follows: from the line 301 through the RD12 contact (Fig. 22g), through the emitter 348, transversely by lines in the readout device RDR which extend to the contacts 1X6 to 9X6 and through the particular contacts of the last named group which are closed and which, it will be recalled, are selectively closed according to the quotient digit that has been determined and which is to be entered into the PQ accumulator, through contacts AK24, now closed, through contacts AF7, now transferred, through CSa1, CSb1, CSc1 contacts, according to the columnar positions that the quotient digit is to be entered into the PQ accumulator, and through the 313PQ accumulator magnet which is to receive the entry, to ground. During the twelfth machine cycle (see Fig. 30) which is the cycle following the termination of dividing operations, a circuit is completed through 321ML (Fig. 22e) as follows: line 301, through cam contacts CC3 through the AK1 contacts now transferred through H3 now closed, through AK2 now closed, through 321ML to ground. The energization of 321ML relay causes the ML units to be reset during the twelfth cycle as is indicated in the diagram of Fig. 30 and such resetting operations are performed in the manner previously described.

Energization of 321ML also causes the closure of relay contacts ML31 (right side of Fig. 22d). The closure of this contact completes a circuit as follows: from the ground, through cam contacts CC40, contacts ML31 now closed, through contacts AK12 now transferred, through AL1 now transferred, through the AM relay coil to line 301. The energization of this relay coil closes contacts AM1 which are shown in Fig. 22h and such contacts are in a zero test circuit which will now be described in detail.

It will be recalled that dividing operations will be carried out in the RD accumulator (see Fig. 33) which will be brought to zero in the event that the dividing computation is properly carried out. It will also be observed from Fig. 33 that the checking operations involve the entry of the multiplicand derived from the card and the quotient digits derived by the dividing operations in the PQ accumulator, the entries being made additively and subtractively, and if these values agree, the PQ accumulator should be brought to zero as will be observed from Fig. 33. The determination whether all of the computations and machine operations are carried out correctly is effected by testing the final digit settings of supplemental readouts RDR' and PQR' shown in Fig. 22h, and when the computations and machine operations are correctly performed, the digit settings of such readouts will be zero. Thus, upon the closure of relay contacts AM1 a circuit will be closed from the ground, through contacts AM1, through the readouts RDR' and PQR' which, if the brush settings for both are all at zero, will enable the circuit to be carried from the PQR' readout through the normally closed contacts AG6 and thence through the readout RDR' to the line 570 which extends, as shown in Fig. 22d, to the punch contacts 358, the circuit then extending through contacts AL9 now transferred, to the punch magnet 360, to the line 301. A branch circuit is also established from the line 570 in Fig. 22d to the relay coil A to line 301. Energization of the relay coil A sets up its own stick circuit through its stick contacts A1 in a manner previously explained.

The punching mechanism adapted to be utilized in connection with the present machine is well known in the art and is shown in considerable detail in the patent to G. F. Daly, 2,045,437, dated June 23, 1936 and the magnet 360 in the present machine corresponds to the punch magnet identified by number 409 in the aforementioned patent. Contacts 358 hereinbefore referred to correspond to contacts identified by numeral 215 in Fig. 5 of the patent. As is well known in the type of punching machine referred to, the operation of the punch magnet 360 will cause the punch carriage to escape one column and concurrently open contacts 358. Thereafter there is a successive column by column escapement of the punch carriage by means of an "auto spacing" circuit which is well known in the form of punching machine referred to. This column by column escapement of the carriage will cause the successive columns of the card representing the dividend to pass by the punching instrumentalities without any punching operations being effected. When the dividend representing field has passed by the punches, the well known "high bar" will cause the skipping of the carriage to the last column position and, as has been previously described, this will cause the closure of punch contacts P5 (Fig. 22d). The closure of contacts P5 will effect the energization of relay coil B. Referring to Fig. 22e it will be noted that contacts B3 are now closed and A3 was previously closed. A circuit will now be completed from line 301 to cam contacts CC3, AK1 now transferred, through A3 contacts now closed, B3 contacts now closed, AT2 contacts closed, AK30 contacts now transferred, to the reset magnet 321RD. This will cause the reset of the RD accumulator and will bring the associated readout devices RDR and RDR' to zero position.

Referring now to Fig. 22d at the left side of the figure, it will be seen that RD magnet will close relay contacts RD1, thereby closing a circuit from the ground through cam contacts CC20, through RD1 contacts now closed, through the E relay coil to line 301. The E relay will close its relay contacts E2, thereby completing a circuit from the ground, through CC29, through punch contacts P1, now closed, through E2 contacts now closed, through the closed JJ2 contacts, through the stop key contacts 303 and to the card feed magnet 304, through D1 contacts now closed, to the line 301. This will cause the energization of the card feed clutch magnet 304 which is also shown in Fig. 1a, thereby initiating card operations to thus feed the next card to be checked into the pre-sensing position and thereafter machine operations take place as has been previously described in detail.

As previously stated, errors might arise from two causes. First, the dividing computation might have been performed incorrectly, leaving an amount represented in the RDR' readout or there might have been a lack of identity between the quotient digits derived by the dividing operation and the multiplicand amount represented on the card which would leave a digit representation on the PQR' readout. Thus, when the AM1 contact (Fig. 22h) closes, a circuit will be made from the ground, through contacts AM1, then through one of the contact points, brushes, and commutator segment of one order of either of the readout devices PQR' and RDR' (when that brush stands at any digit position other than zero), through the relay AR, to the line 301. Upon this circuit closure, the AR relay will be energized which will cause the closure of its respective contacts AR1 (Fig. 22h) and AR3 (Fig. 22e). Contacts AR1 are stick contacts for the relay coil AR. Since the circuit will not be completed to the wire 570, there will be no energization of the punch magnet 360 or the relay coil A. Therefore, the punch carriage will remain at rest and since there will be no energization of the relay coil A, the machine will terminate its operation. The failure to energize the relay coil A will prevent the closure of the related contacts A3 and consequently the restarting of the machine by the circuits previously traced.

Since the lack of identity will now be apparent to the operator by the failure to restart the machine and the fact that the carriage of the punching machine is at a certain position, this will be an indication of the lack of identity under either of the conditions previously pointed out. The operator will then remove the card from the punching machine so as to determine the reason for the inaccurate results indicated. After the card has been removed from the punch carriage, the operator will then depress a reset key 571 (Fig. 22e). This will cause the closure of the circuit outlined as follows: from the line side 301 through cam contacts CC3, through contacts AK1 now transferred, through the reset key contacts 571, through contacts AR3 now closed, through 321PQ to ground. The energization of the reset magnet 321PQ will cause the resetting of the PQ accumulator in a manner previously explained so that if either of the respective readout devices PQR or PQR' represented a digit instead of zero, it would be zeroized. However, before PQR' is reset to zero, the energization of 321PQ also causes the closure of contacts PQ11 to complete a circuit from ground to AR1 contacts, to either PQR' or RDR' readout segment and contact point when the brush of either readout stands at other than zero, through PQ11 contacts now closed, to line 570 which leads, as previously stated, to the line 570 at Fig. 22d, the circuit then extending through contacts 358, through contacts AL9, now transferred, through the punch magnet 360 and thence to line 301. As previously stated, a circuit will also be extended from the line 570 to relay coil A. As previously explained, this will cause the stepping of the punch carriage column by column and it will eventually escape to the last column position and then cause resetting of the RD accumulator. As previously described, this will cause the restarting of the machine and the latter will then function to feed the next card to be checked and operations thereafter will take place in the manner previously described in detail.

*Checking the factors and quotient result of dividing computations by multiplying*

For the purpose of checking the quotient results and the remainder derived as a result of dividing operations effected by the machine disclosed herein, the machine is provided with means for checking such results, that is, using the divisor as a multiplier, the quotient as a multiplicand and then effecting a multiplying operation. The newly derived product is entered into an accumulator in which the dividend amount is subtractively entered and the addition of the remainder, if any, will bring this accumulator to zero. Therefore, in addition to the regular multiplying operations, the machine goes through checking operations to determine whether the previous dividing operation has been correctly performed.

Figure 27:
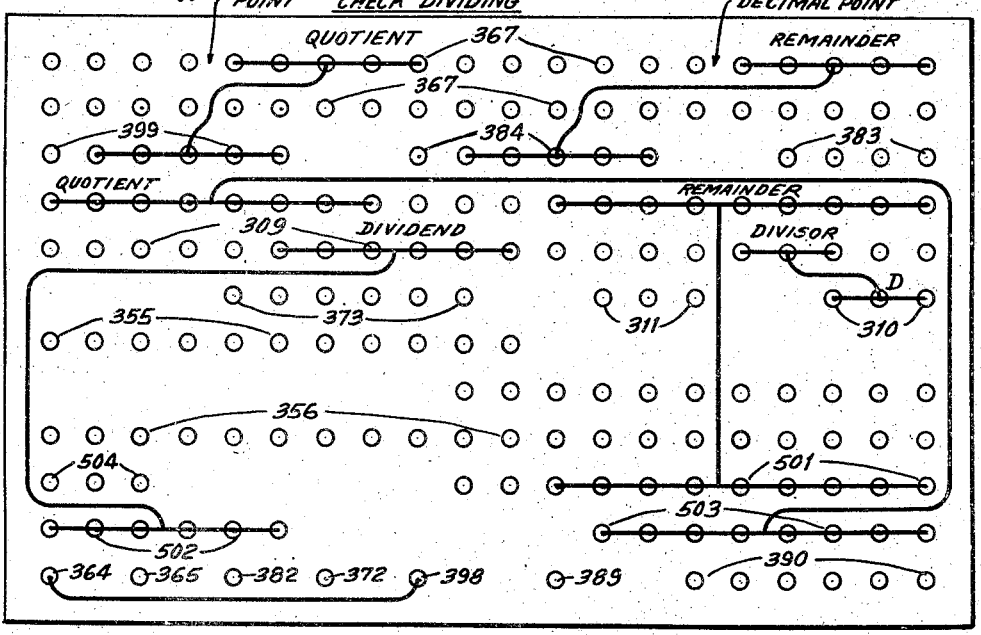
Figure 28:
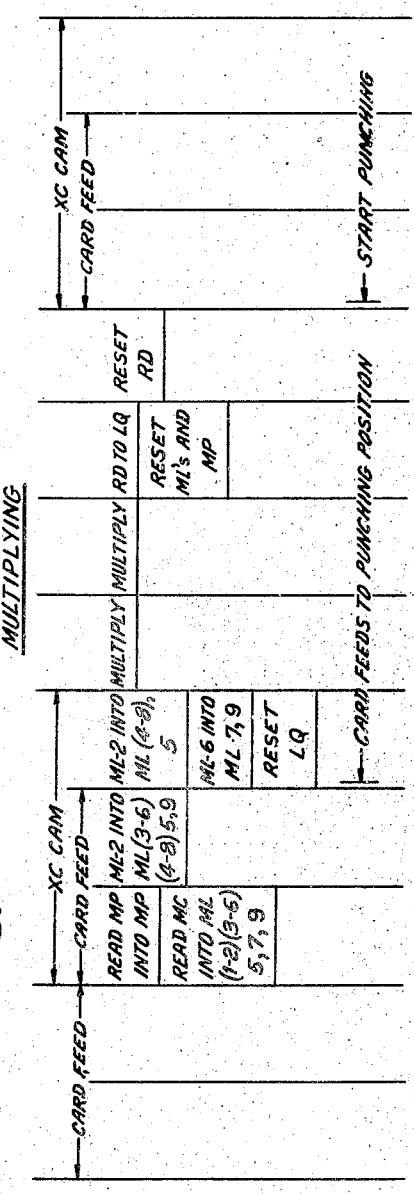
Figure 29:
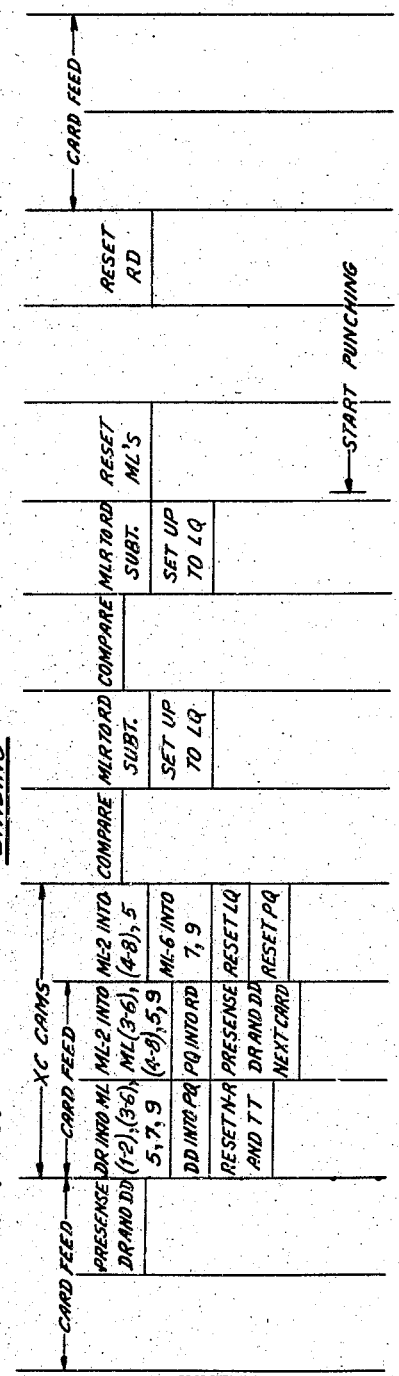
Figure 32:
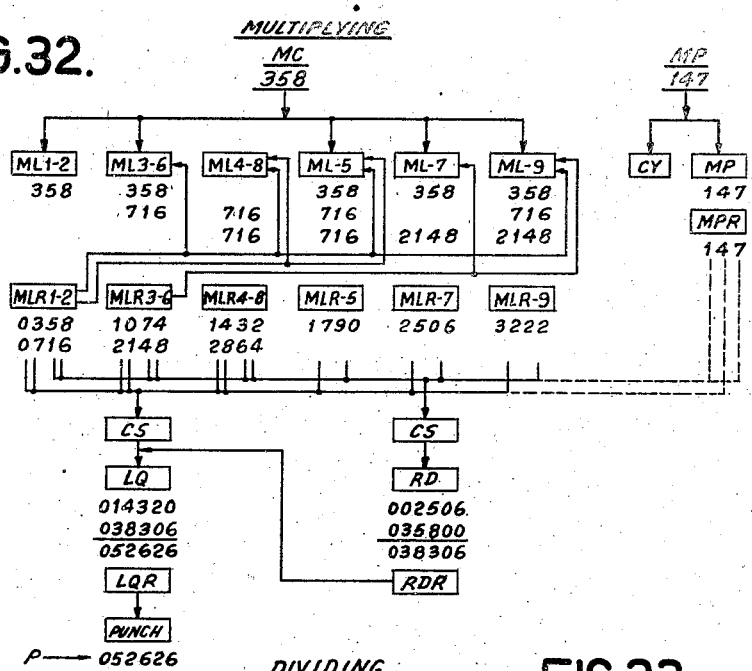
Figure 35:
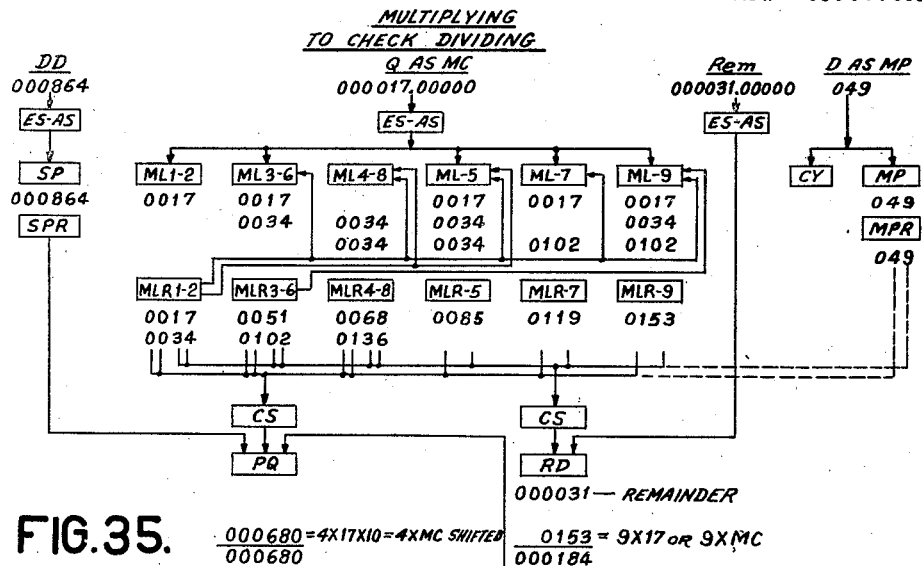

In setting up the machine for checking-dividing computations, the universal plugboard is provided with the plug connections shown in Fig. 27. Figs. 31 and 35 outline the procedure followed in checking operations of the type just described.

Checking operations are accomplished by re-running the cards through the machine and as outlined in Fig. 35, the quotient amount is utilized as the multiplicand and is read into the ML accumulators and multiples thereof are built up as in regular multiplying operations. The divisor amount is utilized as a multiplier and accordingly is entered in the MP accumulator. The dividend amount is entered in the SP accumulator and then transferred to the PQ accumulator as a tens complement. In the event that the previous dividing operation should wind up with a remainder, this amount is read from the card and subsequently entered in the PQ accumulator.

In carrying out dividing computations, the quotient derived and the related remainder can be either a whole number or a decimal, depending upon the decimal point location of the dividend and the divisor. Therefore, the result recording will be punched on the record at predetermined denominational columns and the digits will be recorded to the right or left of the decimal point which is identified in the series of plug hubs 355 (Fig. 22d) and the plug hubs 500 (Fig. 22h) by a dotted line DP. Digit recording to the right of the dotted line will indicate decimal values and digits punched at the left of such lines will be whole numbers. However, in checking operations, such values are treated as whole numbers irrespective of the decimal point location of the results. In accordance with this, the present machine provides means to shift the entries in the ML and RD accumulators. Accordingly, with respect to the dividend amount, a denominational shift takes place so that the dividend amount will be entered in the SP accumulator in proper denominational orders. The remainder, it will be noted from Fig. 35, is shifted denominationally so that the entry will be made in the denominational orders at the extreme right of the RD accumulator. A denominational shift is also effected for the quotient entry so that it will be entered in the proper orders of thee ML accumulators, enabling the building up of multiples in the proper denominational places.

As has just been stated, the machine is provided with means to effect the denominational shift of the entries and such means will now be described. At the outset, it will be noted that with particular reference to Figs. 27 and 22h that a plug connection is made between the plug hubs 364 and 398, thereby causing the energization of the relay AG. The AG relay closes its contacts AG1 and thereby effects the energization of the relay magnet AL. Therefore, it will be noted that as long as the plug connection is made, both the AG and AL relays will be energized.

It will be recalled that the brushes 371 (Fig. 22a) are the pre-sensing brushes and by such analyzing elements the quotient and remainder are pre-sensed to determine the presence of zeros at the right of the first significant digit in both the quotient amount and the remainder and a denominational shift is made accordingly. From the plug hubs 367 at the right of the decimal point of the quotient representing field there are plug connections to the plug hubs 399, as is shown in Fig. 27, and also with reference to this figure there are plug connections from the plug hubs 367 at the right of the decimal point of the remainder representing field to plug hubs 384. The plug hubs 384 and 399 are also shown in Fig. 22d and by means of the plug connections and the circuit now to be described in detail, the TT relays and N relays will be selectively energized. When the card passes the analyzing brushes 371, cam contacts FC7 (Fig. 22a) will be closed at the time the zero index point position passes the brushes, thereby closing a circuit from the line 301 through G1 (Fig. 22e) contacts now closed, to cam contacts FC7 (Fig. 22a), contact roll 370, analyzing brushes 371, plug hubs 367, by the plug connections previously described to plug hubs 399, to the TT relays (Fig. 22d) and then to the ground. Since there are five zeros at the right of the decimal point of the quotient value in the problem adopted, relays TTu through to TTtt will be energized. The circuit just described will also effect the energization of the N relays because of the plug connections between the plug hubs 367 associated with the remainder and the plug hubs 384 and since in the remainder there are five zeros at the right of the decimal point, relays Nu through to Ntt will be energized. Referring to Fig. 22c, the energization of the relays Nu through to Ntt will transfer their contacts so as to effect the closure of a circuit from the line 301 through cam contacts FC16 through the transferred contacts NTu—2 through to Ntt—2 to the relay ASa thence through contacts AG5 to the ground. The energization of the relay coil ASa will effect the closure of contacts ASa1—6 (Fig. 22h), ASa7—9 (Fig. 22a) and ASa10—15, (Fig. 22e).

In the problem taken, the first significant digit in the quotient and remainder amounts happens to be whole numbers and not decimals and accordingly the units digit "4" of the dividend amount is entered in the units order of the SP accumulator. However, if the quotient or dividend amount had been a decimal, at the hundredths order, that is the quotient as 000000.17000 or remainder as —000000.31000 there would be three zeros to the right of the first significant digit. Thus the unit of the dividend amount will be shifted two positions to the right and will be entered into the hundreds order of the SP accumulator.

It is for this reason the particular relay ASa—ASf energized is dependent upon the N2 and TT2 contacts closed and their interaction determines the particular AS relay to be energized and the necessary denominational shift in the SP accumulator.

The above described pre-sensing operations take place during the second machine cycle as is indicated in the timing diagram of Fig. 31. During the next machine cycle or the third machine cycle from the start, the sensing brushes 308 sense the quotient, remainder, dividend and divisor values and these values are entered in the accumulators in a manner now to be described in detail.

Referring to Fig. 27, it will be observed that certain plug connections are made between the plug hubs 309 connected to the analyzing brushes 308 and other plug hubs to be mentioned as the description progresses.

Suitable plug connections are made between the plug hubs 309 associated with the quotient representing card field and the plug hubs 503. The entering circuit for entering the quotient amount in the ML accumulators is as follows: line 301 (Fig. 22e), through contacts G1, through cam contacts FC6, through the circuit breaker 306, through the contact roll 307, brushes 308, plug hubs 309 and then by the plug connections just described to the plug hubs 503 (Fig. 22a), then through the closed contacts ASa7—9 now closed, through the 313ML1—2 accumulator, and also through the K1—12 contacts through the 313ML3—6, 313ML4—8, 313ML—5, 313ML7 and the 313ML9 accumulators. In accordance with the closure of the contacts ASa7—9, the entry will be made in such accumulators with the first significant digit entered in the units order of these accumulators. Thereafter multiples of the quotient are built up in a manner explained for regular multiplying operations.

To effect the entry of the remainder, plug connections are made from the plug hubs 309 (Fig. 27) related to the remainder value representing card field to the plug hubs 501 (Fig. 22h). These values are analyzed by the brushes 308 and by the plug connections between the plug hubs 309 (Fig. 22) to the plug hubs 501 (Fig. 22h). The impulses representing the digit are transmitted through the ASa1—6 contacts now closed, and by lines which extend across Fig. 22h and upwardly from this figure to Fig. 22g, the impulses are directed to 313RD accumulator magnets. Thus the remainder amount will be entered in the RD accumulator in proper shifted relation to correspond with the shifted relationship of the quotient or dividend amount.

The dividend amount analyzed by the brushes 308 is entered in the SP accumulator by effecting plug connections between the plug hubs 309 of the dividend representing field (see Fig. 27) to the plug hubs 502. The plug hubs 502 are shown in Fig. 22e. The impulses representative of the digits of the dividend are transmitted through contacts ASa10—15 to the 313SP accumulator magnets. This will effect the entry of the dividend amount into the SP accumulator in proper position with respect to the shift required by the quotient and remainder amount.

The divisor is entered in the MP accumulator as follows: from Fig. 27 it will be observed that plug connections are made between the plug hubs 309 related to the divisor represented field and the plug hubs 310. Plug hubs 310 are shown in Fig. 22e and impulses representative of the divisor amount are transmitted through contacts MP1—3 now closed to the 313MP accumulator magnets.

During the fourth and fifth machine cycles there is a building up of the multiples into the various ML readouts which is a prerequisite to multiplying operations.

In the manner previously described, contacts B2 and D2 (Fig. 22e) will be closed and a circuit will be closed as follows: line 301, through cam contacts CC27, through the AK1 contacts in the position shown in Fig. 22e to contacts B2, thence through contacts D2, through contacts HH2, through AG3 (now transferred) through the relay 321 PQ to ground. The energization of 321PQ closes its stick contacts PQ2, setting up a stick circuit for itself back through cam contacts CC5 to line 301.

The energization of 321PQ closes contacts PQ10 and PQ4—9, both of which are shown in Fig. 22f. This will cause the reset of the accumulator PQ in the fifth machine cycle as is indicated in the diagram of Fig. 31. The resetting of the PQ accumulator is effected in the manner previously described, that is, by the emitter 511 complementary impulses are directed under control of the readout PQR through contacts PQ4—9 now closed, to accumulator magnets 513PQ. This will clear the PQ accumulator of any amount previously entered therein so as to condition it to receive the subproducts of the subsequent multiplying operation and other values entered therein which are to be pointed out in detail as the specification progresses.

Referring to Fig. 22d at the right thereof, the closure of contacts PQI effected by the energization of 321PQ will close a circuit from the ground through AL2 contacts (now transferred) through PQI now closed, through cam contacts CC7, through H5 contacts, through JJ relay coil to line 301. The energization of the JJ relay closes its stick contacts to set up a stick circuit for itself back through JJI contacts and ML29 contacts to ground. In the manner previously described in connection with regular multiplying operations, the energization of the JJ relay initiates multiplying operations and such operations will be effected in the sixth machine cycle in the problem assumed. Referring to Fig. 35, the various subproducts derived are entered in the PQ accumulator and since in the problem outlined the multiplicand amount is "17" the four and nine multiples thereof will be entered in the PQ accumulator in the proper denominational orders according to the necessary column shift. This accumulator will thereby have formed therein the product and to this product there is added the remainder amount which in the problem adopted is —31.

During the seventh machine cycle, the machine will cause the reset of the ML accumulators and the MP accumulator and this is effected in the manner previously described for regular multiplying operations. During this same machine cycle there is a transfer of the remainder amount which was entered in the RD accumulator to the PQ accumulator and is effected by a circuit described as follows: from line 301 through contact RDI2 in the position shown in Fig. 22g, through the emitter 348 so that impulses are directed under control of the RDR readout and sent through RD4—9 contacts now closed, through contacts CAI—5 now closed, through AL3—8 contacts now transferred and through impulse transmitting lines 1920 extending to Fig. 22f and thence to 313PQ accumulator magnets to ground. This will effect the transfer of the remainder as a positive number to the PQ accumulator and as outlined in Fig. 31, this will be performed in the seventh machine cycle.

During the following cycle of operation which is the eighth machine cycle in the problem adopted, the resetting of the RD accumulator is effected and this is carried out in the same manner as was explained in connection with regular dividing operations. During the same cycle of operation, there is a transfer of the tens complement of the amount standing on the SP accumulator to the PQ accumulator and subsequently the SP accumulator is reset to zero. For resetting the RD accumulator, it will be recalled that the energizing circuit for 321RD is through cam contacts CC27 (Fig. 22f) through AKI contacts then down through the YI contacts through AK30 contacts to 321RD. From the YI contacts there is a branch circuit through the AG2 contacts to the 321SP relay coil to the ground. A stick circuit is set up for the SP relay coil through SP8 contacts, through CC5 contacts to line 301. The energization of the 321SP relay coil causes the closure of certain relay contacts which will now be referred to. For transferring the complement of the amount standing on the SPR readout to the PQ accumulator, a circuit is closed from the line 301 (Fig. 22f) through the complemental impulse distributor 375, through the SPR readout, through relay contacts SP10—15 now closed, thence through the 313PQ accumulator magnets to ground. This will cause the transfer of the nines complement on the SP accumulator to the PQ accumulator. Impulses sent under control of the SPR readout go through contacts SPI—6 now closed, and by lines 1915 extending to Fig. 22e, through 313SP accumulator magnets to the ground. With respect to the SP accumulator, the elusive "1" is entered in the accumulator magnet from the unit digit impulse transmitting line 324 (Fig. 22e) through contacts SP16 now closed thence through contacts AV32 to the units order accumulator magnet 313SP. The amount entered in the SP accumulator will now be the tens complement, thereby restoring it to zero.

The desired elusive "1" is entered in the PQ accumulator from the unit digit impulse transmitting wire 324 through contacts SP7 and AV38 to the units order accumulator magnet 313PQ. The latter has now received the tens complement of the amount standing on the SP accumulator which operation is outlined in Fig. 35 for the problem adopted. It will be apparent from the mathematics involved that since the quotient has been multiplied by the divisor and the remainder has been added to the product obtained, the subtraction of the dividend amount should bring the PQ accumulator to zero if the mathematical relationship between such factors and the results is true. The determination of this is effected by testing the PQ accumulator to determine whether it is now at zero and is effected by the following described means.

Referring to Fig. 22d, upon the closure of contacts CC39, a circuit will be extended through RD2 contacts now closed, through AK12 contacts in the position shown, through ALI contacts (now transferred), through the AM relay coil, to line 301. The energization of AM relay coil, referring to Fig. 22g, will cause a closure of relay contacts AMI. If the PQR' readout has been brought to a zero representation, a circuit will be completed from the ground through AMI contact and by means of the brushes of the PQR' readout now standing at zero, the circuit will be extended to the AG6 contacts (now transferred), and thence by line 570 (Fig. 22h and Fig. 22d) through the punch contact 358, through contacts AL9 (now transferred) to the punch magnet 360. A branch circuit is also established from the line 570 through the A relay coil to the line 301. This circuit is precisely the same as was previously explained in the portion of the specification dealing with checking multiplying computations by division. This will cause the punch carriage to be stepped column by column and eventually to the last column position so that the machine will be restarted to feed the next card to be checked.

However, if it had been determined that the mathematical relationship between the factors and results on the card was not correct, one of the brushes of the PQR' readout would not be at zero so that when AMI contacts closed the circuit would be closed from the ground, through such contacts, and thence by one of the brushes which was not standing at zero through the AR relay coil, to the line 301. The energization of the AR relay coil causes the ARI contact to close and set up a stick circuit for itself in the manner previously explained. The machine will now stop as previously described, due to the fact that no impulse is sent over the line 570 to the A relay coil and punch magnet 360.

The conditioning of the machine to again start it into operation is effected by the depression of the reset key 571 (Fig. 22e) and by the circuit previously described, the PQ accumulator will now be reset to zero. Also as previously described the energization of 321PQ will cause the closure of PQU contacts (Fig. 22h) which will then complete the closing of the circuit by the line 570 through the punch magnet 360 and the A relay coil. The punch carriage will now be moved the extent of the digit representation of the quotient field and then it will be escaped to its last column position so as to cause the restart of the machine. The restarting of the machine initiates a card feed cycle and the next card is then fed past the analyzing brushes 308 down to the punch feed bed. The machine then waits until the card which is already in the machine for the previous operation to be ejected after which a PQ accumulator reset takes place and a new checking operation is initiated.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine for checking by dividing the results of previous multiplying operations recorded on each record as a product and which record contains designations representing a multiplier amount to be used as a divisor amount in dividing and a multiplicand amount to be checked against a computed quotient, the combination of record controlled receiving means for receiving the multiplicand amount derived from the record, record controlled means for receiving said multiplier amount, a supplemental receiving means, means to transfer the complement of the multiplicand amount from the first named receiving means to said supplemental receiving means before the latter receives quotient digits derived by subsequent dividing operations, record controlled dividend receiving means for receiving said product to be utilized in dividing operations as a dividend, devices coordinated for automatic operation for dividing said dividend derived from said dividend receiving means by the divisor derived from the related receiving means for the multiplier amount and for entering the successive quotient digits in said supplemental receiving means to bring the supplemental receiving means to the same digit position in all orders if the recorded multiplicand amount equals the computed quotient, said dividing devices bringing the dividend receiving means to a zero status upon completion of dividing operations, and means to test the dividend receiving means for determination of an all zero condition and to test the supplemental receiving means for determination of the same digit representation in all orders.

2. In a machine for checking by dividing the results of previous multiplying operations recorded on each record as a product and which record contains designations representing a multiplier amount to be used as a divisor amount in dividing and a multiplicand amount to be checked against a computed quotient, the combination of record feeding means, for feeding successive records through the machine, receiving means for receiving the multiplicand amount derived from the record, receiving means for receiving said multiplier amount, a supplemental receiving means, means to transfer the complement of the multiplicand amount from the first named receiving means to said supplemental receiving means before the latter receives quotient digits derived by subsequent dividing operations, dividend receiving means for receiving said product to be utilized in dividing operations as a dividend, devices coordinated for automatic operation for dividing said dividend derived from said dividend receiving means by the divisor derived by the receiving means for the multiplier amount to bring said dividend receiving means to zero and for entering the successive quotient digits in said supplemental receiving means in successive orders of the supplemental receiving means beginning at the highest denominational order and successively to lower orders, to bring the supplemental receiving means to the same digital representation if the recorded multiplicand amount equals the computed quotient, means to test the dividend receiving means for determination of an all zero condition and to test the supplemental receiving means for determination of the same digit representation in all orders, and means controlled by said testing means for causing the initiation of the operation of said record feeding means when said dividend receiving means represents all zeros and said supplemental receiving means represents the same digit in all orders, and to prevent the initiation of the operation of the record feeding means when the dividend receiving means does not represent all zeros and/or the supplemental receiving means does not represent the same digit in all orders.

3. In a checking machine, three amount receiving means, one of which receives a recorded amount from a record representing a previously computed product, and the other two receive recorded amounts representing the coordinated factors involved in the previous multiplying operations and recorded on the same record, a quotient digit receiving means, devices coordinated for the automatic operation of division under control of the factor receiving means receiving one factor used as a divisor and said product receiving means used as a dividend receiving means and for entering the computed quotient digits in said quotient digit receiving means, said dividing devices bringing the dividend receiving means to a zero status upon completion of dividing operations, means to transfer the amount of the other factor from the related receiving means as a complement to said quotient digit receiving means, both the quotient digit entry and said complement entry bringing the quotient digit receiving means to the same digit representation in all orders if the computed quotient equals the other factor amount, and means to test the dividend receiving means for an all zero condition and said quotient digit receiving means for determination of the same digit representation in all orders.

4. In a checking machine, three amount receiving means, one of which receives a recorded amount from a record representing a previously computed product, the second receives a recorded amount representing one of the coordinated factors involved in the previous multiplying operations and recorded on the same record and the remaining receiving means receives the other recorded factor, a quotient digit receiving means, devices coordinated for the automatic operation of division under control of one factor receiving means used as a divisor and said product receiving means used as a dividend and for entering the computed quotient digits in said quotient digit receiving means in successive orders beginning at the left highest order, said dividing devices bringing the dividend receiving means to a zero status upon completion of dividing operations, means for sensing the recordings on the record representing the other factor to determine the denominational magnitude thereof and variable entry shift means controlled thereby, complement transfer means to transfer the amount of the other factor from the related receiving means and entered into higher orders of said quotient digit receiving means determined by said entry shift means, which entry is a complement amount of digits entered in the quotient digit receiving means in corresponding digit receiving orders, both the quotient digit entry and said complement entry bringing the quotient digit receiving means to the same digit representation in all the digit receiving orders if the computed quotient equals the other factor amount, and means to concurrently test the dividend receiving means for a zero status and said quotient digit receiving means for the same digit representation in all orders.

5. In a checking machine, three amount receiving means, one of which receives a recorded amount from a record representing a previously computed product, and the other two receive amounts representing the coordinated factors involved in the previous multiplying operations and recorded on the same record, a quotient digit receiving means, devices coordinated for the automatic operation of division under control of the factor receiving means receiving one factor used as a divisior and said product receiving means used as a dividend and for entering the computed quotient digits in said quotient digit receiving means, said dividing devices bringing the dividend receiving means to a zero status upon completion of dividing operations, means to enter an amount corresponding to the other factor derived from the related receiving means into said quotient digit receiving means, one of the aforesaid entries in the quotient digit receiving means being effected by complement entry converting means to bring the quotient digit receiving means to the same digit representation in all orders if the computed quotient equals the other factor amount, and means to concurrently test the zero condition of the dividend receiving means, and to test said quotient digit receiving means for determination of the same digit representation in all orders thereof.

6. In a machine for checking by dividing the product result of a previous multiplying operation recorded on a record and having means for analyzing the product, multiplier and multiplicand factor representations on the same record, the combination of quotient amount receiving means, receiving means controlled by the related analyzing means for receiving one of the represented factors, receiving means controlled by the related analyzing means for receiving the other represented factor, dividend receiving means controlled by the related analyzing means for receiving the recorded product amount to be utilized in dividing operations as a dividend, dividing devices coordinated for automatic operation for dividing said dividend derived from the dividend receiving means by the divisor derived from the first named factor receiving means and for entering the computed quotient in said quotient receiving means, means for sensing representations of said other factor amount for detecting the number of digits constituting the other factor amount, means controlled by said sensing means to effect a setup in accordance with the number of digits of the other factor amount which are the digits of an amount to be checked against the computed quotient amount, means to transfer said other factor amount derived from the last named factor receiving means as a complement to said quotient amount receiving means to thereby condition the latter for a digit representation which is the same in all orders thereof, and means controlled by said setup means to terminate the operation of the dividing devices after dividing has been carried out to an extent dependent upon the number of digits of said other factor amount.

7. A machine according to claim 6 which includes in combination therewith, means effective upon the completion of the aforesaid complement transfer operation and the dividing computation for testing the quotient amount receiving means to determine whether all orders thereof represent the same digit.

8. A machine according to claim 6 characterized by the bringing of the dividend receiving means to a zero status upon completion of the dividing computation, and including in combination therewith, means effective upon the completion of the dividing computation and the aforesaid complement transfer operation for testing the quotient amount receiving means to determine whether all orders thereof represent the same digit, and to test the dividend receiving means to determine whether all orders thereof represent zero.

9. In a dividing machine for effecting division computations involving dividend and divisor amounts on a record and having means for analyzing said dividend and divisor amount representations, said record also having representations of a third amount, the combination of quotient receiving means, divisor receiving means and dividend receiving means controlled by the associated analyzing means, dividing devices controlled by the aforesaid divisor and dividend receiving means for effecting the automatic operation of division of the dividend and divisor amounts and for entering the computed quotient digits in said quotient amount receiving means, means for sensing said third amount representations of the record for detecting the number of digits of the third amount, means controlled by said sensing means to effect a setup in accordance with the number of digits of the third amount, and means controlled by said setup means to terminate the operation of the dividing devices after a number of quotient digits have been computed and entered in the quotient receiving means corresponding to the number of digits of said third amount.

JAMES W. BRYCE.